United States Patent
Shimamori

(10) Patent No.: US 6,911,808 B1
(45) Date of Patent: *Jun. 28, 2005

(54) POWER SUPPLY APPARATUS HAVING A REFERENCE VOLTAGE REGISTER AND METHOD OF CONTROLLING

(75) Inventor: Hiroshi Shimamori, Kanagawa (JP)

(73) Assignee: Fujitsu Limited, Kawasaki (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 1318 days.

(21) Appl. No.: 09/219,862

(22) Filed: Dec. 23, 1998

(30) Foreign Application Priority Data

Mar. 31, 1998 (JP) ............................. 10-086098

(51) Int. Cl.⁷ ............................. G05F 1/33; G05F 1/40; H02J 1/00
(52) U.S. Cl. ............................. 323/283; 323/351; 323/285
(58) Field of Search ............................. 323/283, 284, 323/285, 222, 351

(56) References Cited

U.S. PATENT DOCUMENTS

| | | | |
|---|---|---|---|
| 5,475,296 A | * | 12/1995 | Vinsant et al. .............. 323/223 |
| 5,747,977 A | * | 5/1998 | Hwang ....................... 323/284 |
| 5,929,619 A | * | 7/1999 | Chin et al. .................. 323/283 |
| 5,969,515 A | * | 10/1999 | Oglesbee .................... 323/283 |

FOREIGN PATENT DOCUMENTS

| | | |
|---|---|---|
| JP | 64-72215 | 3/1989 |
| JP | 2-55573 | 2/1990 |
| JP | 2-184265 | 7/1990 |

* cited by examiner

*Primary Examiner*—Edward H. Tso
*Assistant Examiner*—Bao Q. Vu
(74) *Attorney, Agent, or Firm*—Armstrong Westerman Hattori McLeland & Naughton, LLP

(57) ABSTRACT

A reference voltage register stores a reference value Vref indicating the output voltage Vout of a power supply circuit. A digital filter amplifies the difference between the output voltage Vout from the power supply circuit and the reference value Vref stored in the reference voltage register. A pulse width computation unit computes the duty such that the output voltage Vout matches the reference value Vref, and generates the on-time of a pulse signal corresponding to the duty. A reference value operation unit updates the reference voltage register depending on the output current from the power supply circuit or the temperature around the power supply circuit.

12 Claims, 50 Drawing Sheets

PRIOR ART

| OUTPUT CURRENT (Iout) | REFERENCE VALUE (Vref) |
|---|---|
| 0 A | 5.000 |
| 0.1 | 5.001 |
| 0.2 | 5.002 |
| ⁀ | |
| 9.9 | 5.099 |
| 10.0 | 5.100 |

FIG. 12

| TEMPERATURE AROUND POWER SUPPLY APPARATUS | RESISTANCE VALUE Pp OF WIRING PATTERN | REFERENCE VALUE Vref |
|---|---|---|
| 0 °C  ← Iout=0.1A | 10.00 mΩ | 5.0010 |
| 5 | 10.02 | . |
| 1 0 | 10.04 | . |
| ⟨ | ⟨ | . |
| 5 0  ← Iout=0.2A | 10.20 | 5.0010 |
| 0 °C | 10.00 mΩ | 5.0020 |
| 5 | 10.02 | . |
| 1 0 | 10.04 | . |
| ⟨ | ⟨ | . |
| 5 0 | 10.20 | 5.0020 |
| ⋮  ← Iout=10 A | ⋮ | ⋮ |
| 0 °C | 10.00 mΩ | 5.1000 |
| 5 | 10.02 | 5.1002 |
| 1 0 | 10.04 | 5.1004 |
| ⟨ | ⟨ | . |
| 5 0 | 10.20 | 5.1020 |

FIG. 18

| AMBIENT TEMPERATURE | REFERENCE NUMBER (Vref) |
|---|---|
| 0 °C | 5.10 |
| 5 | 5.075 |
| ⌇ | |
| 20 | 5.00 |
| ⌇ | |
| 45 | 4.90 |
| 50 | 4.875 |

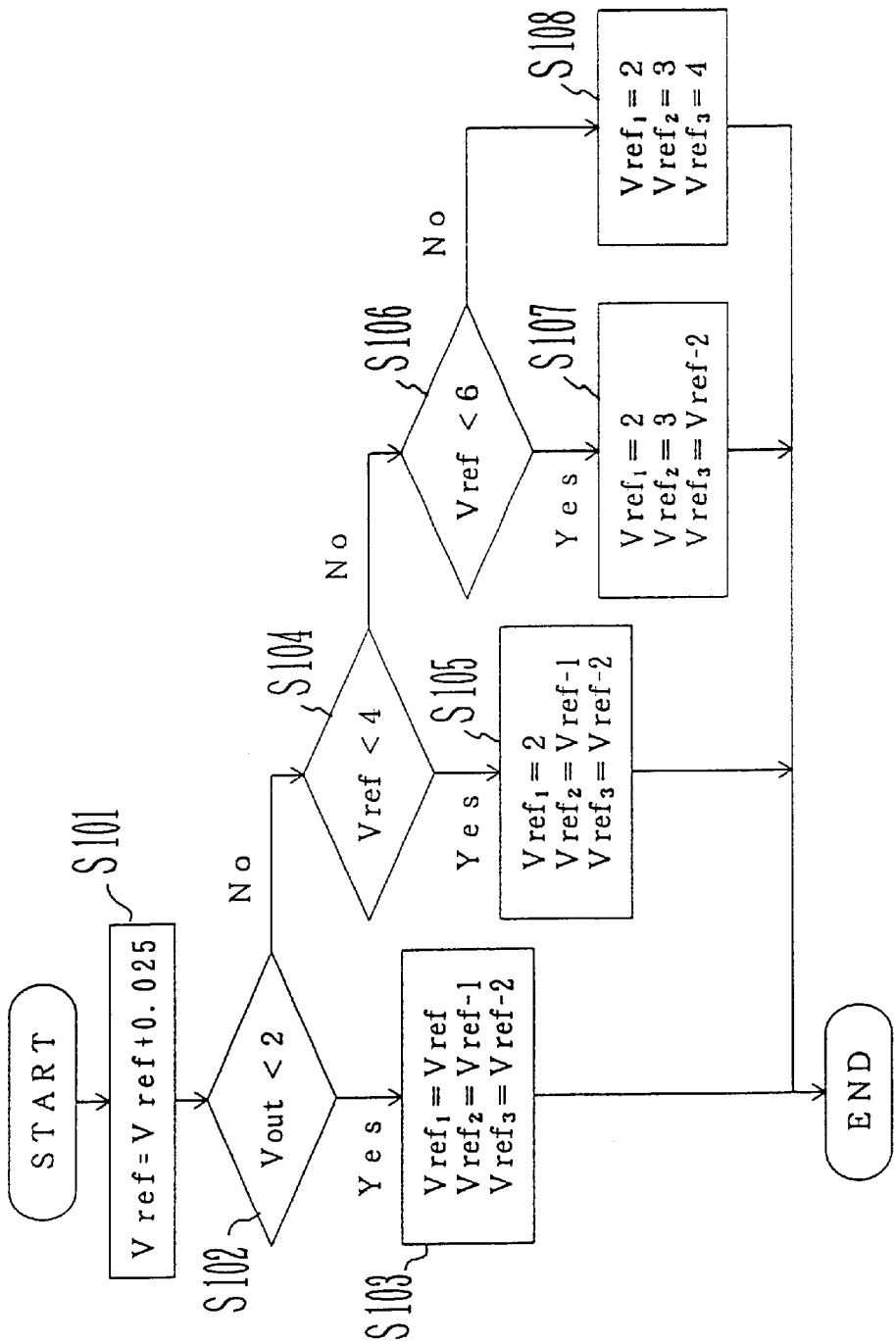
F I G. 31

| MEMORY ADDRESS | PULSE CYCLE |
|---|---|
| 1 | 20.0 ($\mu s$) |
| 2 | 20.4 |
| 3 | 19.6 |
| 4 | 20.8 |
| 5 | 21.1 |
| ⋮ | ⋮ |
| n | 19.3 |

FIG. 38

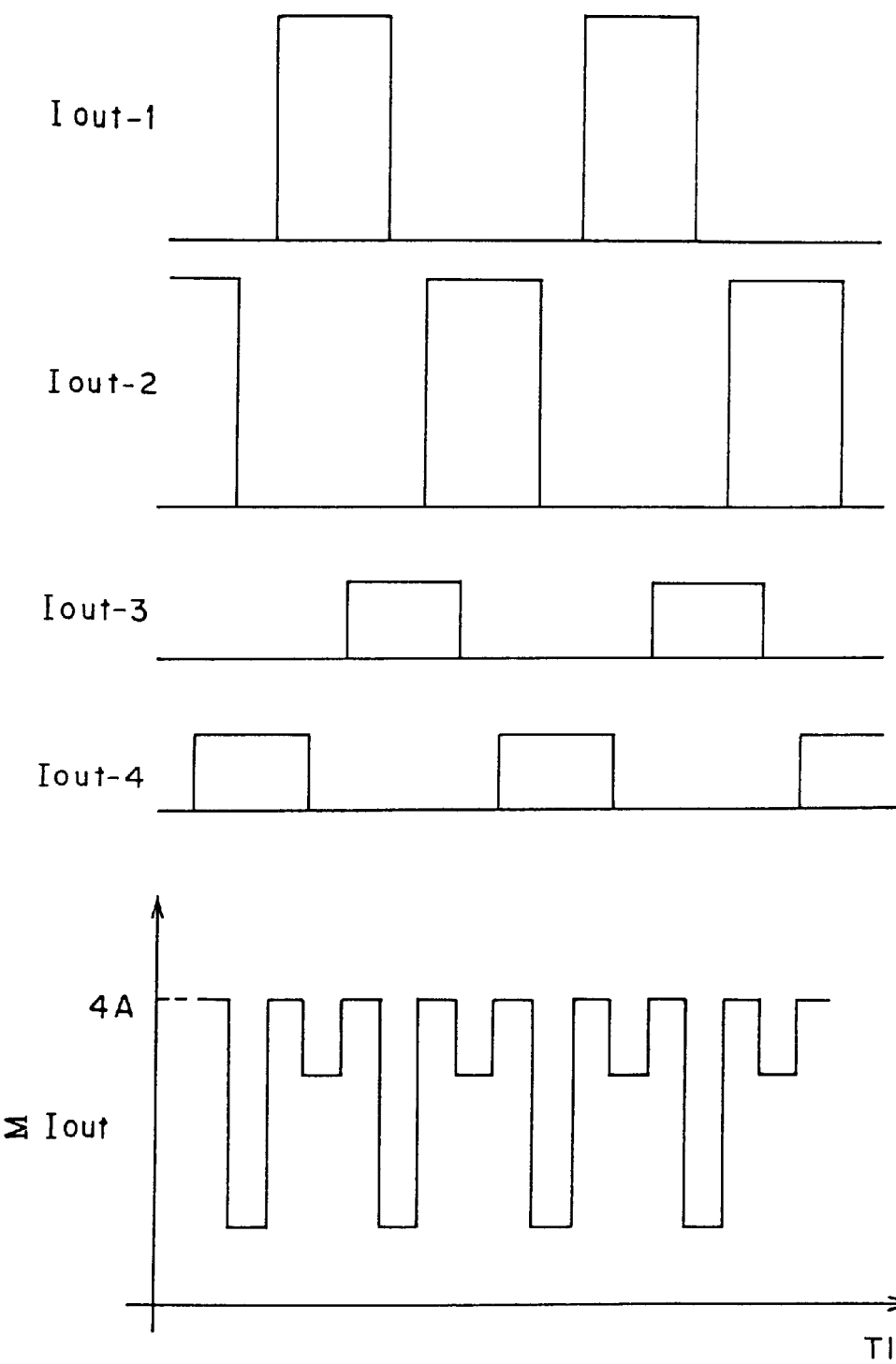
F I G. 50

POWER SUPPLY APPARATUS HAVING A REFERENCE VOLTAGE REGISTER AND METHOD OF CONTROLLING

BACKGROUND OF THE INVENTION

1. Field of the Invention

The present invention relates to a power supply apparatus provided with a power supply circuit for generating a DC output.

2. Description of the Related Art

A power supply apparatus such as an AC/DC converter, a DC/DC converter, a charger, etc. is popular in various fields. Generally, a power supply apparatus should be small in loss. Particularly, it is very important to reduce loss in a power supply apparatus used in a portable personal computer, a terminal unit in a portable communications device, etc.

FIG. 1 shows the configuration of the charger or the DC power supply provided in the conventional power supply apparatus. The charger and the DC power supply basically have the same configurations, and individually include an electric power converter 510 and an analog circuit unit 520. In this example, the DC power supply is a DC/DC converter.

The electric power converter 510 includes a switching element (MOSFET) controlled according to the instruction from the PWM control circuit 524; a rectifying diode; an inductor for storing/discharging energy; a resistor for detecting an inductor current or an output current; and an output capacitor for smoothing an output. While the switching element is in an ON state, the inductor current is ramped up with the electric current provided for the load, thereby storing residual charge in the output capacitor. On the other hand, while the switching element is in an OFF state, the inductor current is ramped down and the electric charge stored in the output capacitor is discharged as necessary with the electric current provided for the load.

The analog circuit unit 520 includes an amplifier 521 for amplifying an inductor current; an amplifier 522 for amplifying the difference between the output from the amplifier 521 and a reference voltage Vref1; an amplifier 523 for amplifying the difference between the output voltage and a reference voltage Vref2; a PWM control circuit 524 for generating a PWM signal for controlling the switching element based on the output from these amplifiers, etc.; and an oscillator 525 for providing a clock at a predetermined frequency for the PWM control circuit 524.

When the output voltage becomes lower than the reference voltage Vref2, the PWM control circuit 524 sets to a high value the duty (duty cycle) of the PWM signal to be provided for the switching element so that the inductor current can be increased and the output voltage can become higher. On the other hand, when the output voltage becomes higher than the reference voltage Vref2, the PWM control circuit 524 sets to a low value the duty of the PWM signal so that the inductor current can be reduced and the output voltage can become lower. Thus, the output voltage can be can be maintained at a constant level. When the PWM control circuit 524 detects an overcurrent based on the output from the amplifier 522, it reduces the duty of the PWM signal or forcibly turns off the switching element.

Thus, an analog circuit has been used to control the output from a charger provided in the conventional power supply apparatus, or each DC power supply.

As described above, an analog circuit has been used to control the output from the conventional power supply apparatus. Therefore, the characteristics or specification of a power supply circuit cannot be easily amended. If they can be amended, a number of circuits have to be added for amendments. Considering a smaller or a lower cost power supply apparatus, the conventional technology has been impractical and unrealistic. Described below are examples of the problems with the conventional power supply apparatus.

(1) Precision in Output Voltage

Recently, high precision in voltage is required for a load (for example, the CPU of a computer). Therefore, a configuration is designed such that, to remove an influence of a voltage drop in the wiring between the output terminal of a power supply apparatus and a load, a voltage can be measured at an input terminal of the load, and the power supply apparatus can adjust the output voltage using the measured voltage as a feedback signal. Such a configuration can be referred to as a remote sense. However, there is a high possibility that a power supply apparatus which adopts the remote sense can generate oscillation. Providing an oscillation prevention circuit incurs an increase in the number of parts, thereby undesirably failing in making a small and low-cost power supply apparatus.

On the other hand, if the precision in voltage to be applied to an input terminal of a load is improved without adopting the remote sense, it is also necessary, in consideration of the fluctuation of the temperature around the power supply apparatus, to provide a compensation circuit for removing the temperature-dependency when a voltage drops. The compensation circuit can be realized as a circuit for generating a high-precision reference voltage, but it is normally expensive.

(2) Voltage Waveform when an Electric Power is Supplied or Disconnected

Semiconductor elements such as a TTL, a CMOS, etc. are widely used in a circuit having a load. Among them, a TTL element requires comparatively moderate regulations relating to the rise and decay speeds of an applied voltage. Therefore, it can be easily realized using a C-R circuit, etc. for the conventional power supply apparatus including an analog circuit. On the other hand, as well-known by one of ordinal skill in the art, a CMOS element requires a higher dv/dt (rise or decay speed of an applied voltage) around a threshold voltage. However, if a rise speed is simply increased for the conventional power supply apparatus, an overshoot occurs as it is commonly known. Thus, with the conventional power supply apparatus, a semiconductor element including a load can have a problem with its operation when it is turned on or off.

(3) Switching Noise

The power supply apparatus shown in FIG. 1 is normally called a switching regulator. As well-known, a switching regulator generates noise from its switching frequency. This noise may cause a malfunction of a peripheral circuit. Therefore, the conventional power supply apparatus has been equipped with a effective frequency filter for removing the noise, or a shield for protecting peripheral circuits against noise. These measures against noise are not recommended for a small or low-cost power supply apparatus.

SUMMARY OF THE INVENTION

The present invention has been developed to solve the above described problems. That is, the present invention aims at providing a power supply apparatus for flexibly changing its characteristic or specification. The present invention also aims at realizing a small and low-cost power supply apparatus.

The power supply apparatus according to the present invention includes a power supply circuit for generating DC output according to a pulse signal; a conversion unit for converting an output voltage and an output current of the power supply circuit into digital data; a reference value determination unit for determining a reference value indicating an output voltage from the power supply circuit based on the digital data corresponding to the output current obtained by the conversion unit; and a generation unit for generating a pulse signal to be provided for the power supply circuit based on the difference between the digital data corresponding to the output voltage obtained by the conversion unit and the reference value.

With the above described configuration, the output voltage from the power supply circuit is controlled by a reference value. A reference value also changes with an output current from the power supply circuit. Therefore, an output voltage is controlled based on an output current. The electric potential at an input terminal of a load connected to the power supply circuit is lower than the electric potential at the output terminal of the power supply circuit by the value of the voltage drop in the conductor (wiring pattern) connecting these circuits. This voltage drop depends on an output current. Therefore, a voltage applied to a load can be set in a constant state by appropriately controlling the output voltage based on the output current.

The power supply apparatus according to another embodiment of the present invention includes a power supply circuit for generating DC output according to a given pulse signal; a reference value determination unit for determining a reference value indicating an output voltage from the power supply circuit based on the output voltage; a conversion unit for converting the output voltage into digital data; and a generation unit for generating a pulse signal to be provided for the power supply circuit based on the difference between the digital data obtained by the conversion unit and the reference value. The reference value determination unit determines a speed of an increase in the reference value based on the output voltage in a process of starting the power supply circuit, or a speed of a decrease in the reference value based on the output voltage in a process of disconnecting the power supply circuit.

With the above described configuration, an output voltage of a power supply apparatus is controlled by a reference value. The reference value changes with the power supply apparatus. Therefore, a desired rise or decay pattern of a voltage can be obtained by changing the reference value depending on an output voltage.

Another power supply apparatus according to the present invention is based on the configuration including a power supply circuit in which DC output is controlled by the PWM system. The power supply apparatus includes a conversion unit for converting a parameter relating to the output from the power supply circuit into digital data; an operation unit for computing the duty of a pulse signal to be applied to the power supply circuit based on the difference between the digital data obtained from the conversion unit and the reference value; a cycle determination unit for changing the cycle of the pulse signal with the lapse of time; a generation unit for generating a pulse signal having the cycle obtained from the cycle determination unit and the duty obtained from the operation unit, and providing the signal for the power supply circuit.

With the above described configuration, the frequency of a pulse signal provided for a power supply circuit changes with time with the duty for control of DC output maintained. Therefore, the frequency spectrum of the pulse signal is spread, and the noise is reduced.

BRIEF DESCRIPTION OF THE DRAWINGS

FIG. 12 shows an example of a reference value table;

FIG. 18 is an example of a table storing the correspondence among a temperature, an output current, and a reference value;

FIG. 31 is a flowchart of the process of computing the reference value at the leasing edge of a plurality of power supply circuits;

FIG. 38 shows an example of a cycle storage table;

FIG. 50 shows the state of an electric current obtained in the process according to the flowchart shown in FIGS. 48 and 49.

DESCRIPTION OF THE PREFERRED EMBODIMENTS

The power supply apparatus according to the present embodiment is provided in a device such as a personal computer, etc., and comprises a charger for charging electric energy for a battery provided in the device; and a plurality of DC power supplies each generating a plurality of DC voltages used in the device. The charger and DC power supplies can be collectively referred to as a power supply circuit.

Each power supply circuit maintains each output voltage at a constant level by the PWM (pulse width modulation). In the PWM control for controlling the output voltage, the duty (duty cycle) of the pulse provided for the power supply circuit is normally modified based on the difference between the output voltage of the power supply circuit and the reference voltage. The power supply circuit adjusts the output voltage according to the pulse signal. That is, the feedback control is performed. According to the present embodiment, the processor in the power supply apparatus performs the feedback control.

Figure 2:
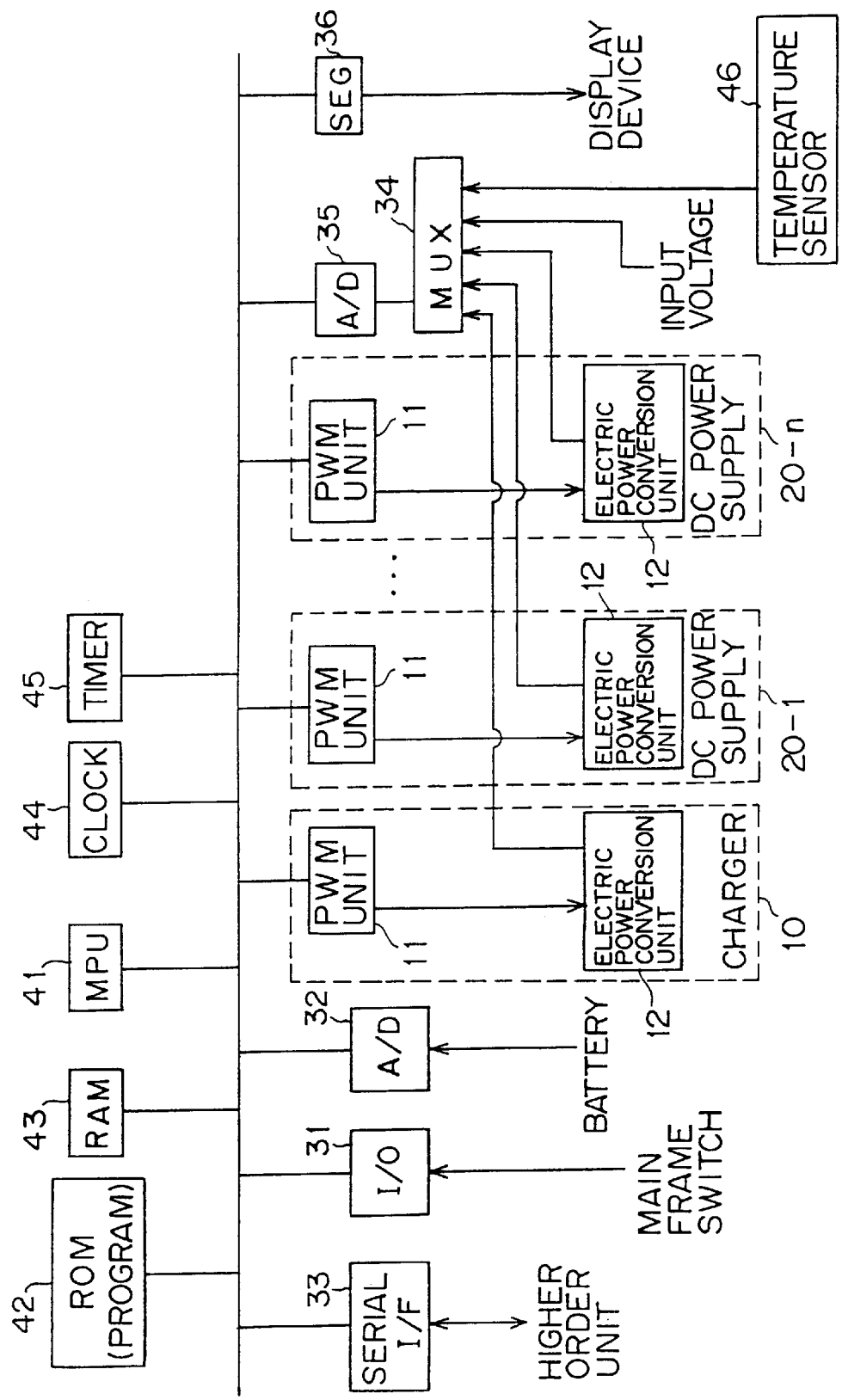
FIG. 2 shows the configuration of the power supply apparatus according to the present embodiment.

FIG. 2 shows the configuration of the power supply apparatus according to the present embodiment. A charger 10 charges a battery (not shown in FIG. 2) provided in the mainframe (personal computer, etc.) comprising the power supply apparatus. DC power supplies 20-1 through 20-n generate respective DC voltages and each of them provides the generated DC voltage for a load. The charger 10 and the DC power supplies 20-1 through 20-n have basically the same configurations, and comprise a PWM unit 11 and an electric power conversion unit 12.

An I/O unit 31 receives an ON/OFF signal from a switch in the mainframe comprising the power supply apparatus, and notifies a processor (MPU) 41 of the signal. An A/D conversion unit 32 converts the information (for example, the remainder in the battery) relating to the battery charged by the charger 10 into digital data, and transmits it to the processor 41. A serial I/F unit 33 controls the transmission and reception of the information between the processor 41 and a higher-order appliance. A higher-order appliance refers to, for example, the CPU (main processor) in the mainframe comprising the power supply apparatus. In this example, the higher-order appliance transmits a signal indicating the reduction of an output voltage to the power supply apparatus when the operation mode is switched from the normal mode to the resume mode.

A multiplexing unit (MUX) 34 receives a signal from the electric power conversion unit 12 in each power supply circuit (the charger 10 and the DC power supplies 20-1 through 20-n), an input voltage provided to each power supply circuit, and an output signal from the temperature sensor 46, and selects and outputs an indicated signal according to the instruction from the processor 41. A signal from the electric power conversion unit 12 is a parameter relating to the output from the power supply circuit. It is, for example, an output voltage, an output current, etc. from each power supply circuit. An A/D conversion unit 35 converts an output from the multiplexing unit 34 into digital data. The digital data converted by the A/D conversion unit 35 is read by the processor 41. A segment controller (SEG) 36 outputs a signal for display of the remainder in the battery, etc. on the display device not shown in FIG. 2.

The processor 41 executes the program stored in ROM 42 using RAM 43. The program executed by the processor 41 stores the procedure of the process for controlling the operation of the power supply apparatus according to the digital data from the I/O unit 31, the A/D conversion unit 32, the serial I/F unit 33, and the A/D conversion unit 35. The program is stored in the ROM area in FIG. 2, and can be designed to be rewritten. Additionally, a DSP (digital signal processor) can be used as the processor 41.

With the above described configuration, the processor 41 performs the sequence control for determining the powering order and disconnecting order of a plurality of power supply circuits, the battery management for monitoring the remainder in a battery, the state monitor/display of each power supply circuit, etc., and controls the output voltage of the power supply circuit so that the output voltage can be maintained at a predetermined level. The power supply apparatus further comprises a clock generation unit 44 for generating a clock signal, a timer 45, and a temperature sensor 46 for detecting the temperature around the power supply apparatus.

Figure 1:
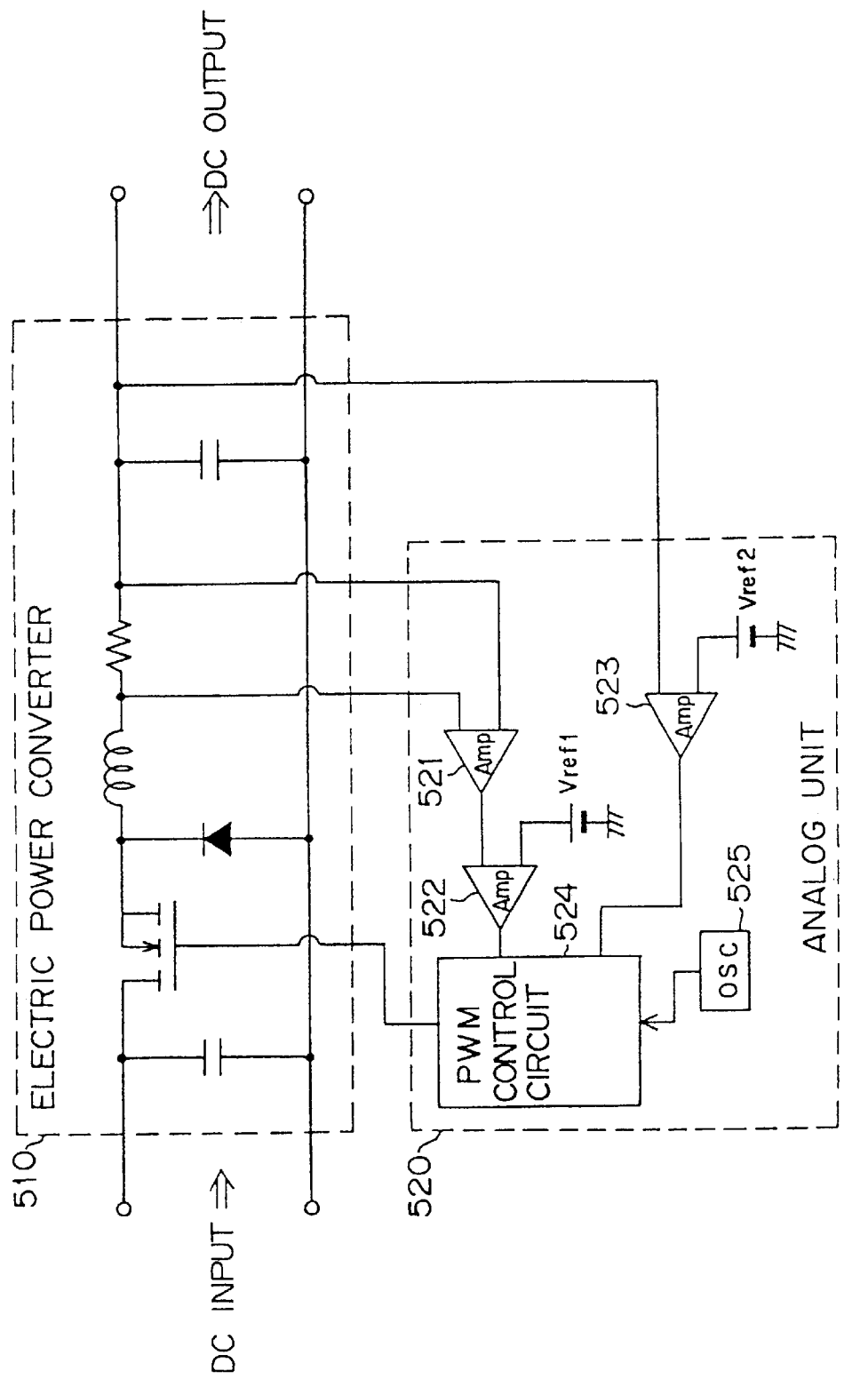
FIG. 1 shows the configuration of the charger or a DC power supply provided in the conventional power supply apparatus.
Figure 3:
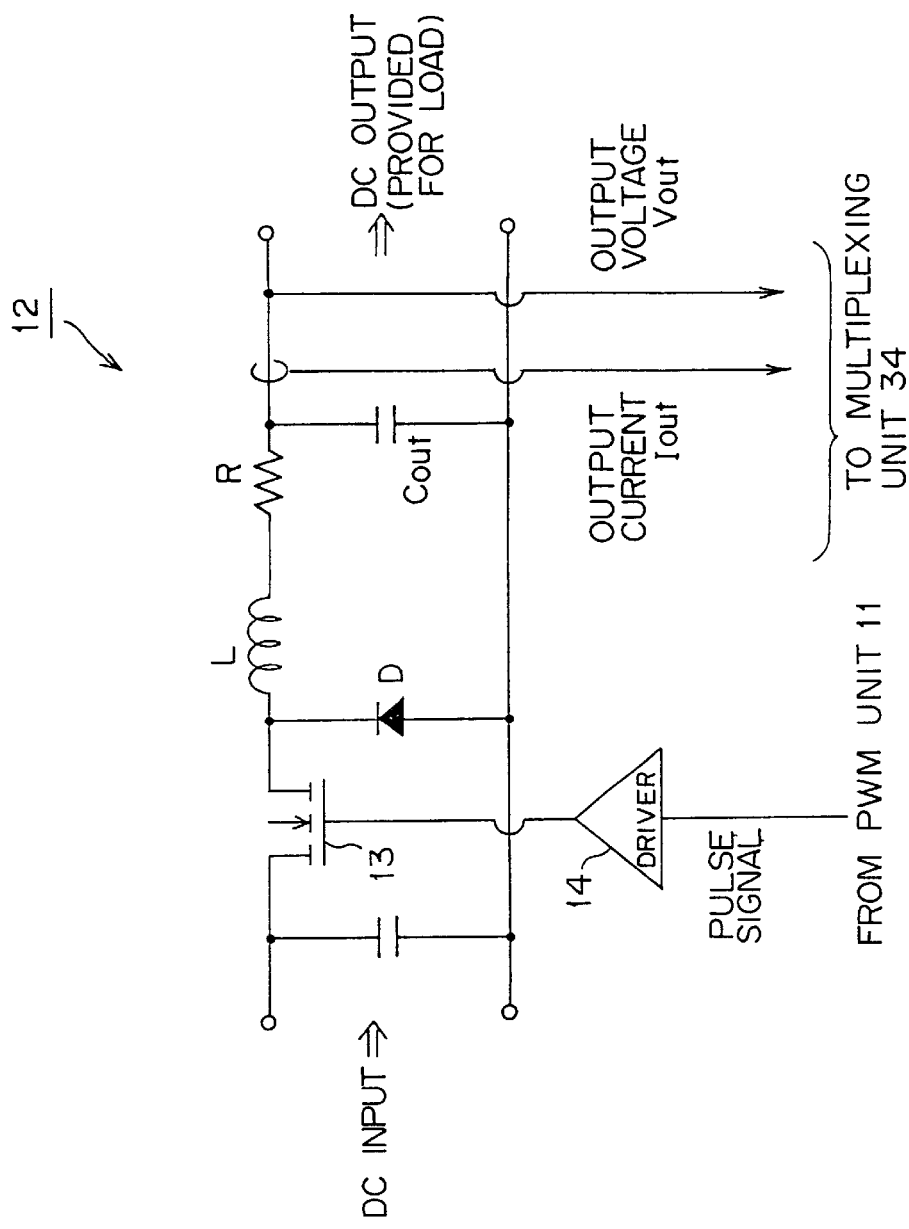
FIG. 3 shows the configuration of the electric power conversion unit.

FIG. 3 shows the configuration of the electric power conversion unit 12. The electric power conversion unit 12 is basically the same as the conventional electric power conversion unit shown in FIG. 1. That is, the electric power conversion unit 12 comprises a switching element 13 (MOSFET in FIG. 3) controlled according to an instruction from the PWM unit 11, a rectifying diode D, an inductor L for storing/discharging energy, a resistor R for detecting an inductor current or an output current, and an output capacitor Cout for smoothing output. The electric power conversion unit 12 comprises a driver (driving circuit) 14 for driving the switching element 13 by amplifying a pulse signal from the PWM unit 11. The above described rectifying diode D can be replaced by a MOS transistor, etc. In this case, two MOS transistors are turned on/off according to switching control signals having opposite phases to each other so that they cannot be simultaneously in an ON or OFF state.

A DC input is generated by an AC/DC converter or a DC/DC converter, and is provided for a load (including a battery).

With the above described configuration, the inductor current is ramped up while the switching element 13 is in the ON state, and an electric current is provided for a load with the residual charge stored in the output capacitor Cout. While the switching element 13 is in the OFF state, the inductor current is ramped down, and the electric current is provided for the load with the charge stored in the output capacitor Cout discharged as necessary. Therefore, the output voltage from the electric power conversion unit 12, that is, the output voltage from each power supply circuit, can be modified according to the ON-to-OFF rate of the switching element 13.

The ON/OFF state of the switching element 13 can be controlled according to a pulse signal generated by the PWM unit 11. In the present embodiment, the H of the pulse signal corresponds to the ON state of the switching element 13, and the L of the pulse signal corresponds to the OFF state of the switching element 13. Thus, the output voltage of the power supply circuit can be controlled according to a ratio between a time period during which the pulse signal is at the H level and a time period during which the pulse signal is at the L level.

In the existing PWM, the duty of a pulse signal provided for a switching element is normally used as a parameter for control of an output voltage of the power supply apparatus. The duty of a pulse signal is normally represented as the ratio of the cycle of the pulse signal to the time during which the signal is at the H level. Therefore, according to the present embodiment, the duty of the pulse signal can be specified by designating the cycle of the pulse signal and the time during which the signal is at the H level. According to the present embodiment, since the H level of the pulse signal corresponds to the ON state of the switching element, the time during which the pulse signal is at the H level can be hereinafter referred to as an ON time. That is, according to the present embodiment, the duty of the pulse signal is designated by specifying the cycle and the ON time of the pulse signal.

In the PWM, the cycle of a pulse signal is normally constant. In this case, the duty of the pulse signal can be adjusted by changing only the ON time. However, in the power supply apparatus according to the present embodiment, the switching frequency of the switching element 12 is not always constant. Therefore, in this case, the duty of the pulse signal is determined by dynamically specifying the cycle and the ON time of the pulse signal. When the switching frequency is changed, the switching frequency is not unconditionally changed. This will be described later in detail.

The electric power conversion unit 12 provides the controlled DC voltage for a load not shown in the drawings, and outputs a parameter relating to the output of the power supply circuit to the multiplexing unit 34. The output voltage is an electric potential of the output terminal of the power supply circuit. The output current is detected by, for example, a current sensor. The current sensor can be realized by a shunt resistor. In this case, the value obtained by dividing the voltage at both ends of the shunt resistor by the resistance value of the shunt resistor corresponds to the output current. These parameters (output voltage and output current) are converted by the A/D conversion unit 35 into digital data. Then, the processor 41 reads the output from the A/D conversion unit M35.

The output current can also be computed by transmitting each potential at both ends of the resistor R shown in FIG. 3 to the processor 41 through the A/D conversion unit 35, and computing through the processor 41 the value by dividing by R the difference of the potential values at both ends of the resistor R. This method has the merit that the number of parts is smaller.

For simple explanation, it is assumed that the electric power conversion unit 12 outputs a voltage value corresponding to the output current Iout of the power supply circuit. The voltage value corresponding to the output current is converted into digital data by the A/D conversion unit 35 at the instruction from the processor 41, and is read by the processor 41.

Figure 4:
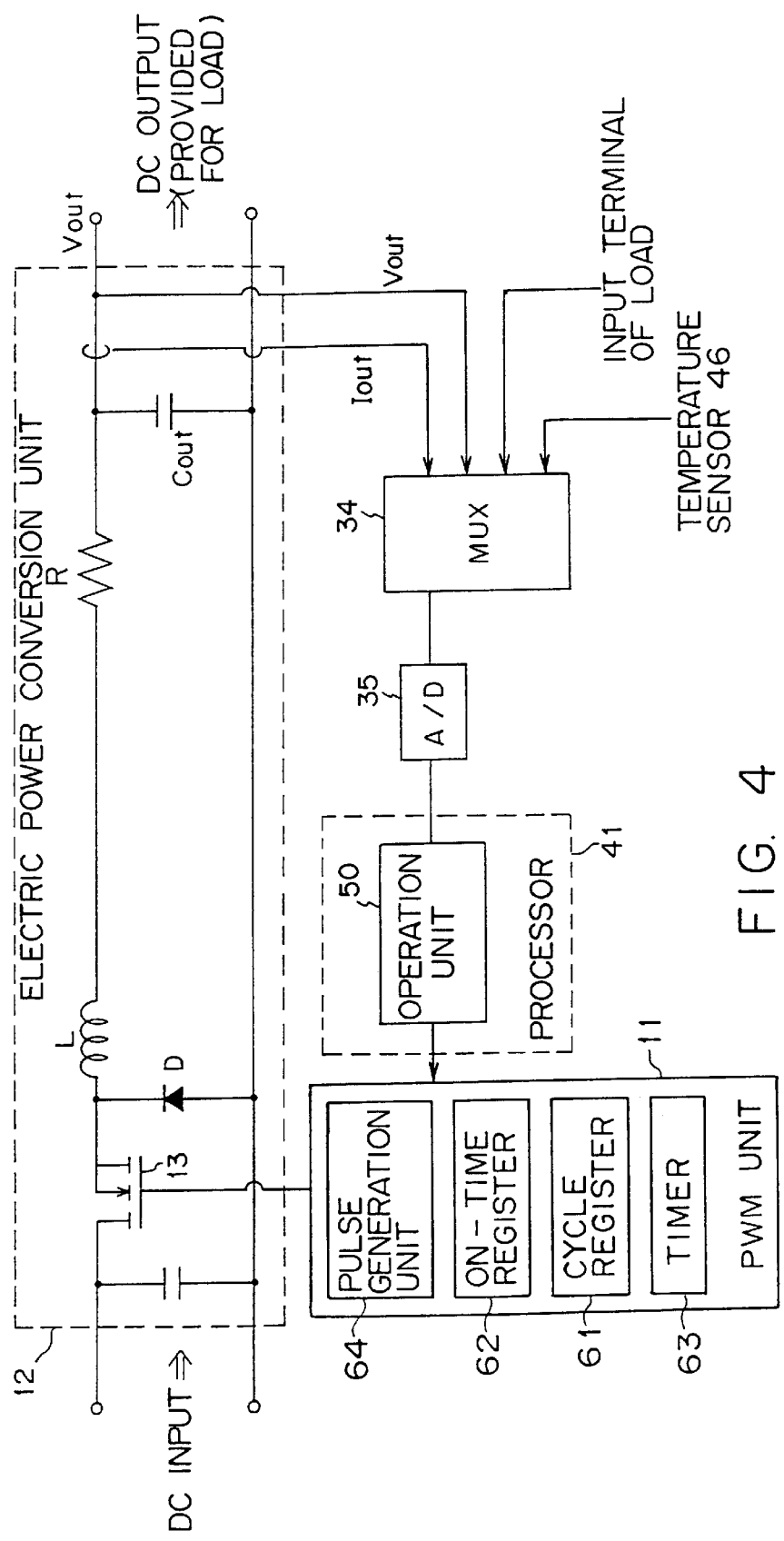
FIG. 4 shows the control of the output voltage according toucan embodiment of the present invention.

FIG. 4 shows the output voltage control according to the embodiment of the present invention. In this example, the charger 10 and an optional one of the power supply circuits of the DC power supplies 20-1 through 20-n of the charger 10 shown in FIG. 2 are explained selectively. In FIG. 4, the elements not directly associated with the output voltage control are omitted.

The operation unit 50 is realized by the processor 41 executing a predetermined program stored in the ROM 42, and generates a signal (data) for control of the output voltage from the power supply circuit. Practically, the operation unit 50 operates the duty of the pulse signal for control of the switching element 13 of the electric power conversion unit 12. A parameter used in the present embodiment is an output voltage and an output current of the power supply circuit.

The output voltage and current of the power supply circuit, the output from the temperature sensor 46, and an applied voltage of a load are input to the multiplexing unit 34. The processor 41 transmits a selection signal to the multiplexing unit 34 on each sampling cycle. The sampling cycle is, for example, 50 μsec. The multiplexing unit 34 selects an input signal according to the selection signal from the processor 41. In the input signals input to the multiplexing unit 34, the 'output voltage' is always selected for each sampling, and other signals are selected as necessary.

The output from the multiplexing unit 34 is converted into digital data by the A/D conversion unit 35. The processor 41 reads the output from the A/D conversion unit 35.

When the processor 41 reads the digital data from the A/D conversion unit 35, it activates the operation unit 50, and calculates the duty of the pulse signal. The 'output voltage' is used in this calculation. However, the 'output current', 'temperature', and 'applied voltage to a load' can also be used as necessary in a calculation performed when the duty is determined. The method of performing the calculation is described later.

When the operation unit 50 determines the duty of the pulse signal to be provided for the switching element 13, it computes the 'on-time' based on the duty. The on-time can be obtained by the following equation.

$$Ton = D/Ts$$

where D indicates the duty of the pulse signal provided for the switching element 13, and Ts indicates the cycle of the pulse signal.

The 'on-time Ton' computed by the operation unit 50 is written to the on-time register 62 of the PWM unit 11.

The PWM unit 11 comprises a cycle register 61, the on-time register 62, a timer 63, and a pulse generation unit 64. The cycle register 61 is a storage area for storing cycle information which indicates the cycle of an output pulse signal. The cycle of the pulse signal is the switching cycle of the switching element 13, and is written to the cycle register 61 in the initialization sequence of the power supply apparatus. The cycle register 61 can be designed to be updated by the operation unit 50. The on-time register 62 is a storage area for storing on-time information which indicates the on-time computed by the reference voltage register 51. The timer 63 counts the elapsed time from the leading edge to the trailing edge of a generated pulse signal. The pulse generation unit 64 uses the timer 63 to generate the pulse signal based on the cycle information stored in the cycle register 61 and the on-time information stored in the on-time register 62.

As described above, the output from the PWM unit 11 is used as a switching signal for control of the switching element 13 in the electric power conversion unit 12.

Figure 5:
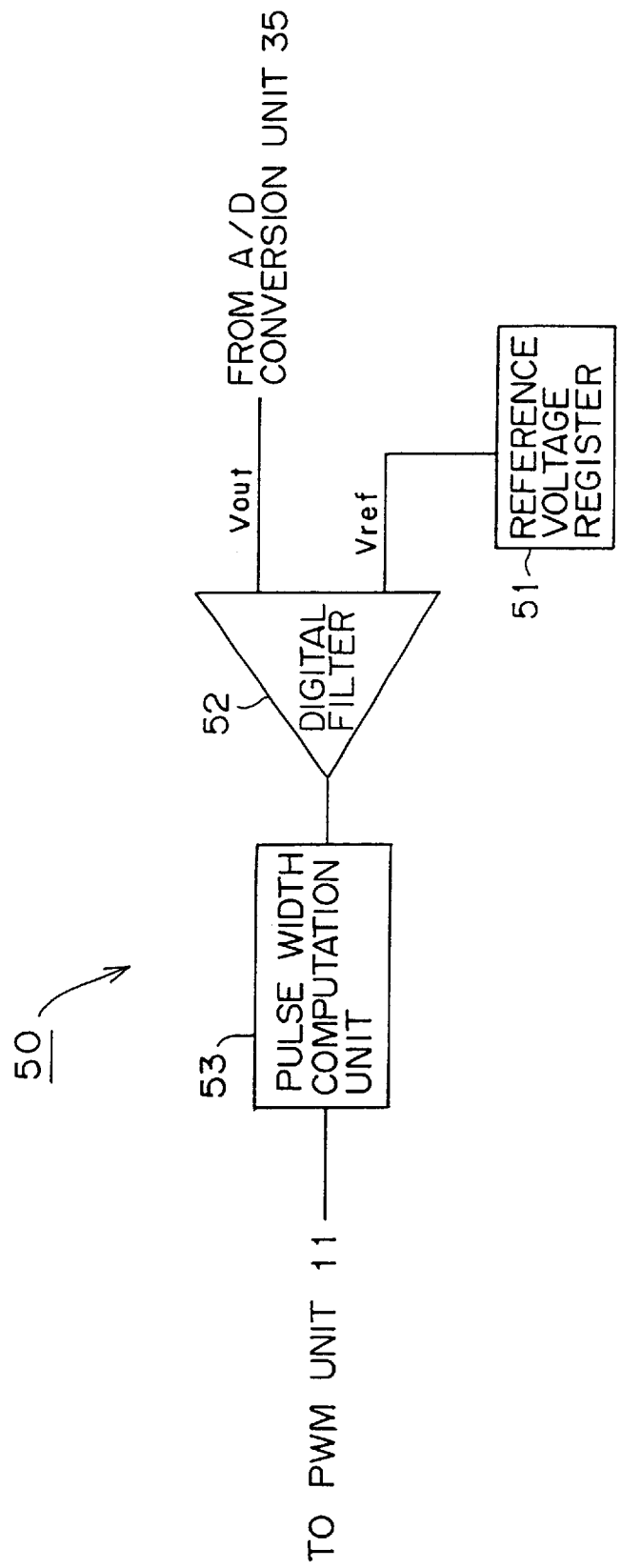
FIG. 5 shows the basic configuration of an operation unit.

FIG. 5 shows the basic configuration of the operation unit 50. The operation unit 50 comprises a reference voltage register 51, a digital filter 52, and a pulse width computation unit 53. The reference voltage register 51 stores a reference value Vref indicating an output voltage to be maintained by the power supply circuit. Assuming that, for example, the output voltage to be maintained by the power supply circuit is 5V, the reference value Vref refers to the digital data which will be obtained if '5V' is input to the A/D conversion unit 35.

The output voltage of the power supply circuit is feedback controlled such that the voltage can match the reference value Vref. That is, the operation unit 50 obtains and outputs the duty (on-time of the pulse signal provided for the switching element 13) depending on which the output voltage Vout of the power supply circuit matches the reference value Vref. Therefore, when the reference value Vref is changed, the output voltage Vout of the power supply circuit is changed correspondingly.

The digital filter 52 amplifies and outputs the difference between the output voltage Vout and the reference value Vref. The digital filter 52 is basically designed to implement the characteristic (especially the G-Φ characteristic) of the amplifier 523 used in the conventional power supply apparatus shown in FIG. 1. The pulse width computation unit 53 computes the 'on-time Ton' based on the output from the digital filter 52. The on-time refers to a time during which the switching element 13 is in an ON state on the switching cycle of the switching element 13. The pulse width computation unit 53 writes the on-time to the on-time register 62 of the PWM unit 11.

Figure 6A:
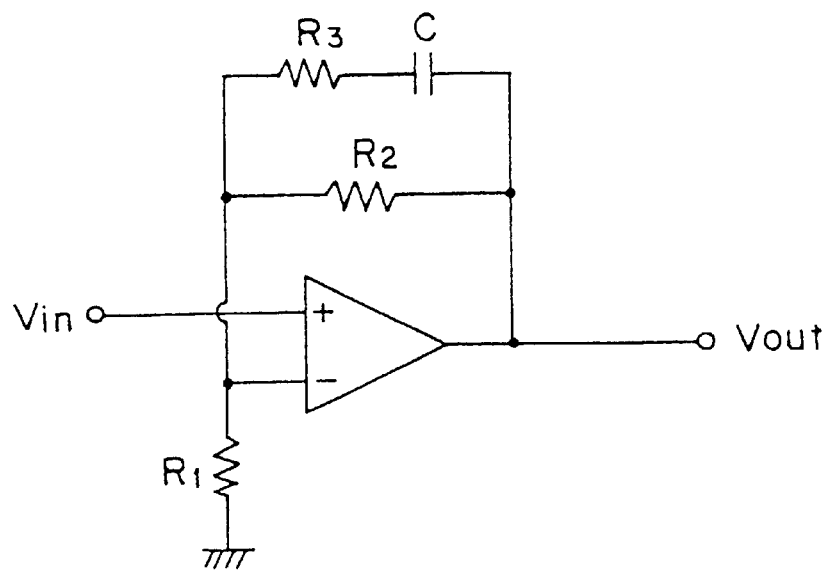
FIG. 6A shows a practical circuit of an amplifier used in the conventional power supply apparatus.

Described below is the method of realizing the operation unit 50. As described above, the digital filter 52 is basically designed to implement the characteristics as is (especially the G-Φ characteristic) of the amplifier 523 used in the conventional power supply apparatus shown in FIG. 1. FIG. 6A shows an example of a practical circuit of the amplifier 523 used in the conventional power supply apparatus. The transfer function of the analog amplifier is described below.

$$G_{(s)} = \frac{R_1 + R_2}{R_1} \cdot \frac{1 + sc(R_3 + R_1 // R_2)}{1 + sc(R_2 + R_3)}$$

$$= \frac{\alpha(1 + s\gamma)}{1 + s\beta}$$

$$G(j\omega) = \frac{\alpha\{1 + \omega^2\beta\gamma + j\omega(\gamma - \beta)\}}{1 + \omega^2\beta^2}$$

$$\left(\alpha = \frac{R_1 + R_2}{R_1}, \ \gamma = c(R_3 + R_1 // R_2), \ \beta = c(R_2 + R_3)\right)$$

As a digital filter, for example, an FIR (finite impulse response) filter and an IIR (infinite impulse response) filter are popular. The digital filter 52 can be realized by either of them, but the IIR filter is used in the present embodiment.

To assign the characteristics of an analog amplifier (analog filter) to an IIR filter, the s-z transformation is adopted. The s-z transformation refers to a method of converting a transfer function G(s) of an analog filter in an s area into a z area.

Figure 6B:
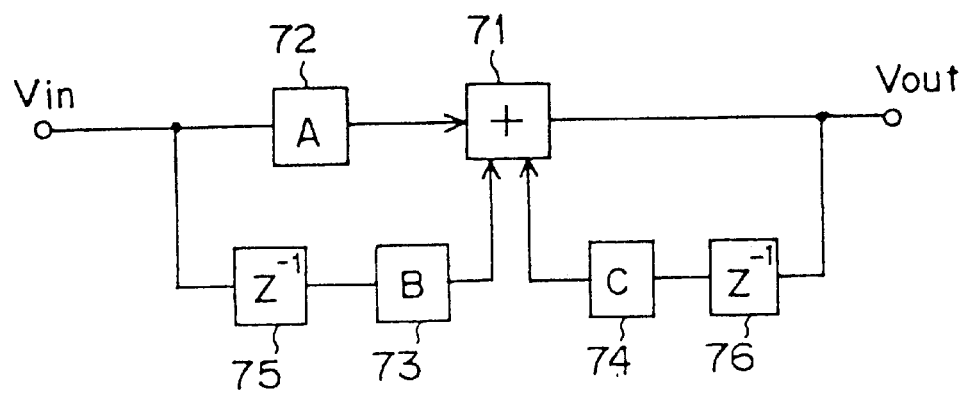
FIG. 6B shows a digital filter equivalent to the amplifier generated using the IIR and shown in FIG. 5.

FIG. 6B shows a digital filter which is generated using the IIR and is equivalent to the amplifier (analog filter) shown in FIG. 6A. The digital filter comprises an adder 71, factor multipliers 72 through 74, and unit delay elements 75 and 76. The method of replacing the amplifier shown in FIG. 6A with the digital filter shown in FIG. 6B is well-known, but is described below for confirmation.

Described below is the transfer function in the z area.

$$s = \frac{2(1 - Z^{-1})}{T_s(1 + Z^{-1})} \quad (1)$$

$$G_{(z)} = \frac{R_1 + R_2}{R_1} \cdot$$

$$\frac{T_s + 2c(R_3 + R_1 // R_2) + \{T_s - 2c(R_3 + R_1 // R_2)\} \cdot Z^{-1}}{T_s + 2c(R_2 + R_3) + \{T_s - 2c(R_2 + R_3)\} \cdot Z^{-1}}$$

$$= \frac{\alpha \cdot \{T_s + 2\gamma + (T_s - 2\gamma) \cdot Z^{-1}\}}{T_s + 2\beta + (T_s - 2\beta) \cdot Z^{-1}}$$

$$= \alpha \cdot \frac{T_s - 2\gamma}{T_s - 2\beta} \cdot \frac{\frac{T_s + 2\gamma}{T_s - 2\gamma} + Z^{-1}}{\frac{T_s + 2\beta}{T_s - 2\beta} + Z^{-1}}$$

$$= \alpha \cdot a \cdot \frac{b + Z^{-1}}{c + Z^{-1}}$$

-continued $$\left[a = \frac{T_s - 2\gamma}{T_s - 2\beta}, \quad b = \frac{T_s + 2\gamma}{T_s - 2\gamma}, \quad c = \frac{T_s + 2\beta}{T_s - 2\beta}\right] \quad (2)$$

$$G(e^{jwT_s}) = \alpha \cdot a \frac{b + \cos(\omega T_s) - j \cdot \sin(\omega T_s)}{c + \cos(\omega T_s) - j \cdot \sin(\omega T_s)}$$

$$= \frac{\alpha \cdot a\{(b + \cos(\omega T_s)) \cdot (c + \cos(\omega T_s)) + \sin^2(\omega T_s) + j(b-c) \cdot \sin(\omega T_s)\}}{(c + \cos(\omega T_s))^2 + \sin^2(\omega T_s)}$$

The following results are obtained by the above listed equations (1) and (2).

$$Y_{(n)} = \frac{\alpha \cdot a \cdot b}{c} \cdot x_{(n)} + \frac{\alpha \cdot a}{c} \cdot x_{(n-1)} - \frac{1}{c} \cdot Y_{(n-1)} \quad (3)$$

$$= A \cdot x_{(n)} + B \cdot x_{(n-1)} - C \cdot Y_{(n-1)}$$

$$A = \frac{R_1 + R_2}{R_1} \cdot \frac{T_s + 2c(R_3 + R_1 // R_2)}{T_s + 2c(R_2 + R_3)} \quad (4)$$

$$B = \frac{R_1 + R_2}{R_1} \cdot \frac{T_s - 2c(R_3 + R_1 // R_2)}{T_s + 2c(R_2 + R3)} \quad (5)$$

$$C = -\frac{T_s - 2c(R_2 + R_3)}{T_s + 2c(R_2 + R_3)} \quad (6)$$

The configuration shown in FIG. 6B can be obtained by the equation (3) above. The factors set by the factor multipliers 72 through 74 are represented by the equations (4) through (6) above.

The equation (3) above (including the equations (4) through (6)) is described in a software program, and the digital filter 52 can be realized by the processor 41 performing the program. Thus, according to the present embodiment, the operations and the characteristics of an analog amplifier used in the conventional power supply apparatus are described by a software program, and the program is executed to provide the operations of the analog amplifier. Therefore, the characteristics of the analog amplifier can be amended simply by rewriting the program.

Figure 7:
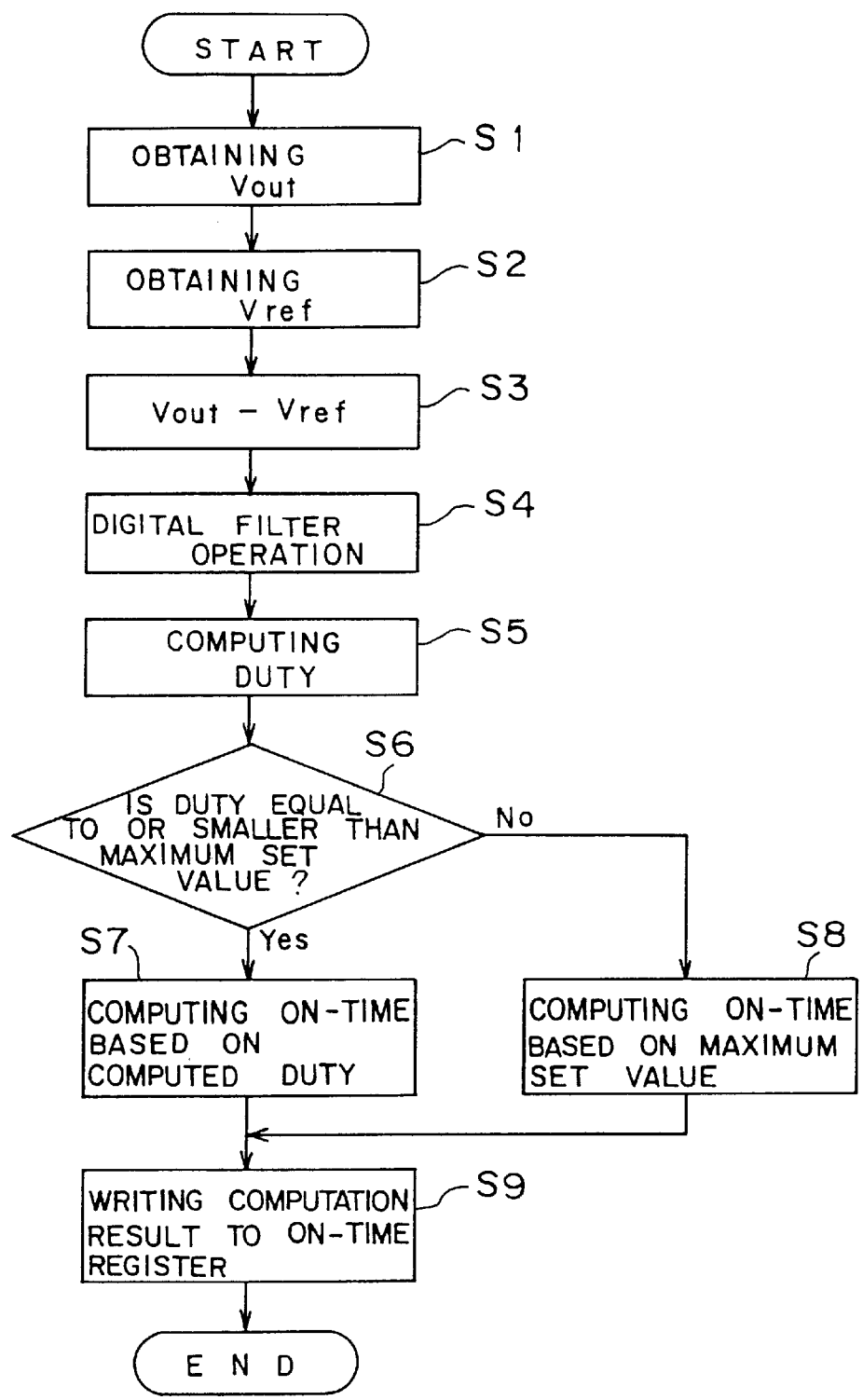
FIG. 7 is a flowchart showing the basic operation performed by the operation unit.

FIG. 7 is a flowchart showing the operation of the operation unit 50. In this example, as described by referring to FIG. 4, an optional power supply circuit in the DC power supplies 20-1 through 20-n is selected for description. It is assumed that the reference value Vref is stored in the reference voltage register 51. The process shown in this flowchart is performed for each of the very short intervals (for example, 50 μsec.) by a timer interruption, etc.

An output voltage Vout is obtained in step S1. Practically, the processor 41 first notifies the multiplexing unit 34 that the output voltage Vout of the power supply circuit is selected. The output voltage from the power supply circuit, the voltage Vs shown in FIG. 3, the applied voltage of an input terminal of a load, and the output signal from the temperature sensor 46 are input to the multiplexing unit 34. According to the notification from the processor 41, the multiplexing unit 34 outputs the output voltage from the power supply circuit to the A/D conversion unit 35. The processor 41 reads digital data (output voltage Vout), that is, the conversion result from the A/D conversion unit 35.

The reference value Vref is obtained from the reference voltage register 51 in step S2. In step S3, the difference between the output voltage Vout obtained in step S1 and the reference value Vref obtained in step S2 is computed. In step S4, an operation for a digital filter is performed. In this process, the computation result in step S3 is input to the digital filter shown in FIG. 6B. Practically, the computation result in step S3 is substituted for the equation (3) above.

Figure 8:
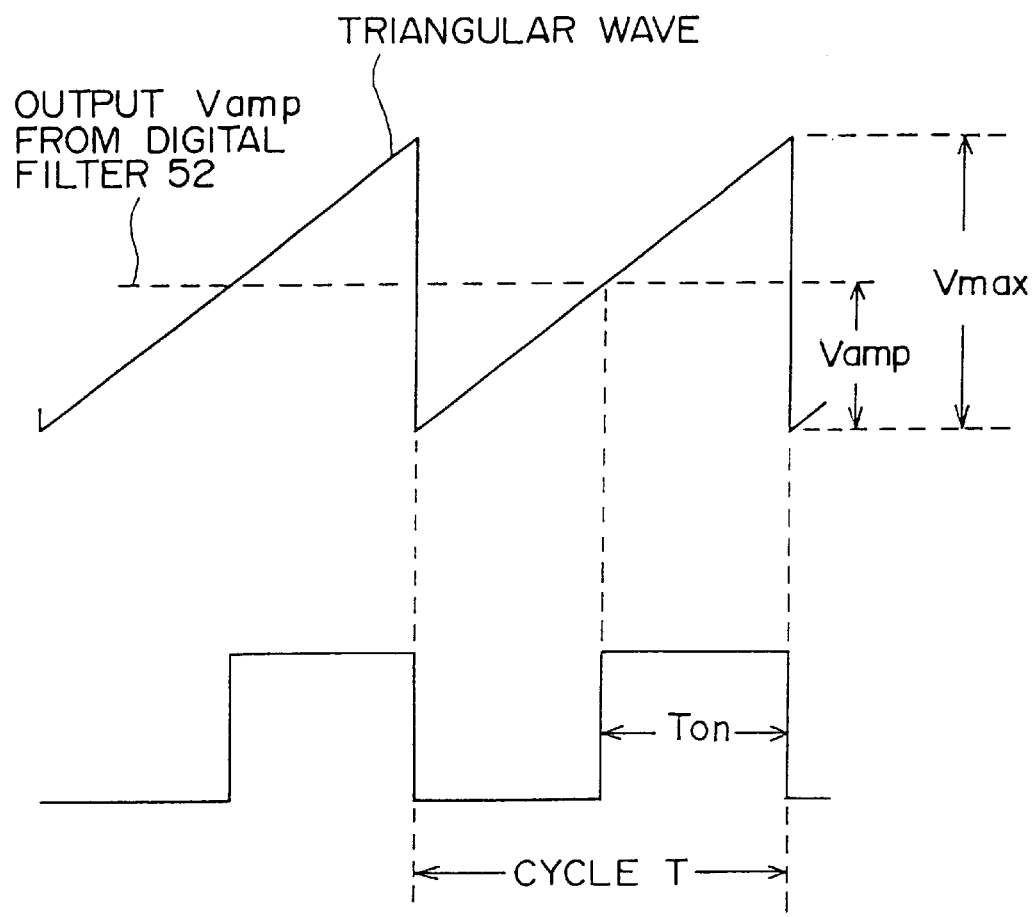
FIG. 8 shows the duty of a pulse signal.

In step S5, the duty of the pulse signal generated by the PWM unit 11 is computed based on the result of the operation for the digital filter. Briefly described below by referring to FIG. 8 is the duty of the pulse signal.

The pulse signal is normally generated using a triangular wave in an analog circuit. Using a triangular wave, the process performed in step S5 corresponds to the process of comparing the level of the triangular wave with the result of the operation by the digital filter. Assuming that the output from the digital filter 52 is Vamp, the cycle of the triangular wave is T, and the maximum value of the triangular wave is Vmax, the duty of the generated pulse signal is represented by the following equation.

$$D = Ton/T = (Vmax - Vamp)/Vmax \quad (7)$$

Therefore, according to the present embodiment, the duty of a pulse signal is obtained using a predetermined maximum value Vmax of the triangular wave by substituting the output from the digital filter 52 in the equation (7) above.

In step S6, it is checked whether or not the duty obtained in step S5 is equal to or smaller than a predetermined maximum set value. If it is determined that the duty obtained in step S5 is equal to or smaller than the predetermined maximum set value, then the on-time Ton is computed using the computed duty by the equation (7) above in step S7. That is, the operation Ton=D·T is performed. On the other hand, when the duty obtained in step S5 is larger than the predetermined value, the on-time Ton is obtained using the maximum set value Dmax instead of the duty D obtained in step S5. That is, the operation Ton=Dmax·T is performed.

In step S9, the on-time computed in step S7 or S8 is written to the on-time register 62 in the PWM unit 11.

The processes in the above described steps S1 through S9 are repeated at predetermined very short intervals. Therefore, the on-time corresponding in real time to the output voltage of a power supply circuit is constantly written to the on-time register 62. The above described process is cyclically performed on a plurality of power supply circuits. Each operation result is written to the on-time register 62 of the PWM unit 11.

Figure 9A:
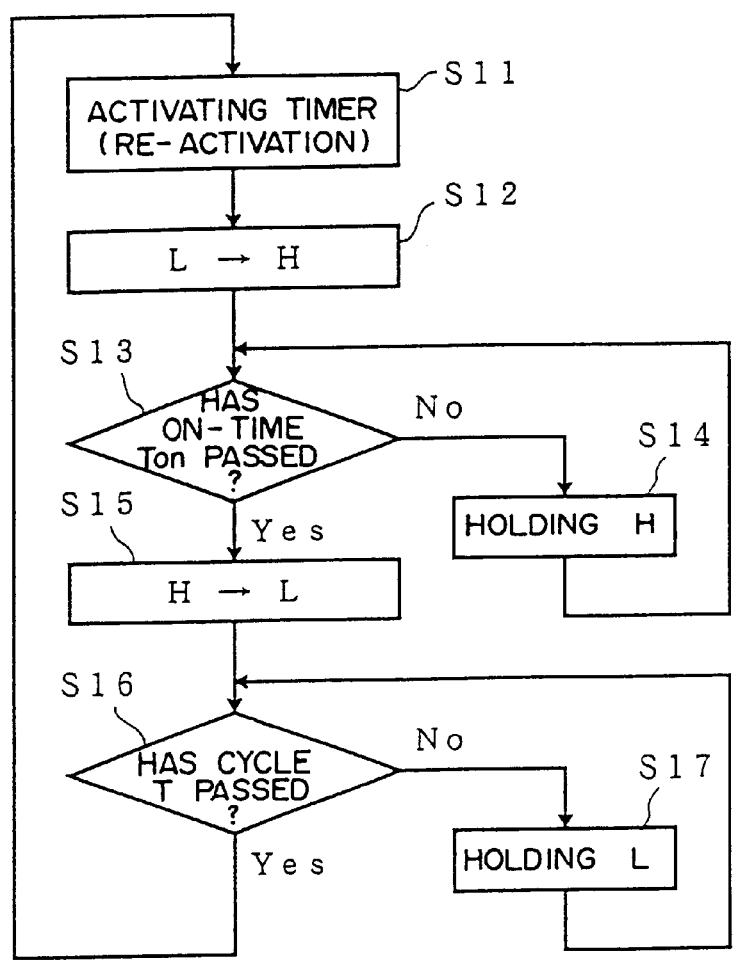
FIG. 9A is a flowchart showing the operation performed by the pulse generation unit.

FIG. 9A is a flowchart showing the operations of the pulse generation unit 64. In step S11, the timer 63 is activated. Upon activation of the timer, the output from the PWM unit 11 is switched from the L level to the H level in step S12. In steps S13 and S14, the output from the PWM unit 11 is maintained at the H level until the time that has passed since the activation of the timer 63 reaches the on-time Ton stored in the on-time register 62.

When the time that has passed since the activation of the timer 63 reaches the on-time Ton, the output from the PWM unit 11 is switched from the H level to the L level in step S15. In steps S16 and S17, the output from the PWM unit 11 is maintained at the L level until the time that has passed since the activation of the timer 63 reaches the cycle T stored in the cycle register 61. When the time that has passed since the activation of the timer reaches the cycle T, control is passed to step S11 to re-activate the timer 63.

Figure 9B:
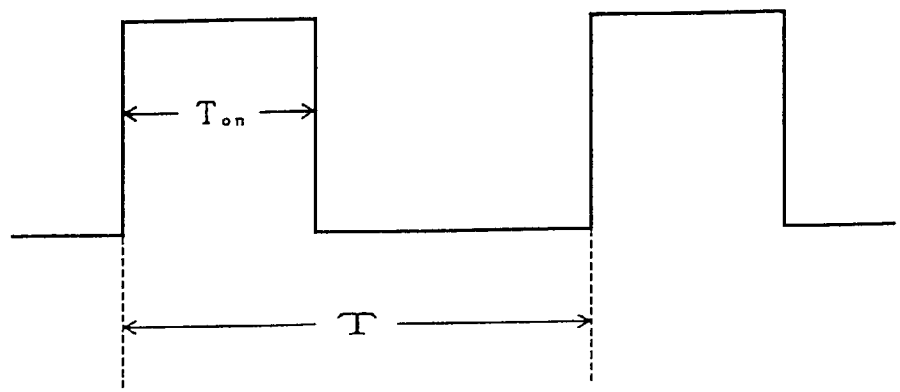
FIG. 9B shows an example of a generated pulse signal.

The pulse signal shown in FIG. 9B is generated by repeatedly performing the above described processes. According to the pulse signal, the switching element 13 of the electric power conversion unit 12 is controlled.

As described above, the power supply apparatus according to the present embodiment generates in a software process a pulse signal for control of the switching element 13. Therefore, the output voltage of each power supply circuit can be set, and the switching frequency, the response characteristics of the switching element 13 can be easily altered only by re-writing the program to be executed by the processor 41. For example, an output voltage can be determined by setting the reference value Vref. A switching frequency can be determined by setting the frequency of the triangular wave shown in FIG. 8. A response characteristic changes with a factor of the digital filter shown in FIG. 6B.

Thus, the operation unit 50 and the PWM unit 11 of the power supply apparatus according to the present embodiment performs the functions of the analog unit of the conventional power supply apparatus. As a result, the entire circuit can be smaller. Furthermore, according to the present embodiment, the analog unit of the conventional power supply apparatus is described in the software program. Therefore, even if it is necessary to amend the function provided by the conventional analog circuit, it can be easily amended only by re-writing the program.

Described below are the operations directly related to the power supply apparatus according to the present invention. The power supply apparatus according to the present invention is based on the configuration explained by referring to FIGS. 2 through 9. The characteristics and specification of the power supply apparatus can be flexibly amended by the operations of the operation unit 50, that is, by the program to be executed by the processor 41. Three embodiments are described below.

First Embodiment

The first embodiment relates to the technology of improving the precision in voltage, and more specifically to the technology of improving the precision in an output voltage of a power supply apparatus, and improving the precision in a voltage applied to a load.

As described above, the power supply apparatus according to the present embodiment maintains an output voltage Vout at a constant value using the voltage of an output terminal of the power supply circuit. Therefore, the voltage of the output terminal of the power supply circuit can be correctly controlled.

Figure 10:
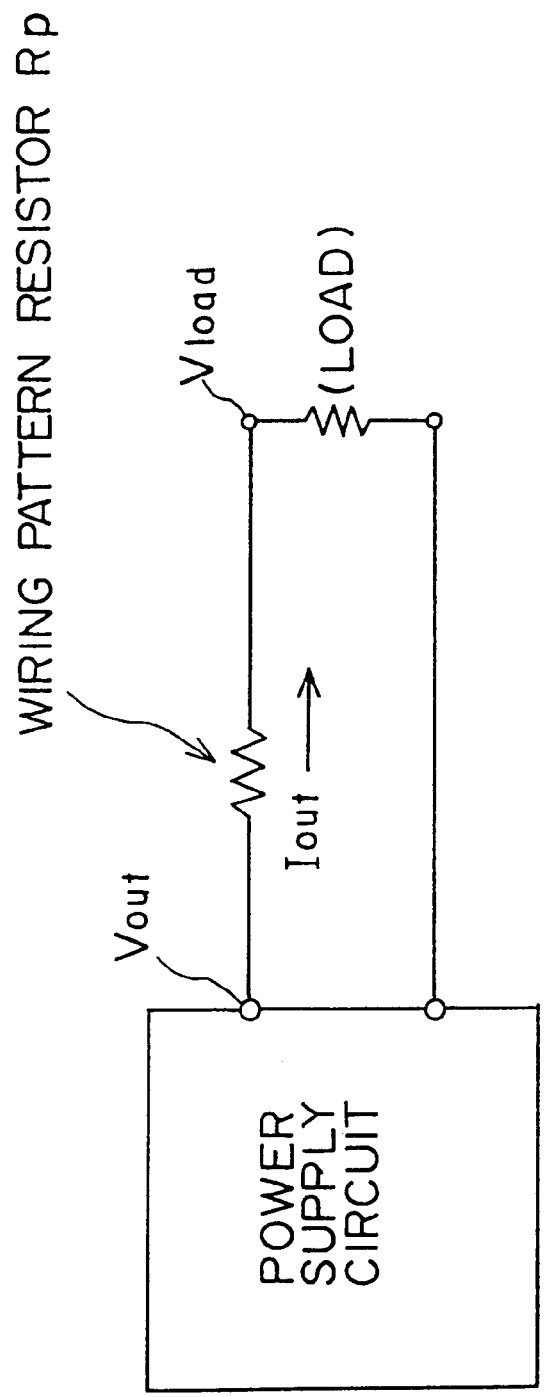
FIG. 10 shows the connection between the power supply apparatus and its load.

However, the power supply apparatus is connected to a load through a conductor (hereinafter referred to as a wiring pattern) such as a wiring pattern, a lead, etc. normally formed on a circuit substrate. A wiring pattern is a conductor, but its resistance value is not 0. That is, as shown in FIG. 10, a resistor of a wiring pattern exists between the power supply circuit and the load. When an electric current flows through the wiring pattern, the voltage drops. Therefore, the voltage Vload applied to the input terminal of the load becomes lower by the voltage drop than the voltage Vout of the output terminal of the power supply apparatus.

The voltage drop at the wiring pattern can be computed as follows.

$$Vout - Vload = Iout \cdot Rp$$

where Rp indicates the resistor of the wiring pattern, and Iout indicates the output current of the power supply apparatus.

Thus, the voltage drop at the wiring pattern changes with the output current of the power supply circuit.

With the above described condition taken into account, the power supply circuit according to the present embodiment has the function of maintaining the voltage applied to the input terminal of the load at a constant value even when the output current of the power supply circuit changes. Practically, the power supply circuit provides the function of controlling the output voltage Vout with the following equation satisfied.

$$Vout = Vload + Iout \cdot Rp$$

where Vload is a fixed value indicating the voltage required by the load.

Figure 11:
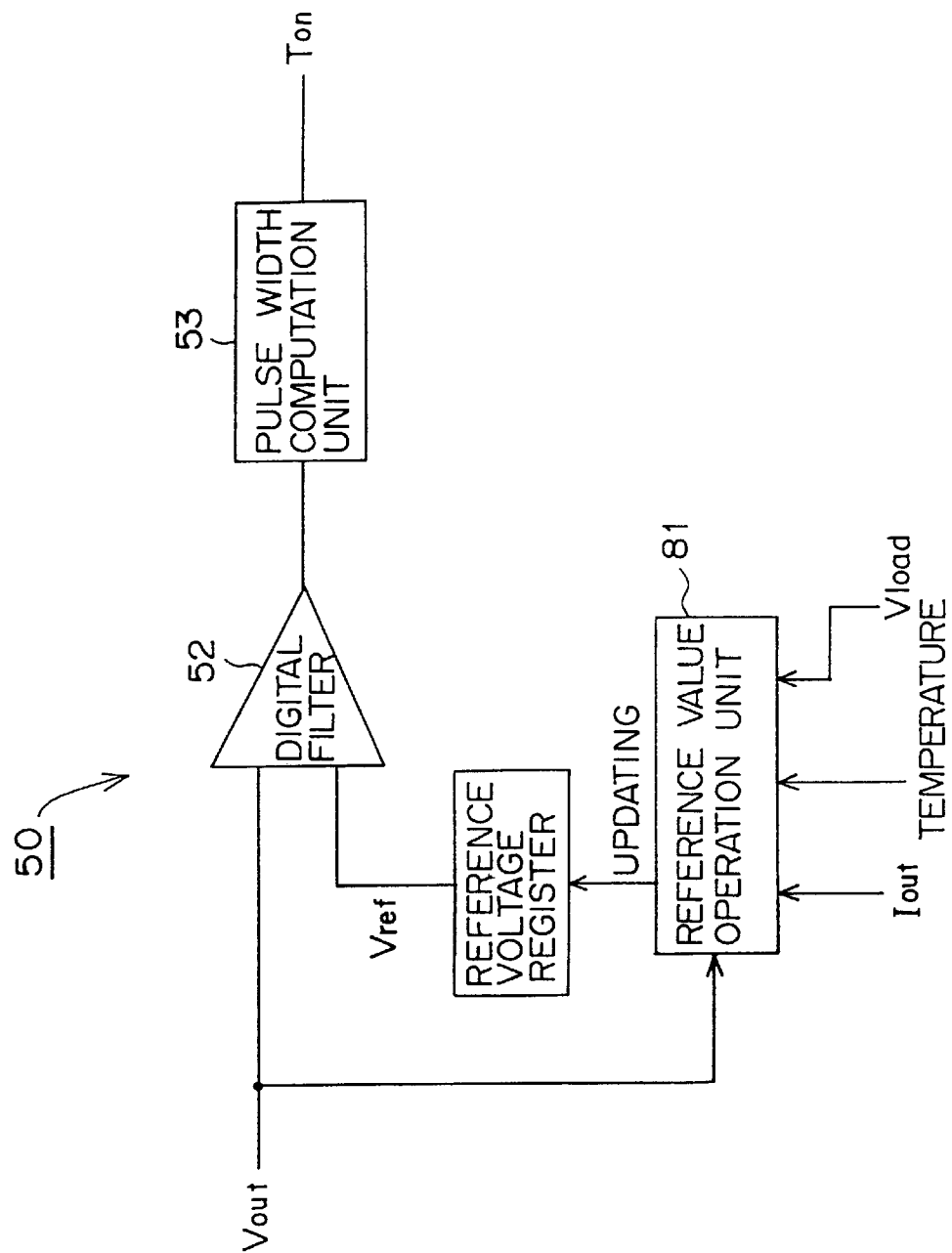
FIG. 11 is a block diagram showing the operation unit for realizing the first embodiment of the present invention.

FIG. 11 is a block diagram showing the operation unit for realizing the first embodiment of the present invention. The operation unit according to the first embodiment comprises a reference value operation unit 81 in addition to the above described reference voltage register 51, digital filter 52, and pulse width computation unit 53. The reference value operation unit 81 is realized by the processor 41 executing a predetermined program. Therefore, a number of variations of reference value operation methods can be obtained by rewriting the program. Described below are some of the variations.

FIG. 12 shows an example of a reference value table for storing the correspondence between an output current and a reference value. In this example, the load requires a voltage of 5.0V and the resistor of the wiring pattern between the power supply apparatus and the load is 0.01Ω.

Figure 13:
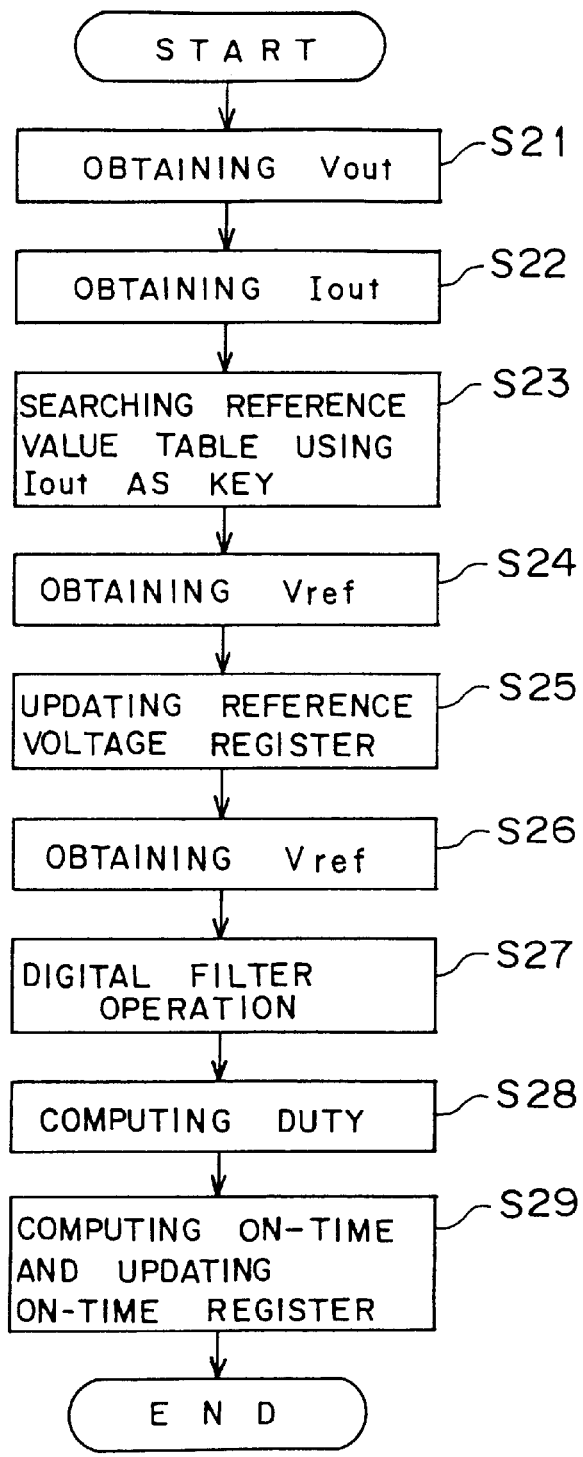
FIG. 13 is a flowchart showing the operation of the operation unit according to the first embodiment of the present invention.

FIG. 13 is a flowchart showing the operations of the operation unit according to the first embodiment of the present invention. The process shown by the flowchart is repeatedly performed at predetermined intervals (for example at 50 μsec. intervals) by a timer interruption, etc. The process shown by the flowchart is performed by adding steps S22 through S25 to the flowchart showing the basic operations of the operation unit 50 shown in FIG. 7.

In step S21, the output voltage Vout of a power supply circuit is obtained as in step S1 shown in FIG. 7. In step S22, the output current Iout of the power supply circuit is obtained. These steps practically contain a process of transmitting a selection instruction to the multiplexing unit 34, and a process of reading the output from the A/D conversion unit 35 after the selection instruction. In steps S23 and S24, the reference value table shown in FIG. 12 is searched using the output current Iout obtained in step S22 as a key to obtain a reference value corresponding to the output current. For example, when the output current Iout obtained in step S22 is 0.1A, 5.001 is obtained as a reference value Vref.

In step S25, the reference value operation unit 81 shown in FIG. 11 is updated using the reference value Vref obtained in step S24. Thus, a reference value corresponding to the output current from a power supply circuit is written to the reference value operation unit 81.

The processes in steps S26 through S29 are basically the same as those in steps S2 through S9 shown in FIG. 7. That is, the difference between the output voltage Vout and the reference value Vref is amplified using the digital filter 52, and an on-time is computed based on the output from the digital filter 52. The computed on-time is written to the on-time register 62. The process of the PWM unit 11 generating a pulse signal based on the on-time written to the on-time register 62 is described above.

The power supply apparatus according to the present embodiment is a feedback system, and the output voltage Vout is controlled such that it matches the reference value Vref. Therefore, when the output current Iout is, for example, 0.1A, the output voltage Vout of the power supply circuit is controlled to be 5.001V. In this case, the voltage drop in the wiring pattern connecting the power supply apparatus with the load is 0.001V. Therefore, 5.000V is applied to the input terminal of the load.

In the process flow shown in FIG. 13, it is not necessary to perform the process of updating the reference value Vref (step S22 through S25) for every process flow. For example, the reference value Vref can be updated when the process of computing the on-time based on the output voltage Vout is performed a predetermined number of times.

Figure 14:
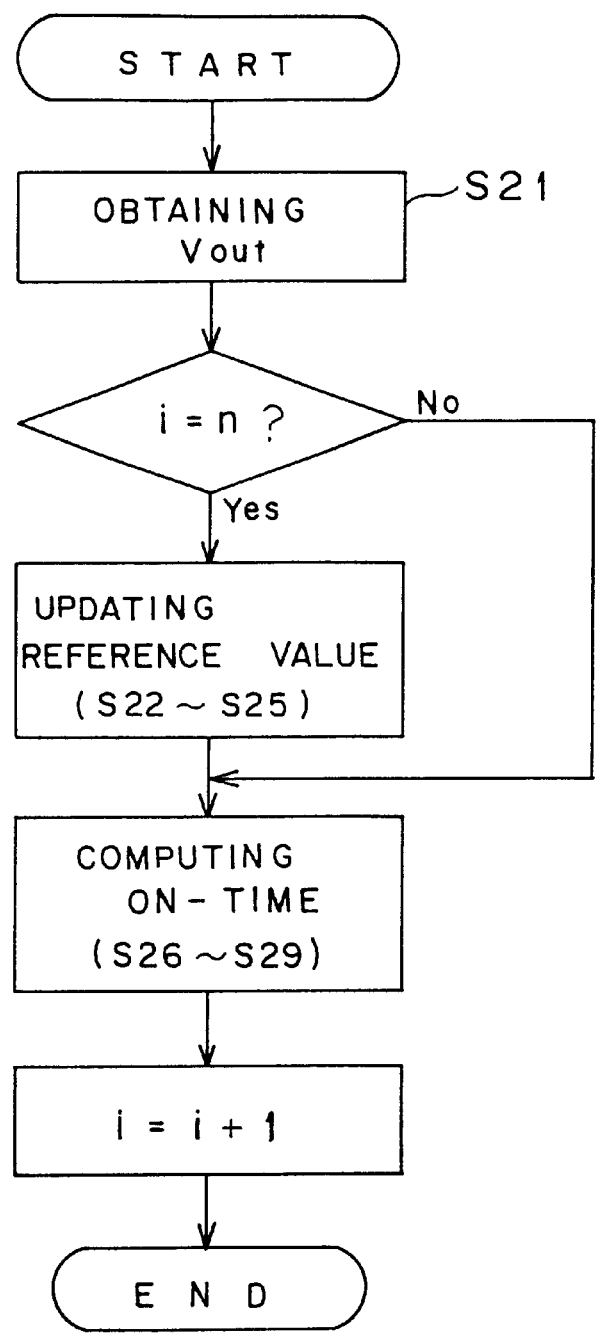
FIG. 14 is a flowchart of the case where the reference value Vref is updated at a lower frequency.

FIG. 14 is a flowchart of the process in which the reference value Vref is updated less frequently. In this case, a counter for counting the frequency at which the process of computing the on-time is performed is provided. The process in steps S22 through S25 is performed only when the count value reaches a predetermined value.

The power supply apparatus according to the above described embodiment is provided with the reference value table shown in FIG. 12 to obtain a reference value corresponding to a detected output current. However, the power supply apparatus can also be designed to compute a reference value each time the output current is detected without the reference value table.

Figure 15:
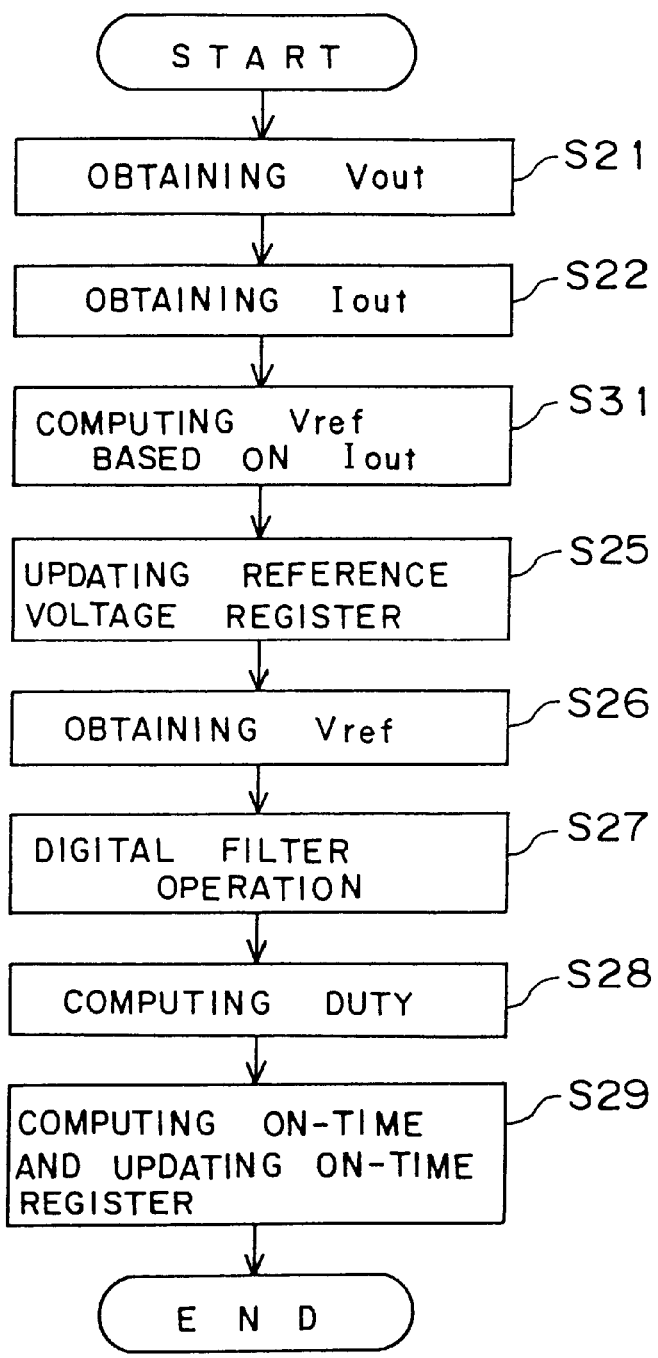
FIG. 15 is a flowchart showing an example of a variation of the process shown in FIG. 13.

FIG. 15 is a flowchart showing the method of obtaining a reference value through computation. In this process, step S31 is performed instead of steps S23 and S24 shown in FIG. 13. In step S31, the reference value Vref is computed using the output current Iout obtained in step S22. In step S31, the following operation is performed. In this example, the electric current required by the load is 5.0V, and the resistance value of the wiring pattern is 0.01Ω.

$$Vref = Vload + Iout \cdot Rp$$
$$= 5.0 + 0.01 \cdot Iout$$

According to the embodiments shown in FIGS. 13 through 15, the reference value is obtained by assuming that the resistance value of the wiring pattern between the power supply apparatus and the load is constant. However, the resistance value of the wiring pattern changes with a temperature, etc. Therefore, it is necessary to consider a change in temperature to improve the precision in voltage to be applied to a load.

Figure 16:
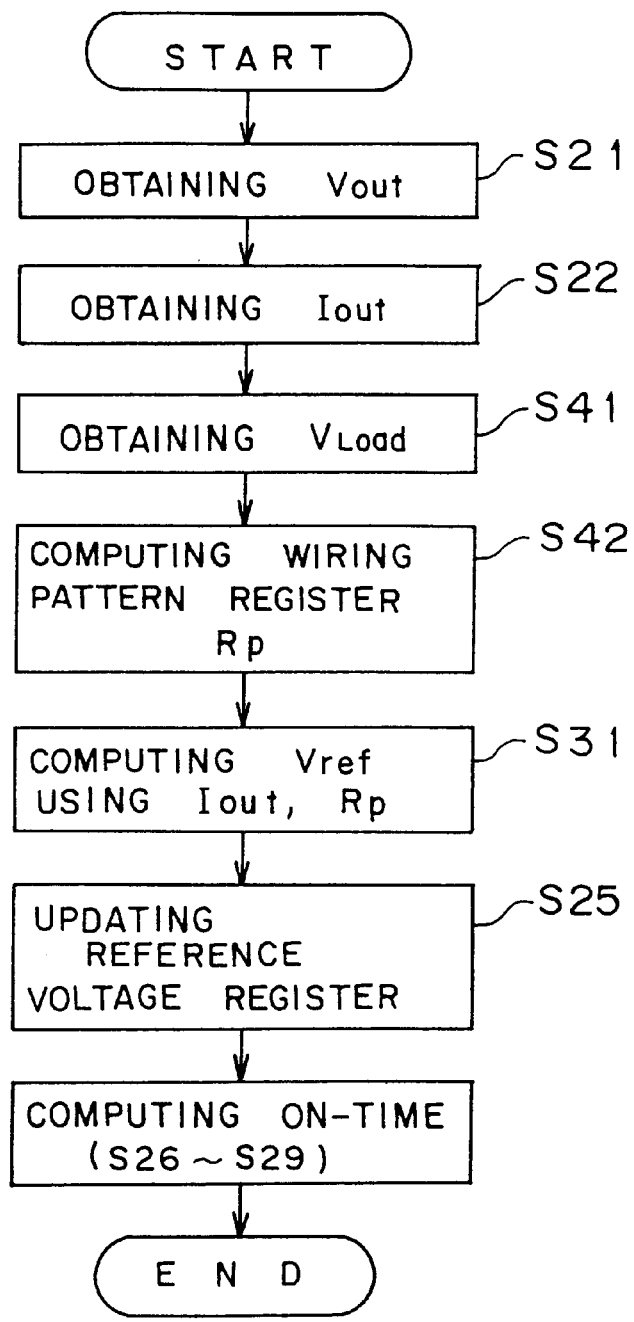
FIG. 16 is a flowchart of the process of computing the ON time of a pulse signal in consideration of a change in a resistance value of a wiring pattern.

FIG. 16 is a flowchart showing the process of computing the on-time of a pulse signal in consideration of the change in a resistance value of a wiring pattern. This process is performed by adding steps S41 and S42 to the process performed according to the flowchart shown in FIG. 15.

In step S41, the voltage Vload applied to the load is obtained. This step practically includes a process of transmitting a selection instruction to the multiplexing unit 34, and a process of reading the output from the A/D conversion unit 35.

In step S42, the resistor Rp of the wiring pattern is computed based on the output voltage Vout, the output current Iout, and the voltage Vp applied to the load respectively obtained in steps S21, S22, and S41. Practically, the following operation is performed.

$$Rp = (Vout - Vp)/Iout$$

Then, in step S31, the reference value Vref is obtained using the output current Iout detected in step S22 and the resistance value Rp of the wiring pattern computed in step S42. The subsequent processes are performed as described above.

It is not necessary to frequently perform the processes in steps S41 and S42. That is, the processes in steps S41 and S42 are performed to amend the resistance values of the wiring pattern. Since the resistance value changes with a temperature, etc., it does not largely change within a short time. Therefore, the processes in steps S41 and S42 should be performed every several seconds.

In the example shown in FIG. 16, the electric potential applied to the input terminal of the load is detected. This system is different from the remote sense. That is, in the conventional remote sense, the electric potential applied to the input terminal of a load is used as is as a feedback signal. In this case, the inductance of a wiring pattern and the load capacitor form a secondary filter. As a result, as compared with the case where the electric potential of the output terminal of the power supply apparatus is used as a feedback signal, there is a higher possibility that a phase delay occurs and an oscillation is generated. Therefore, the gain of a voltage error amplifier (amplifier 523 shown in FIG. 1) is made small at a lower frequency area in the conventional remote sense in order to avoid such an oscillation.

On the other hand, in the power supply apparatus according to the present embodiment, the electric potential applied to the input terminal of the load is not used as a feedback signal, but used in determining the resistance value of the wiring pattern. That is, the frequency at which the steps S41 and S42 shown in FIG. 16 are performed is made lower than the frequency at which the process of computing the on-time of a pulse signal. As a result, the voltage applied to the load can be prevented from being used as a feedback signal, thereby avoiding an oscillation.

In the example shown in FIG. 16, a resistance value of a wiring pattern is obtained by detecting the voltages applied to the output terminal of the power supply apparatus and the input terminal of the load. In the following embodiment, the resistance value of the wiring pattern is estimated by measuring the temperature around the power supply apparatus.

Figure 17:
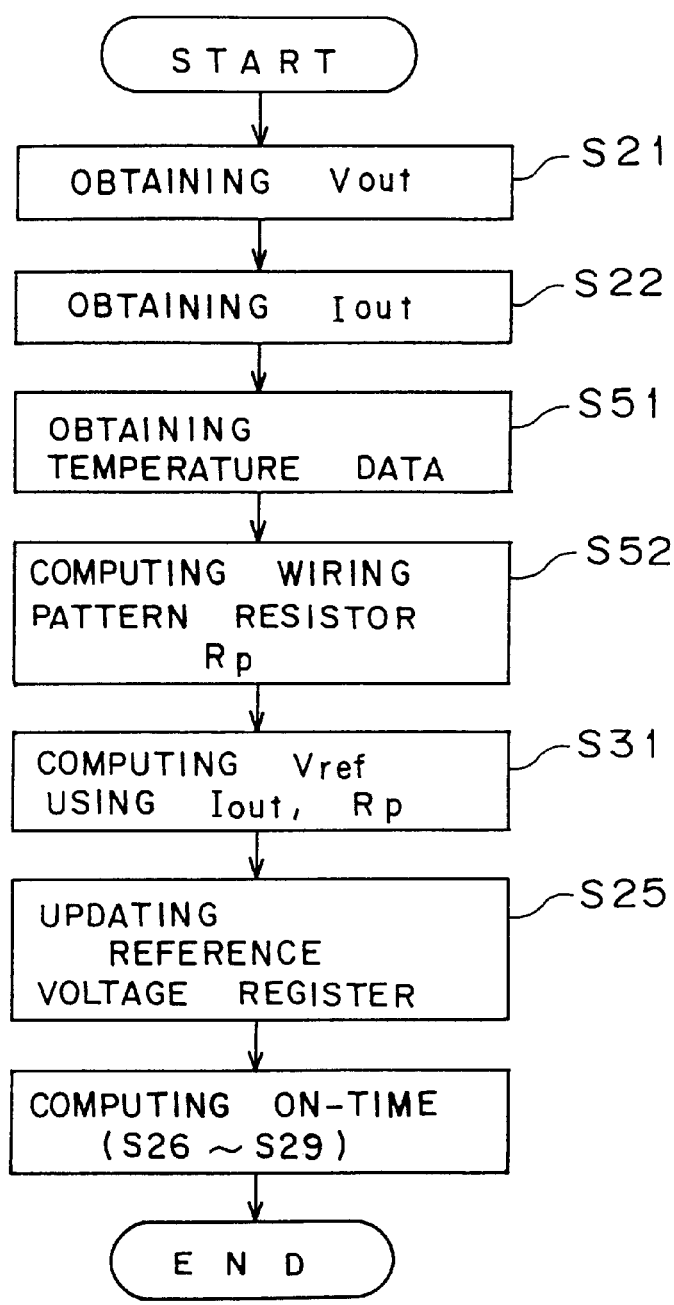
FIG. 17 is a flowchart showing the operation of the operation unit when the resistance value of a wiring pattern is estimated based on the detected temperature.

FIG. 17 is a flowchart showing the operations of the operation unit when the resistance value of the wiring pattern is estimated based on the detected temperature. In this process, steps 51 and S52 are performed instead of steps S41 and S42 according to the flowchart shown in FIG. 16.

In step S51, the data about the temperature around the power supply apparatus detected by the temperature sensor 46 is obtained. This step practically contains the process of transmitting a selection instruction to the multiplexing unit 34, and the process of reading the output from the A/D conversion unit 35 after the selection instruction. In step S52, an operation is performed by the following equation.

$$Rp = Ro + \rho(T0 - T)$$

where T0 indicates a reference temperature( for example, 20° C.), T indicates a temperature around the power supply apparatus, and R0 indicates a resistance value of a wiring pattern at the reference temperature, and is a temperature-dependent factor of the ρ wiring pattern and actually depends on the material of the wiring pattern.

Then, in step S31, the reference value Vref is obtained using the output current Iout detected in step S22 and the resistance value Rp of the wiring pattern computed in step S42. The following processes are performed as described above.

Thus, according to the embodiment shown in FIG. 17, an effect of the remote sense can be actually obtained without detecting a voltage applied to the input terminal of a load. As a variation of the embodiment shown in FIG. 17, a reference value Vref is preliminarily computed for a combination of an output current Iout and a temperature, and the computation result can be preliminarily stored in a table as shown in FIG. 18. In this case, the reference value Vref can be obtained by searching the table using the combination of the detected output current Iout and the temperature as a key instead of performing steps S52 and S31 shown in FIG. 17.

To further improve the precision in voltage with the power supply apparatus according to the present embodiment, it is necessary to compensate for the temperature-dependency of the A/D conversion unit 35.

Figures 19A, 19B:
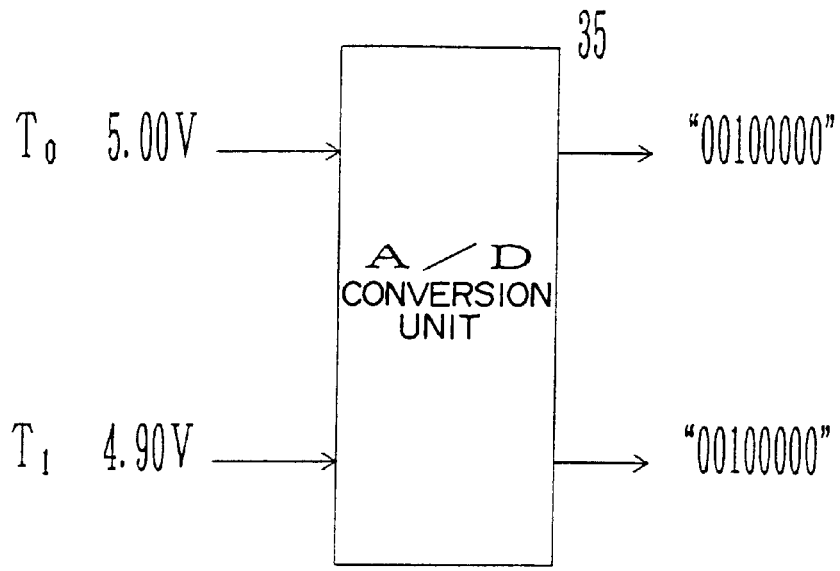
FIG. 19A shows input/output of the A/D converter.
FIG. 19B shows an example of a temperature compensation table.

An A/D conversion unit normally outputs digital data corresponding to an input voltage. The correspondence depends on a temperature. For example, as shown in FIG. 19A, when '5.00V' is input at the temperature To, the digital data '00100000' is output. When '4.90V' is input at the temperature T1, the digital data '00100000' is output.

When the output voltage Vout of the power supply circuit is applied to the A/D conversion unit 35, a resultant output is input to the digital filter 52 shown in FIG. 5. Therefore, to compensate for the temperature-dependency of the A/D conversion unit 35, the data input from the A/D conversion unit 35 should be compensated for. For example, when the digital data '00100000' is input to the digital filter 52 at the temperature To, it is assumed that the data corresponds to '5.00V'. When the digital data '00100000' is input to the digital filter 52 at the temperature T1, it is assumed that the data corresponds to '4.90V'.

In the power supply apparatus according to the present embodiment, the reference value Vref set in the reference voltage register 51 is changed with a temperature to realize the above described function. Practically, a temperature compensation table shown in FIG. 19B is provided. The temperature compensation table stores the preliminarily checked temperature-dependency of the A/D conversion unit 35. Otherwise, each time the temperature around the power supply apparatus is checked, the operation is performed by the following equation to compute the reference value Vref.

$$Vref = 5.00 - (To - Tair) \times k$$

In this equation, the output voltage to be held by the power supply circuit is 5V. T0 indicates a reference temperature, and k indicates a temperature factor. In the example shown in FIG. 19B, T0=20° C., k=0.005V/° C.

Figure 20:
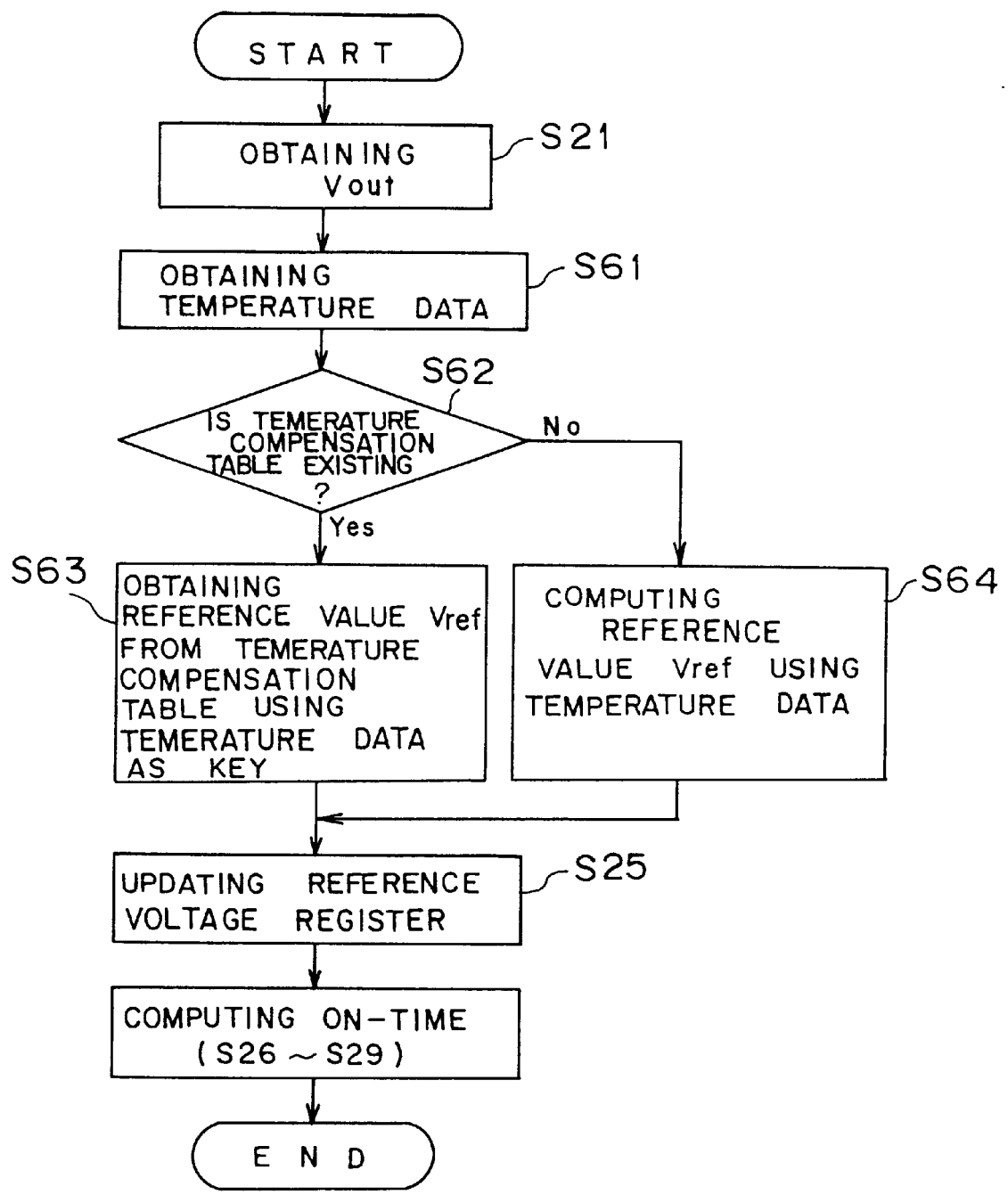
FIG. 20 is a flowchart of the process of computing the ON time while compensating for the temperature-dependency of the A/D conversion unit.

FIG. 20 is a flowchart showing the process of computing the on-time while compensating for the temperature-dependency of the A/D conversion unit 35. This process is performed by adding steps S61 through S64 to the process of computing the on-time. However, the frequency at which steps S61 through S64 are performed can be reduced as described above by referring to FIG. 14.

In step S61, temperature data is obtained. In step S62, it is checked whether or not a temperature compensation table is provided. When a temperature compensation table is provided, it is searched using the temperature data obtained in step S61 as a key to obtain the reference value Vref in step S63. On the other hand, when the temperature compensation table is not provided, the reference value Vref is computed in step S64 using the temperature data obtained in step S61. In step S25, the reference voltage register 51 is updated using the reference value Vref obtained in step S63 or S64. The subsequent processes are described above.

Thus, according to the first embodiment, the reference value for use in determining the duty of the pulse signal provided for the switching element is changed depending on the resistance value of the wiring pattern, the characteristic of the A/D convertor, etc. Thus, a high-precision voltage can be obtained with the temperature-dependency compensated for.

Second Embodiment

The second embodiment relates to the technology of setting the rise and decay characteristics of an output voltage.

Figure 21A:
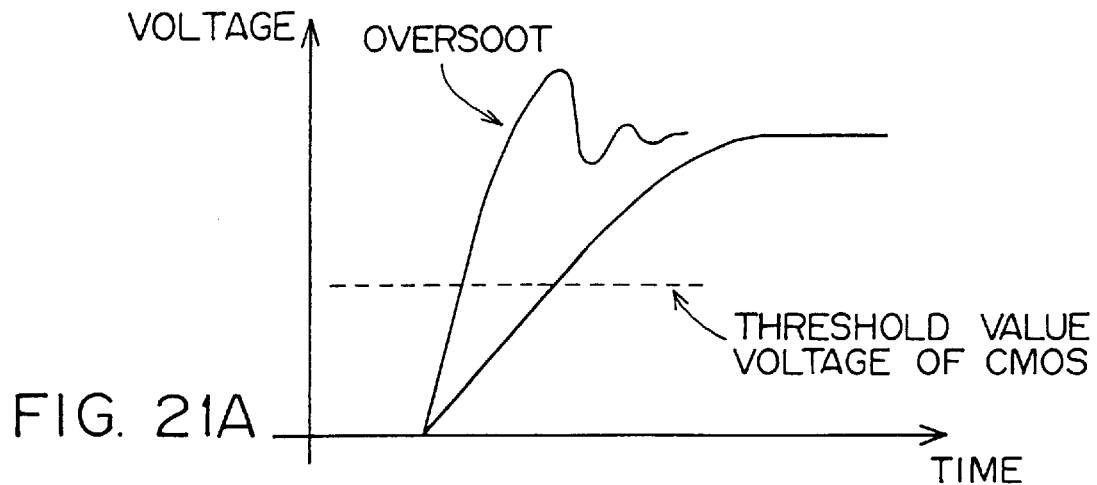
FIG. 21A shows the rise characteristic of an output voltage in the exiting power supply apparatus.

FIG. 21A shows the rise characteristic of the output voltage when the existing power supply apparatus is switched on. If the rise time of an output voltage is simply shortened in the existing power supply apparatus, an overshoot occurs as well-known. To avoid such an overshoot, a voltage waveform is moderately risen using a C-R circuit, etc.

However, the CMOS element which has lately been the main semiconductor element may cause a short circuit, etc. if a rising speed (dv/dt) of an applied voltage is low around a threshold level.

Figure 21B:
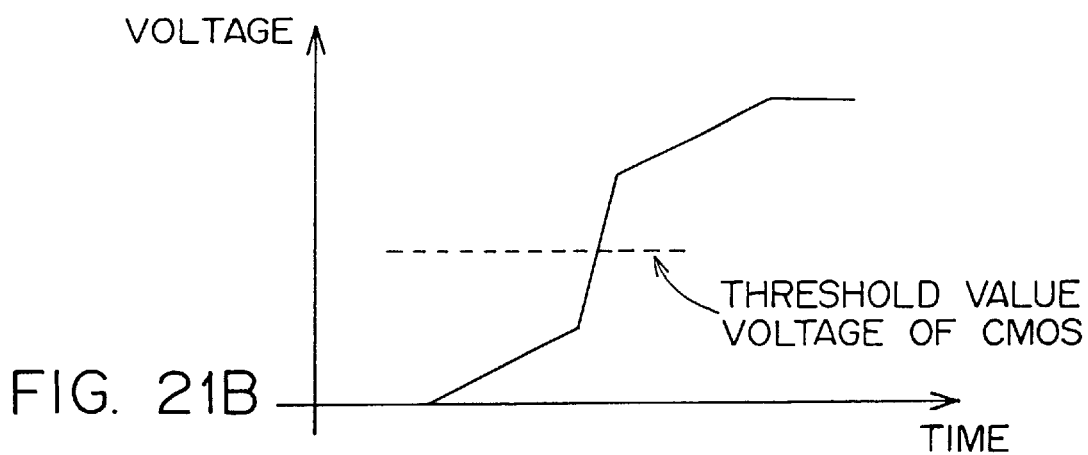
FIGS. 21B and 21C show the rise characteristic required to solve the problems with the existing power supply apparatus.
Figure 21C:
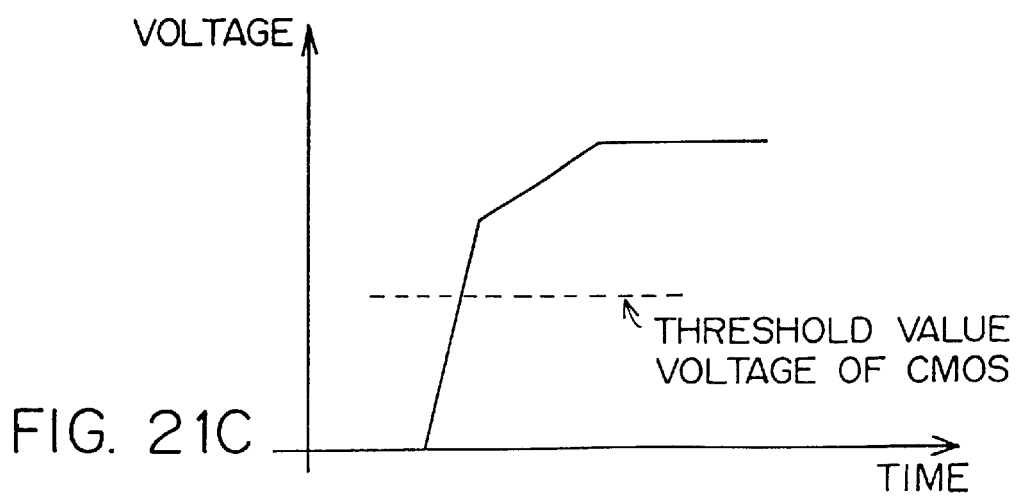

To solve these problems, the output voltage satisfies the following two conditions as shown in FIG. 21B or 21C.
(1) The rising speed is high around the threshold level of the CMOS.
(2) The rising speed is low immediately before the voltage required by the CMOS is reached.

The power supply apparatus according to the following embodiments can be designed such that the output voltage Vout can satisfy the above described two conditions by changing the reference value Vref as shown in FIG. 21B or 21C based on the fact that the output voltage Vout changes with the reference value Vref.

Figure 22:
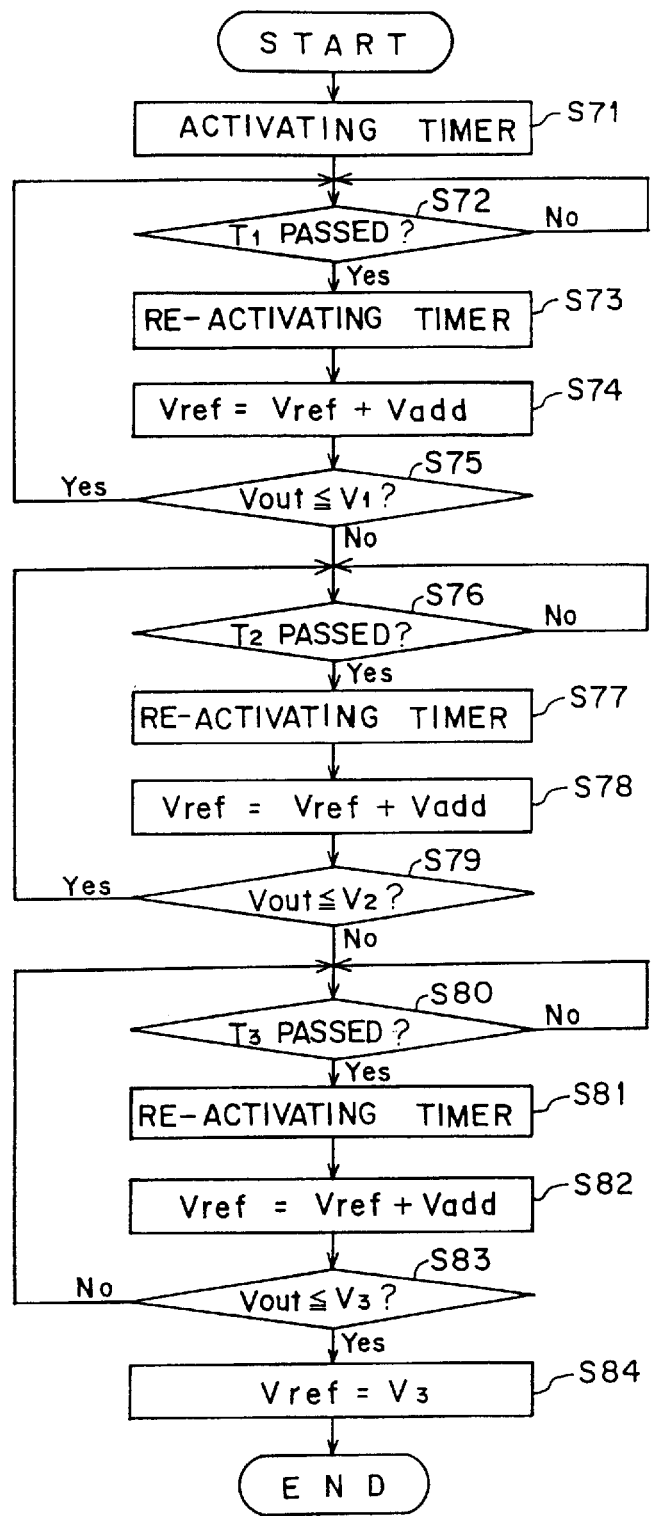
FIG. 22 is a flowchart of the process of updating the reference value at the start of an output voltage.
Figure 23:
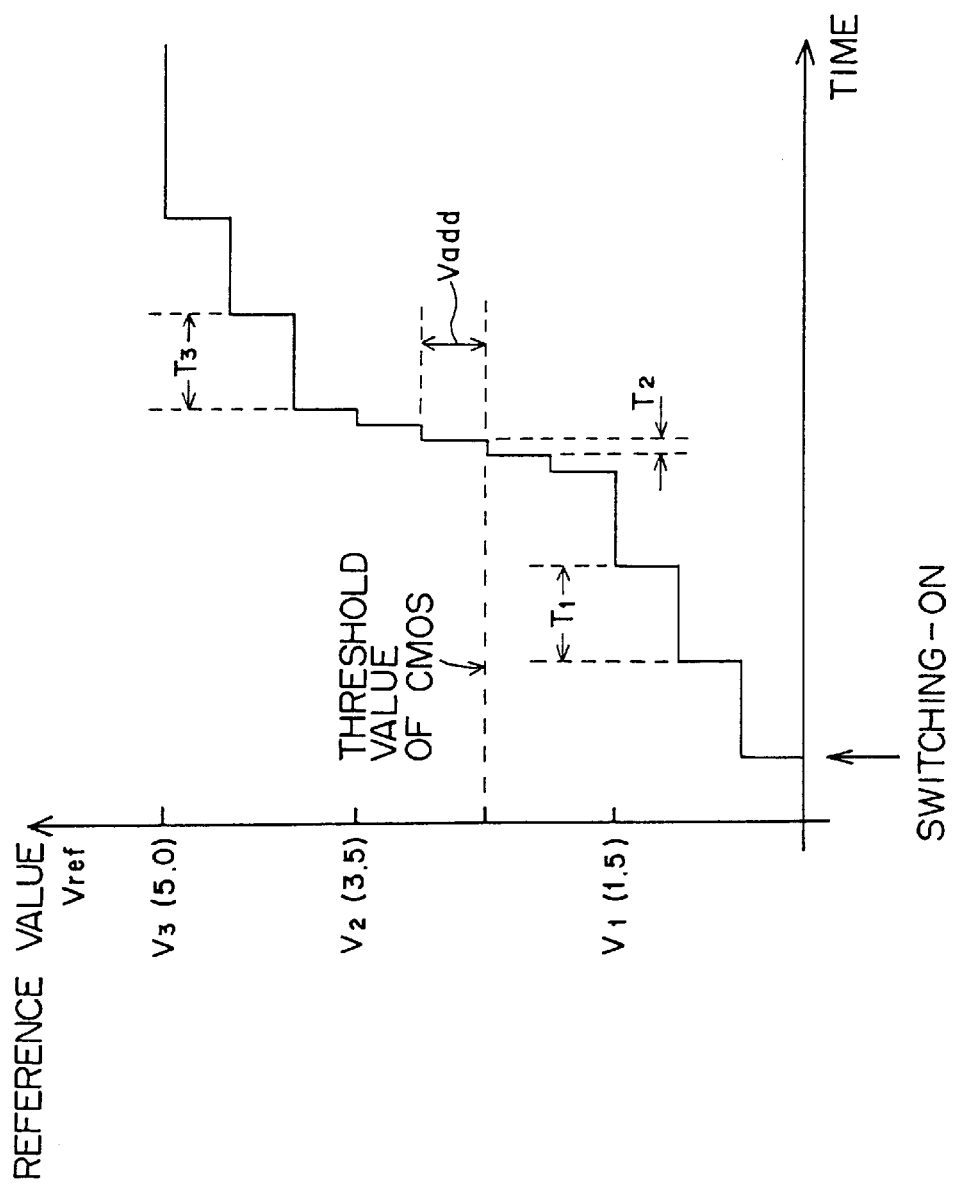
FIG. 23 shows the reference value updated in the process according to the flowchart shown in FIG. 22.

FIG. 22 is a flowchart showing the process of updating a reference value during the time that an output voltage is rising. FIG. 23 shows a reference value obtained in the process shown in the flowchart in FIG. 22. The process of the flowchart shown in FIG. 22 is performed by the reference value operation unit 81 shown in FIG. 11. This process is started upon input of an instruction to switch on the power supply apparatus.

In FIGS. 22 and 23, the time T2 is shorter than the time T1 and the time T3. For example, the times T1 through T3 respectively indicate 5 m/sec, 1 m/sec, and 5 m/sec. The voltage V3 is a voltage required by the load (CMOS element in this case). The threshold value of the voltage of the CMOS element is between the voltages V1 and V2. The voltages V1 through V3 are, for example, 1.5V, 3.5V, and 5.0V respectively. 'Vadd' is a value to be added when the reference value Vref is updated.

In step S71, the timer is first activated. In steps S72 through S75, the added value Vadd is added to the reference value Vref each time the time T1 has passed. That is, when the lapse of time from the activation of the timer in step S71 or S73 reaches T1, the timer is re-activated in step S73, and the added value Vadd is added to the reference value Vref in step S74. Then, the reference voltage register 51 is updated by the reference value Vref obtained in step S74. Then, in step S75, it is determined whether or not the output voltage Vout has exceeded the voltage V1. When the output voltage Vout is equal to or lower than the voltage V1, control is passed to step S72. If the output voltage Vout has exceeded the voltage V1, then control is passed to step S76.

Steps S76 through S79 are basically the same as steps S72 through S75. However, in steps S76 through S79, the added value Vadd is added to the reference value Vref each time the time T2 passes until the output voltage Vout reaches the voltage V2. The time T2 is shorter than the time T1. Therefore, the reference value Vref quickly increases while the output voltage Vout is between the voltage V1 and the voltage V2, and correspondingly the output voltage Vout also rises quickly.

Steps S80 through S83 are basically the same as steps S72 through S75. However, in steps S80 through S83, the added value Vadd is added to the reference value Vref each time the time T3 passes until the output voltage Vout reaches the voltage V3. The time T3 is relatively a large value. Therefore, the reference value Vref slowly increases while the output voltage Vout is between the voltage V2 and the voltage V3, and correspondingly the output voltage Vout also rises slowly. When the output voltage Vout reaches the voltage V3, 'voltage V3' is written to the reference voltage register 51.

Thus, with the power supply apparatus according to the present embodiment, the output voltage in the rising process quickly rises around the threshold level of the CMOS, and slowly rises around the voltage level required by the CMOS. Therefore, an overshoot can be suppressed, and the short-circuit, etc. of the CMOS can be avoided. In FIG. 23, a total rise time can be shorter than that for the conventional power supply apparatus by shortening the time T2. This effect is more outstanding by setting a small value for the time T1 as well as the time T2. When the time T1 is set at the same level as the time T2, the rise characteristic of the output voltage of a power supply circuit is represented as shown in FIG. 21C.

In the process shown by the flowchart in FIG. 22, steps S72, S76, and S80 are, for example, the detection of a timer interruption. In this case, each of the processes in steps S73 through S75, steps S77 through S79, and steps S81 through S83 is performed by each interruption.

The processor 41 performs in parallel the process according to the flowchart shown in FIG. 22 and the process according to the flowchart shown in FIG. 7. Therefore, when the on-time of a pulse signal is computed according to the flowchart shown in FIG. 7, the reference value Vref changes according to the flowchart shown in FIG. 22, and the output voltage Vout of the power supply circuit changes with the reference value Vref. As a result, the rise pattern as shown in FIG. 21B can be obtained.

In the example shown in FIGS. 22 and 23, the characteristic as shown in FIG. 21B is obtained by changing the cycle of updating a reference value with the added value kept constant. However, it is obvious that other methods can be used.

Figure 24:
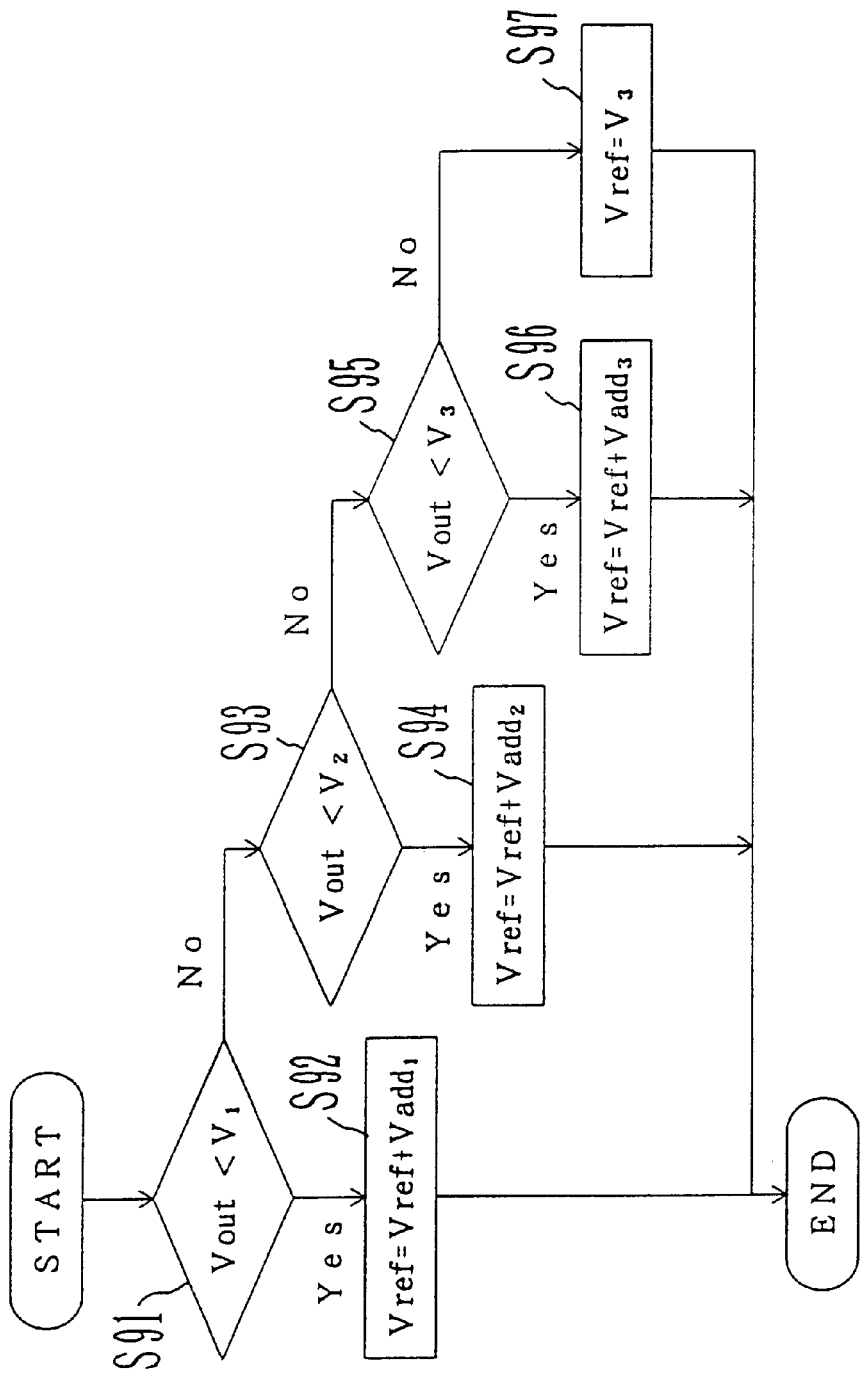
FIG. 24 is a flowchart showing another method for the process of updating the reference value at the start of an output voltage.
Figure 25:
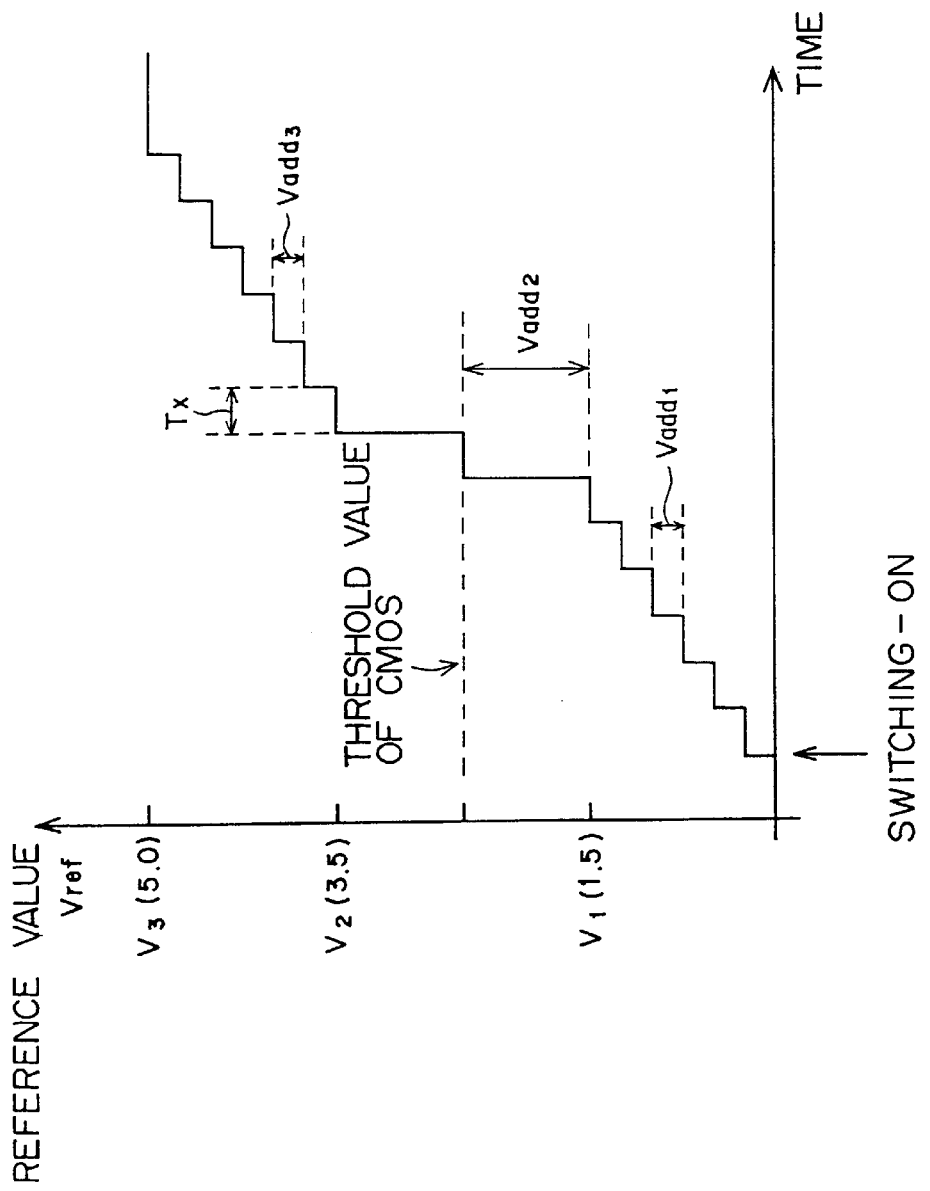
FIG. 25 shows the reference value updated in the process according to the flowchart shown in FIG. 24.

FIG. 24 is a flowchart showing another method of updating a reference value in the rise process of an output voltage. FIG. 25 shows a reference value obtained by a process performed according to the flowchart shown in FIG. 24. The process according to the flowchart shown in FIG. 24 is performed by an interruption generated at predetermined time intervals Tx. It is assumed that the voltages V1 through V3 are the same as those in FIGS. 22 and 23. It is also assumed that the initial value of the reference value Vref is 0.

In step S91, it is checked whether or not the output voltage Vout of the power supply circuit has reached the voltage V1. If the output voltage Vout is lower than the voltage V1, then an added value Vadd1 is added to the reference value Vref in step S92. On the other hand, if the output voltage Vout is equal to or higher than the voltage V1, then control is passed to step S93.

Similarly, in step S93, it is checked whether or not the output voltage Vout of the power supply circuit has reached the voltage V2. If the output voltage Vout is lower than the voltage V2, then the added value Vadd2 is added to the reference value Vref in step S94. If the output voltage Vout is equal to or larger than the voltage V2, control is passed to step S95.

Furthermore, in step S95, it is checked whether or not the output voltage Vout of the power supply circuit has reached the voltage V3. If the output voltage Vout is lower than the voltage V3, then the added value Vadd3 is added to the reference value Vref in step S96. If the output voltage Vout has reached the voltage V3, control is passed to step S97. In step S97, the voltage V3 is set to the reference value Vref.

If a large value is assigned to an added value Vadd2 and a small value is assigned to an added value Vadd3 in the process above, then the rise characteristic of an output voltage of the power supply apparatus is represented as shown in FIG. 21B or 21C.

The process shown in FIG. 22 can be combined with the process shown in FIG. 24. That is, the above described added value can be larger around the threshold level of the CMOS, and the cycle of updating the reference value Vref can be shortened. The method of updating the reference value can be easily realized by changing a software program.

Figure 26A:
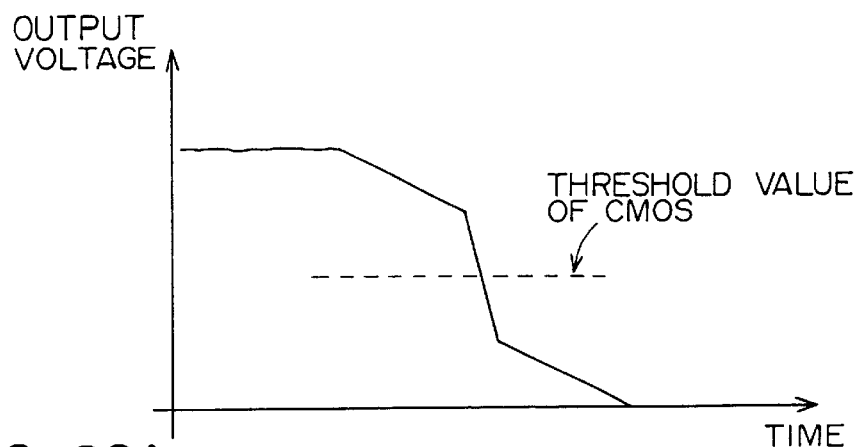
FIGS. 26A and 26B show the decay characteristic required to solve the problem with the existing power supply apparatus.
Figure 26B:
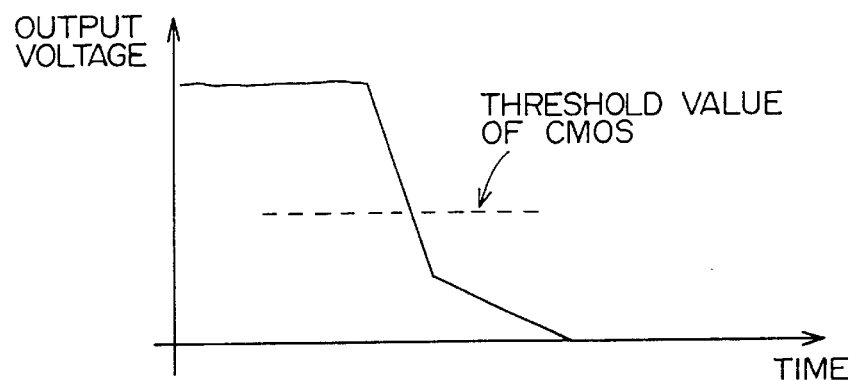
Figure 27:
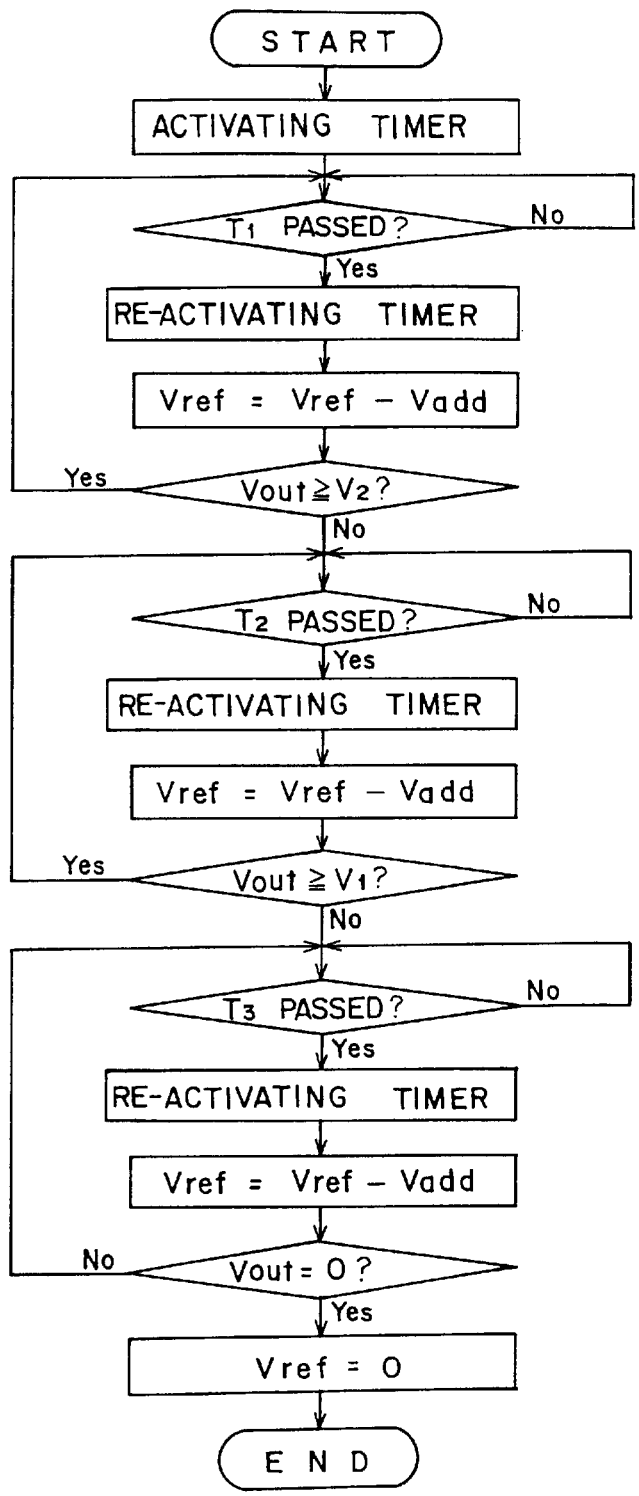
FIG. 27 is a flowchart of the process of updating the reference value at the trailing edge of an output voltage.
Figure 28:
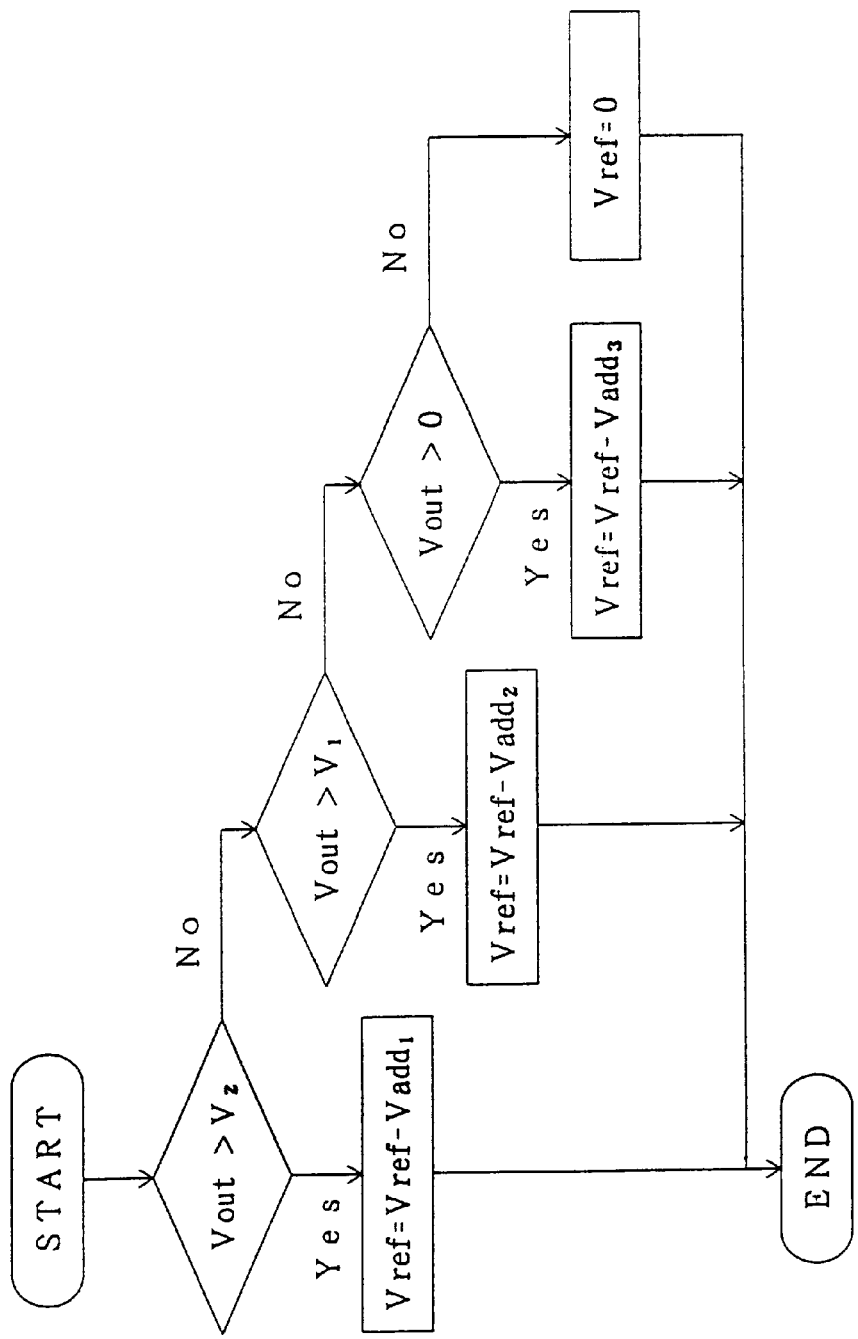
FIG. 28 is a flowchart of another method for the process of updating the reference value at the trailing edge of an output voltage.

In FIGS. 21 through 25, the rise of an output voltage is described. The decay of an output voltage can be similarly described. FIGS. 26A and 26B show examples of decay patterns of an output voltage of the power supply apparatus according to the present embodiment. FIGS. 27 and 28 show the process of obtaining a decay pattern shown in FIGS. 26A or 26B. The operations according to the flowchart shown in FIGS. 27 and 28 are basically the same as those according to the flowchart shown in FIGS. 22 and 24. Therefore, the description is omitted here.

Described below is the sequence of starting or disconnecting a plurality of power supply circuits provided in a power supply apparatus in a predetermined order.

Figure 29:
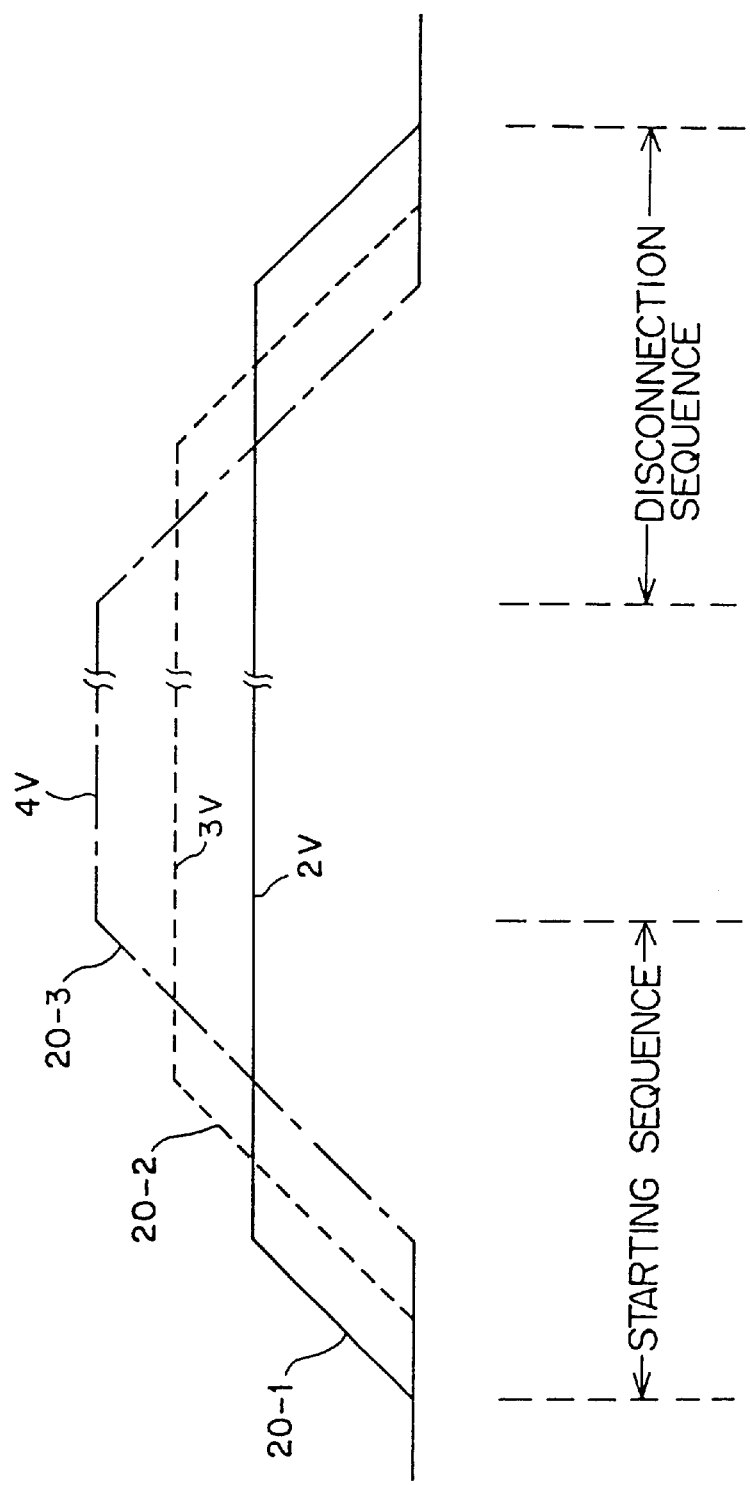
FIG. 29 shows the starting sequence and the disconnection sequence of a plurality of power supply circuits.

The power supply apparatus according to the present embodiment is provided with a plurality of power supply circuits as shown in FIG. 2. In the descriptions below, it is assumed that there are three power supply circuits (20-1 through 20-3). The output voltages to be maintained by the power supply circuits 20-1 through 20-3 are 2V, 3V, and 4V respectively. These power supply circuits are started in the order of a power supply circuit 20-1, a power supply circuit 20-2, and a power supply circuit 20-3 as shown in FIG. 29. Then, they are disconnected in the order of the power supply circuit 20-3, the power supply circuit 20-2, and the power supply circuit 20-1.

Figure 30:
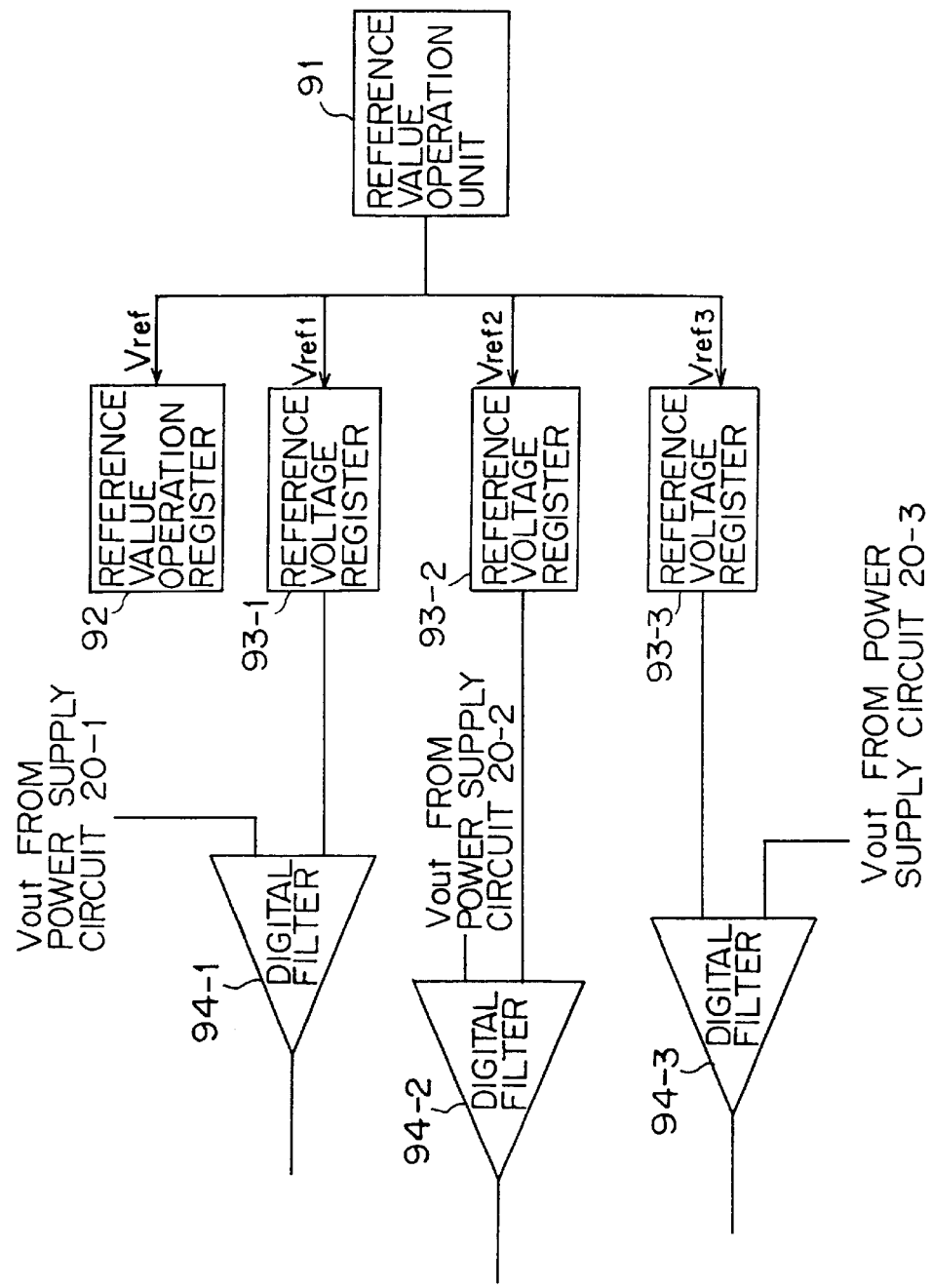
FIG. 30 shows the function used in the starting sequence or the disconnection sequence of a power supply.

FIG. 30 shows the function used in the starting or disconnection sequence of a power supply. A reference value operation unit 91 is realized by the processor 41 executing a predetermined program, and generates a reference value for regulation of each of the output voltages from the power supply circuits 20-1 through 20-3. A reference value operation register 92 is a storage area used in computing the reference values Vref1 through Vref3 for the power supply circuits 20-1 through 20-3. Reference voltage registers 93-1 through 93-3 store the reference values Vref1 through Vref3 respectively for the power supply circuits 20-1 through 20-3. The reference values Vref1 through Vref3 are used by digital filters 94-1 through 94-3. The digital filters 94-1 through 94-3 correspond to the digital filter 52, and can be realized by the processor 41 executing a predetermined program.

FIG. 31 is a flowchart of the process of computing a reference value in the starting process of a plurality of power supply circuits. This process is performed by the reference value operation unit 91. This process can also be performed by a timer interruption, etc. at predetermined intervals. The initial value of the reference value Vref is assumed to be 0.

In step S101, the reference value Vref is retrieved from the reference value operation register 92, and an added value is added to the reference value Vref. In this example, 0.0025V is added. Using the addition result, the reference value operation register 92 can be updated. It is checked in step S102 whether or not the reference value Vref has reached the output voltage to be maintained by the power supply circuit 20-1. That is, it is checked whether or not the reference value Vref has reached 2.

Unless the reference value Vref has reached 2, the reference voltage registers 93-1 through 93-3 are updated as follows in step S103. When the reference values Vref1 through Vref3 are negative values, 0 is written to a corresponding register.

$$Vref1=Vref;\ Vref2=Vref-1;\ Vref3=Vref-2$$

When the reference value Vref has reached 2, control is passed to step S104. It is checked in step S104 whether or not the reference value Vref has reached the value obtained by adding 1 to the output voltage to be maintained by the power supply circuit 20-2. That is, it is checked whether or not the reference value Vref has reached 4.

If the reference value Vref is between 2 and 4, the reference voltage registers 93-1 through 93-3 are updated as follows in step S105.

$$Vref1=2;\ Vref2=Vref-1;\ Vref3=Vref-2$$

When the reference value Vref has reached 4, control is passed to step S106. It is checked in step S106 whether or not the reference value Vref has reached the value obtained by adding 2 to the output voltage to be maintained by the power supply circuit 20-3. That is, it is checked whether or not the reference value Vref has reached 6.

If the reference value Vref is between 4 and 6, the reference voltage registers 93-1 through 93-3 are updated as follows in step S107.

$$Vref1=2;\ Vref2=3;\ Vref3=Vref-2$$

When the reference value Vref has reached 6, control is passed to step S108. In step S108, the following values are written to the reference voltage registers 93-1 through 93-3.

$$Vref1=2;\ Vref2=3;\ Vref3=4$$

The reference voltage registers 93-1 through 93-3 store the written reference values until the power supply apparatus starts the disconnection sequence.

According to the above described embodiment, after the starting sequence commences, the reference value Vref1 increases at a constant speed until it reaches 2. The reference value Vref2 increases at a constant speed from the timing when the reference value Vref1 reaches 1. The reference value Vref3 increases at a constant speed from the timing when the reference value Vref1 reaches 2. The output voltages from the power supply circuits 20-1 through 20-3 change with the reference values Vref1 through Vref3 stored in the reference voltage registers 93-1 through 93-3 respectively. Therefore, the sequence as shown in FIG. 29 can be obtained.

Figure 32:
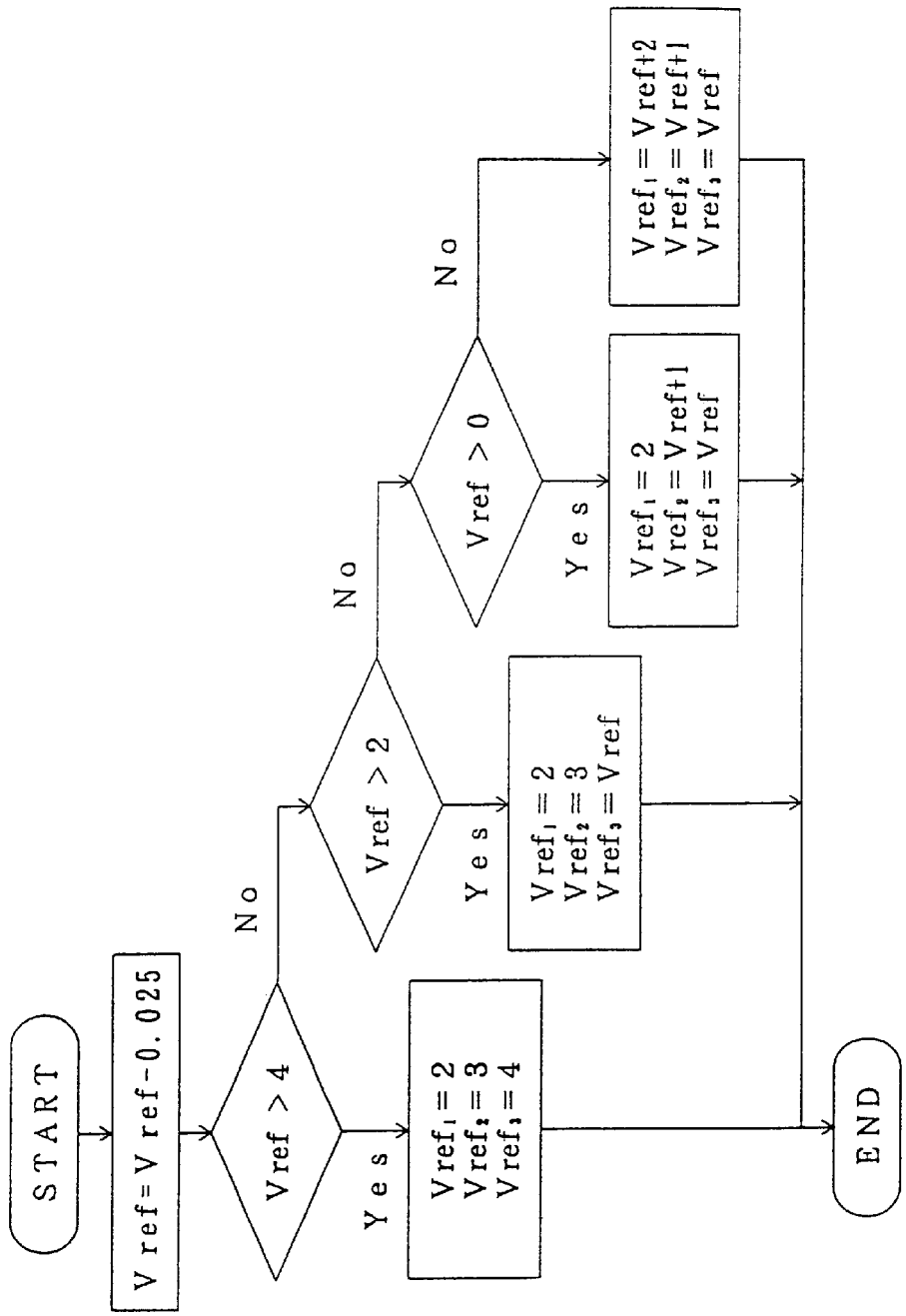
FIG. 32 is a flowchart of the process of computing the reference value when a plurality of power supply circuits are disconnected.

FIG. 32 is a flowchart showing the process of computing the a reference value when a plurality of power supply circuits are disconnected. Since this process is basically the same as the process according to the flowchart in FIG. 31, the explanation is omitted here. According to the flowchart shown in FIG. 32, the initial value of the reference value Vref is 4. When the reference values Vref1 through Vref3 obtained by operations are negative, it is assumed that 0 is written to a corresponding register.

When a plurality of power supply circuits are started, one or more of them may develop faults. In this case, it is desired that an output voltage from a normally started power supply circuit is reduced to protect a load. According to the following embodiments, when the output voltage of a power supply circuit is reduced due to a fault, etc., the output voltage of another power supply circuit which is normally operative is also reduced with a constant potential maintained between the output voltage of the faulty power supply circuit and the output voltage of the normal power supply circuit.

Figure 33A:
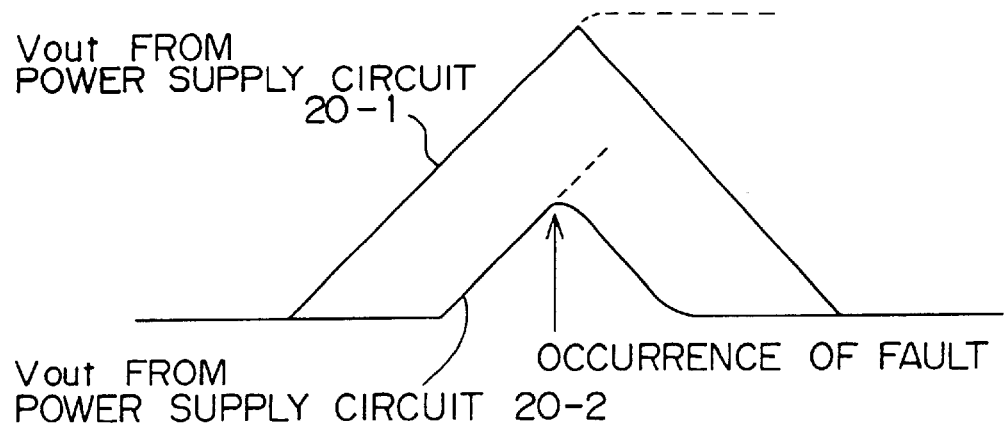
FIGS. 33A and 33B show an output voltage when an error occurs in the sequence of starting a plurality of power supply circuits.
Figure 33B:
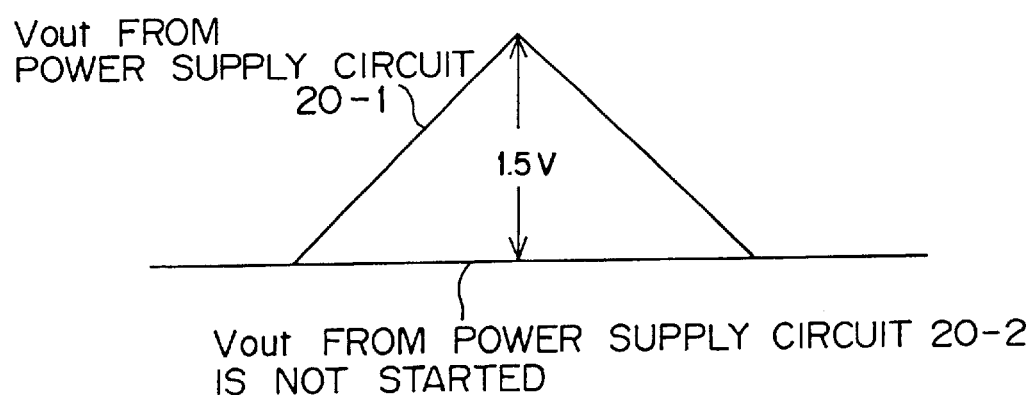

FIGS. 33A and 33B show the output voltage when a power supply circuit develops a fault in the starting sequence of a plurality of power supply circuits. In this example, a fault has occurred in the power supply circuit 20-2 in the starting sequence of the power supply circuits 20-1 and 20-2. FIG. 33A shows the case where the output voltage of the power supply circuit 20-2 first rises a little and then drops. FIG. 33B shows the case where the output of the power supply circuit 20-2 does not rise at all. It is assumed that the output voltages of the power supply circuits 20-1 and 20-2 rise with the difference of 1V maintained between them as shown in FIGS. 29 through 31.

In the power supply apparatus according to the present embodiment, the above described output voltage of each power supply circuit is constantly monitored for control. The monitor result is used in controlling the output voltage as shown in FIG. 33. That is, in this embodiment, it is determined that a fault has occurred when the difference between the output voltages from the power supply circuits 20-1 and 20-2 exceeds 1.5V, and the output voltage of a normally operating power supply circuit is reduced to 0.

Figure 34:
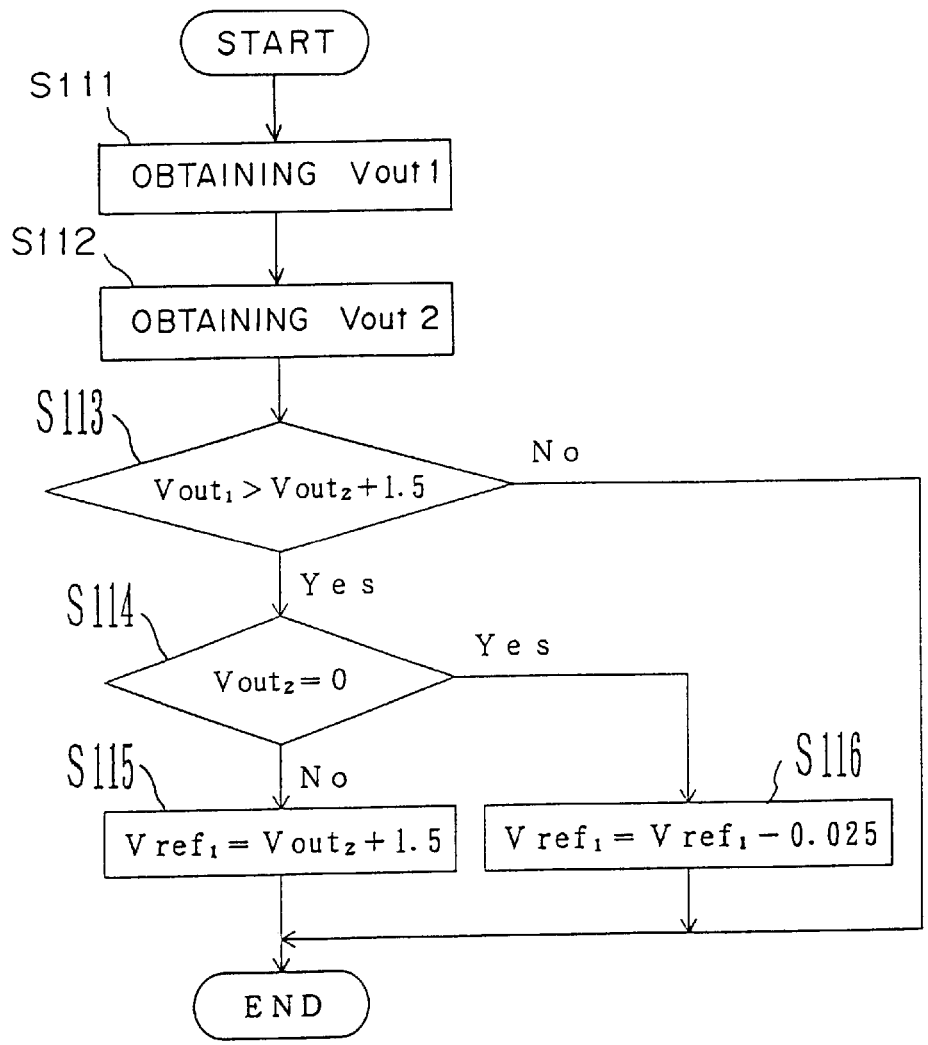
FIG. 34 is a flowchart of the process of controlling an output voltage when an error occurs.

FIG. 34 is a flowchart showing the process of controlling an output voltage when a fault occurs. This process is performed by a timer interruption, etc. which occurs at predetermined time intervals. The output voltages from the power supply circuits 20-1 and 20-2 are identified as Vout1 and Vout2 respectively. The reference value for the power supply circuit 20-1 is Vref1. In this example, it is assumed that a fault has occurred in the power supply circuit 20-2.

In steps S111 and S112, the output voltage Vout1 of the power supply circuit 20-1 and the output voltage Vout2 of the power supply circuit 20-2 are obtained. In step S113, it is determined whether or not the difference between these output voltages exceeds 1.5V. If not, it is determined that no abnormal conditions exist, and the process terminates. On the other hand, if the difference between the two output voltages exceeds 1.5V (in this example, the output voltage Vout2 is lower), then it is determined in step S114 whether or not the output voltage Vout2 indicates 0.

Unless the output voltage Vout2 indicates 0, the reference value Vref1 for the power supply circuit 20-1 is set to 'Vout2+1.5' in step S115. On the other hand, is the output voltage Vout2 indicates 0, a predetermined value (0.025 in this example) is subtracted from the reference value Vref1 in step S116. The reference value Vref1 obtained in step S115 or S116 is written to the reference voltage register for the power supply circuit 20-1.

By periodically repeating the above described process, the reference value Vref1 for the power supply circuit 20-1 decreases with a constant value maintained as the difference from the output voltage Vout2 from the power supply circuit 20-2 and then decreases at a predetermined speed after the output voltage Vout2 has been reduced to 0. At this time, the output voltage from the power supply circuit 20-1 changes with the reference value Vref1 as described above. Therefore, the output voltage from the power supply circuit 20-1 decreases as shown in FIG. 33A or 33B when a fault, etc. occurs in another power supply circuit in the period of the starting sequence.

Figure 35:
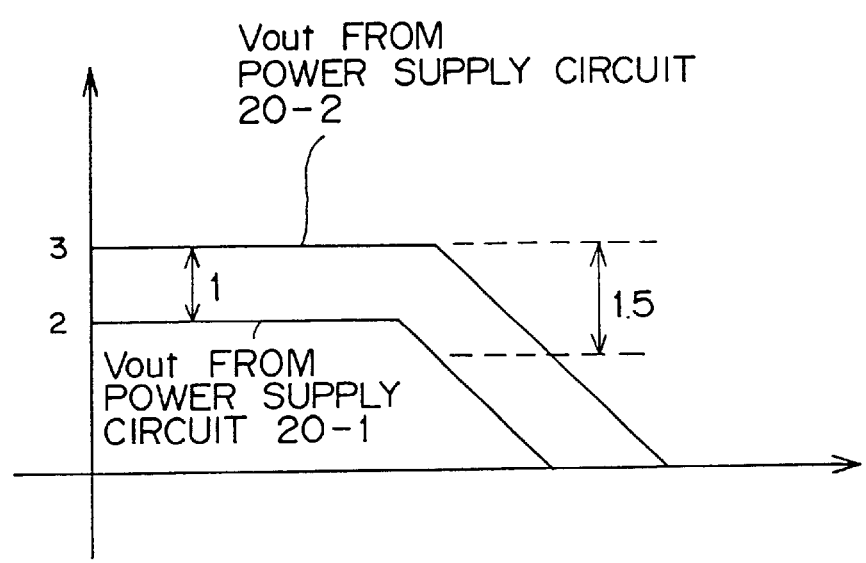
FIG. 35 shows the output voltage when an error occurs at an optional power supply circuit.

The control in the starting sequence of a power supply apparatus is shown in FIGS. 33 and 34. This control is similarly performed when each power supply circuit provides an electric current for a load. For example, when, in two power supply circuits indicating the difference of 1V in output voltage in a stable state, one power supply circuit develops a fault and the voltage difference reaches 1.5V as shown in FIG. 35, the output voltage of another power supply circuit which normally functions drops with a constant difference value maintained from the output voltage of the faulty power supply circuit. Basically, the process for realizing this operation can be easily obtained according to the flowchart shown in FIG. 34.

As described above, a desired voltage rise and decay patterns can be obtained by changing the reference value for regulation of an output voltage from a power supply circuit according to the second embodiment of the present invention.

Third Embodiment

The third embodiment of the present invention relates to the technology of suppressing noise of a power supply apparatus.

A power supply apparatus provided with a switching element (so-called switching regulator) is well-known as generating noise depending on its switching frequency. Described below is the power supply apparatus whose noise can be reduced by changing the switching frequency.

Figure 36A:
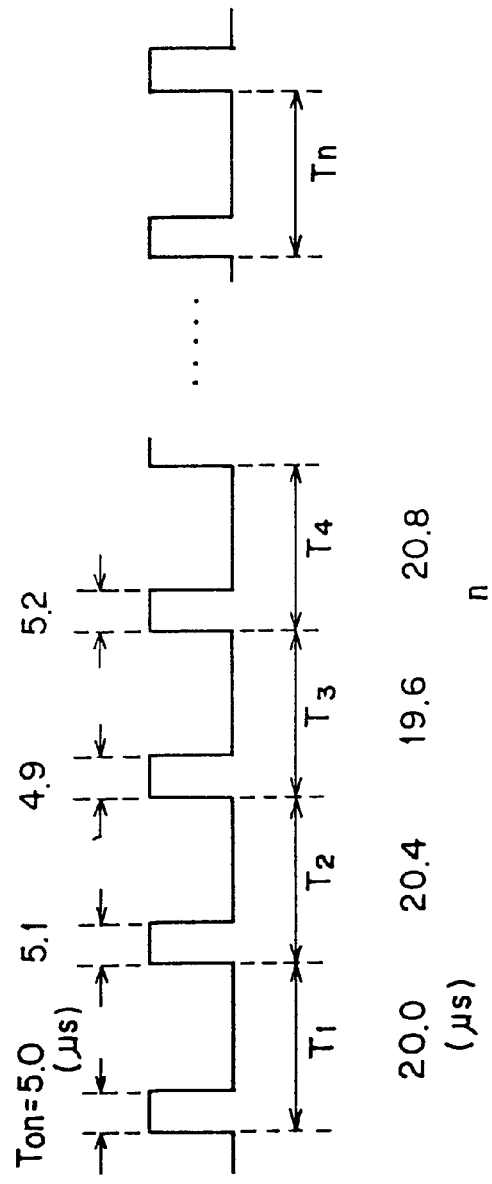
FIG. 36A shows an example of a pulse signal whose frequency changes.
Figure 36B:
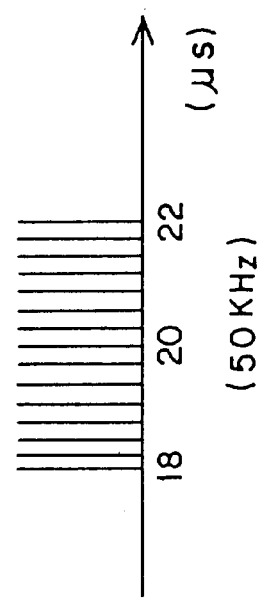
FIG. 36B shows the frequency spectrum of the signal.

FIG. 36A shows an example of a pulse signal whose frequency fluctuates. According to the present embodiment, the cycle of the pulse signal provided for the switching element 13 changes at random with time. However, an average value of the cycle can be controlled to be a constant value. In this example, the average value of the switching cycle is 20 $\mu$sec. When the switching frequency of a pulse signal is changed at random, the frequency spectrum is spread as shown in FIG. 36B. Thus, the noise from the power supply apparatus can be suppressed.

Figure 37:
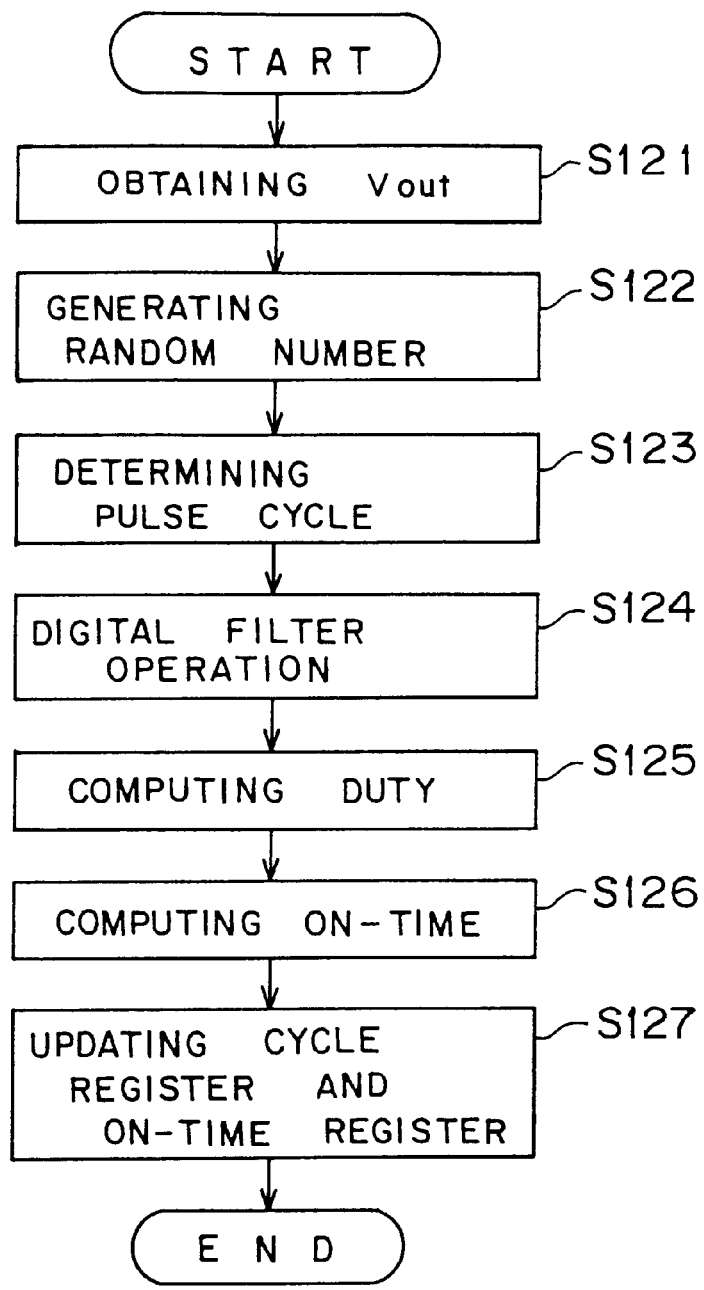
FIG. 37 is a flowchart showing an example of a method for a random switching frequency.

FIG. 37 is a flowchart showing an example of the method of randomizing the switching frequency. This process is performed by the operation unit 50, and is performed by a timer interruption, etc. at predetermined intervals.

In step S121, the output voltage Vout of a power supply apparatus is obtained. In step S122, a random number Ran for randomizing a switching frequency is generated. In this process, a random number generator for generating, for example, an integer in the range from −50 to 50 at an equal probability is used.

In step S123, the cycle T of a pulse signal is determined. Assuming that the average value of a randomized cycle is 20 $\mu$sec, and the range of the fluctuation of the cycle is ±2 $\mu$sec, the cycle of the pulse is generated by performing the following operation.

$$Ti = T0 + k \cdot Ran$$
$$= 20 + 0.04 \cdot Ran$$

where k indicates a constant.

In step S124, a digital filter operation is performed. As described above, this operation is to input the output voltage Vout obtained for the digital filter 52 shown in FIG. 5. In step S125, the duty of the pulse signal provided for the switching frequency is determined. This process is performed by the pulse width computation unit 53 shown in FIG. 5. Practically, it is performed as described above by referring to FIG. 8.

In step S126, the on-time is determined based on the cycle of the pulse determined in step S123, and the duty computed in step S125. The on-time is actually computed by the following equation.

$$Ton = D \cdot Ti$$

In step S127, the cycle of the pulse determined in step S123 and the on-time computed in step S126 are respectively written to the cycle register 61 and the on-time register 62 shown in FIG. 4.

The above described process in steps S121 through S127 is repeatedly performed at predetermined intervals. Therefore, the cycle register 61 is updated with time by a randomized pulse frequency, and the on-time register 62 is also updated synchronously. The PWM unit 11 generates a pulse signal according to the pulse frequency stored in the cycle register 61 and the on-time stored in the on-time register 62 as described above by referring to FIG. 9. Therefore, the cycle of the pulse signal provided for the switching element 13 is randomized with the duty maintained for setting a constant value for an output voltage.

In the example shown in FIG. 37 above, a random number is generated using a random number generator for randomizing the cycle of a pulse. However, the power supply apparatus according to the present embodiment can be designed to preliminarily obtain the cycle of a pulse and stores it in a table from which the cycle of the pulse is retrieved as necessary. FIG. 38 shows an example of a cycle storage table for storing the cycle of a randomized pulse.

Figure 39A:
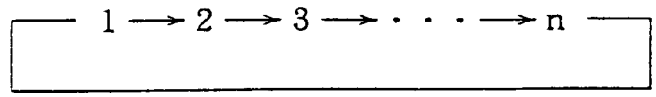
FIGS. 39A through 39C show how to use the cycle storage table.
Figure 39B:
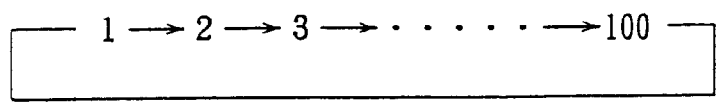
Figure 39B:
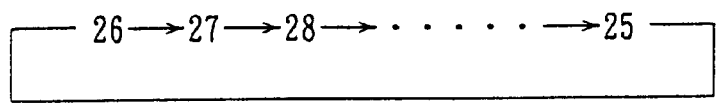
Figure 39B:
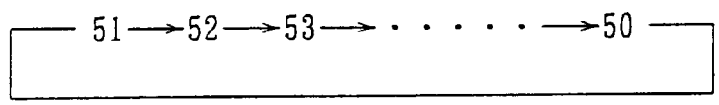
Figure 39B:
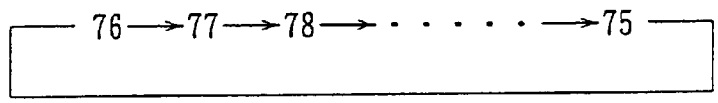
Figure 39C:
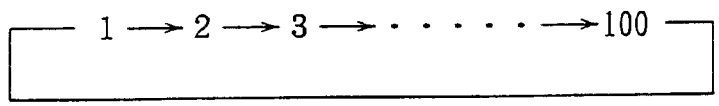
Figure 39C:
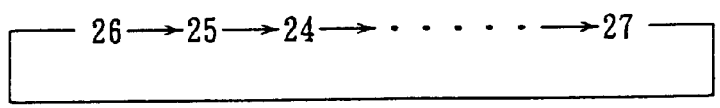
Figure 39C:
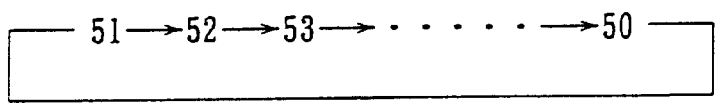
Figure 39C:
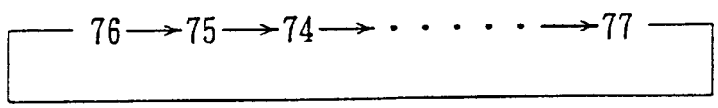

FIGS. 39A through 39C show the method of using the cycle storage table. FIG. 39A shows the basic method of using the table. In this method, storage addresses in the cycle storage table are sequentially accessed so that the cycle of a pulse can be retrieved each time the duty of a pulse signal is determined. In the example shown in FIG. 38, '20.0', '20.4', '19.6', 20.8', . . . are sequentially obtained.

FIG. 39B shows the case where the cycles of pulses obtained from different storage addresses are assigned to respective power supply circuits. In this method, the cycle of a pulse signal assigned to each power supply circuit does not match each other. Therefore, noise can be reduced even when a plurality of power supply circuits are simultaneously operated.

FIG. 39C shows a variation of the method shown in FIG. 39B in which the order of access to the cycle storage table is changed for each power supply circuit.

Figure 40:
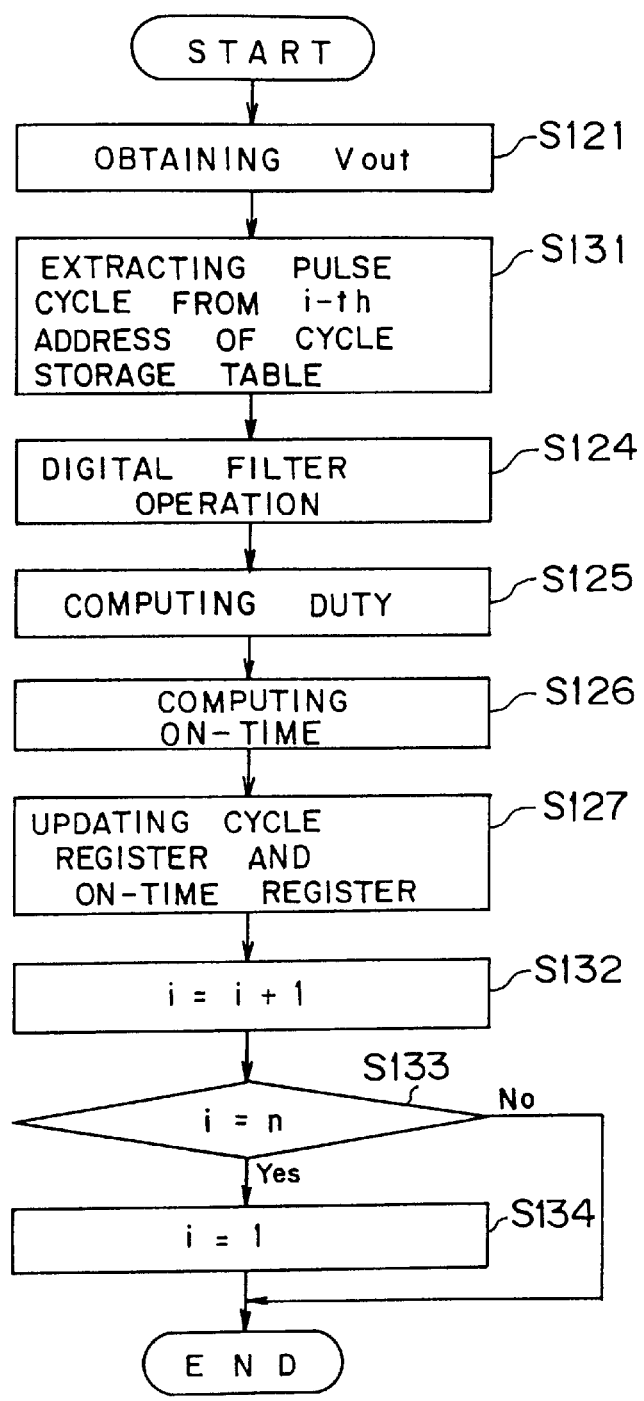
FIG. 40 is a flowchart (1) of the process for a random pulse signal using the cycle storage table.

FIG. 40 is a flowchart showing the process of randomizing a pulse signal in the method shown in FIG. 39A. In this process, step S131 is performed instead of steps S122 and S123 of the process in the flowchart shown in FIG. 37. Step S131 refers to the process of retrieving the cycle of a pulse from the i-th address in the cycle storage table shown in FIG. 38.

Steps S132 through S134 refer to the process of shifting a read address of the cycle storage table. As a result, next time the process according to this flowchart is performed, the cycle of a pulse is read from the address next to the currently accessed address. The cycle storage table is cyclically accessed as shown in FIG. 39. Therefore, when i reaches n, it is returned to 1 in step S134.

Figure 41:
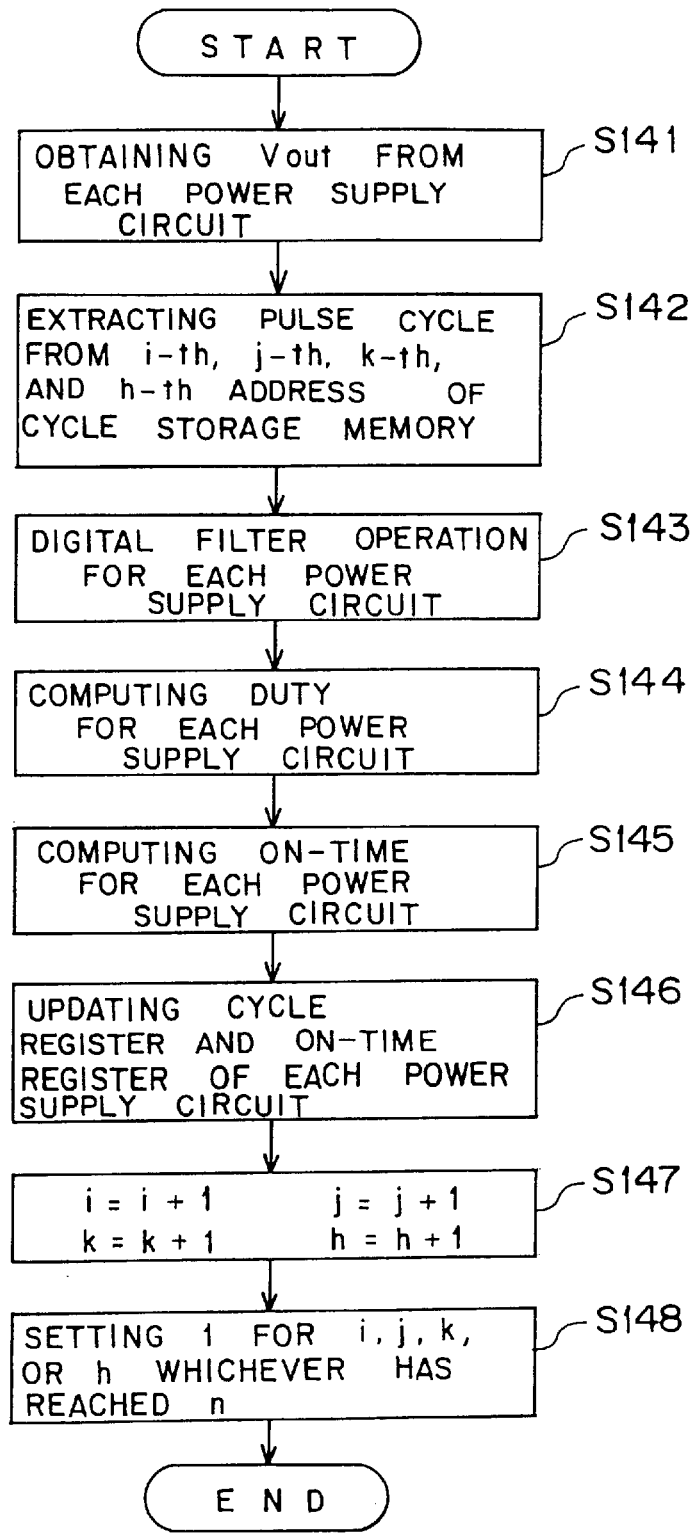
FIG. 41 is a flowchart (2) of the process for a random pulse signal using the cycle storage table.

FIG. 41 is a flowchart of the process of randomizing a pulse signal in the method shown in FIG. 39B. In this example, four power supply circuits are controlled.

In step S141, the output voltage from each power supply circuit is obtained. In step S142, the cycle of a pulse is retrieved from each of the i-th, j-th, k-th, and h-th addresses of the cycle storage table shown in FIG. 38. The i, j, k, and h are different values.

In step S143, a digital filter operation is performed for each power supply circuit. In step S144, the duty is computed for each power supply circuit. In step S145, the on-time is obtained for each power supply circuit based on each duty computed in step S144. In step S146, each cycle of a pulse extracted in step S142, and each on-time computed in step S145 are written to the cycle register 61 and the on-time register 62 of a corresponding PWM unit.

Then, in step S147, the i, j, k, and h are shifted by 1. The step S148 is a process such that the cycle storage table is cyclically accessed.

Figure 42:
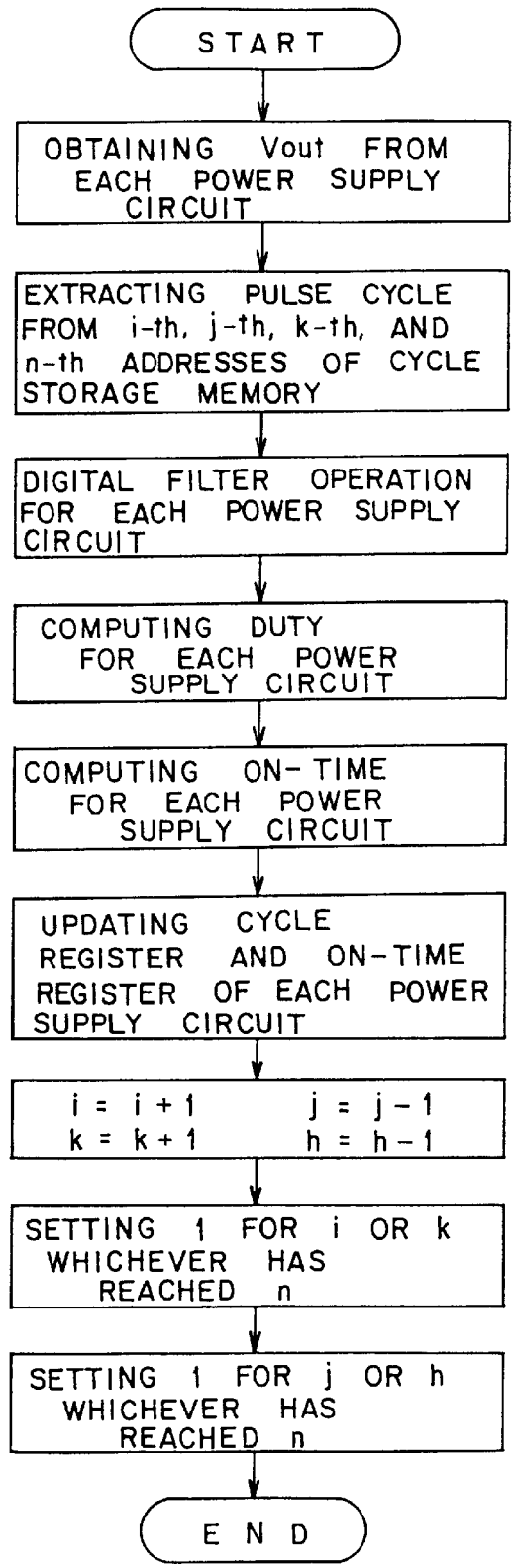
FIG. 42 is a flowchart (3) of the process for a random pulse signal using the cycle storage table.

FIG. 42 is a flowchart of the process of randomizing a pulse signal in the method shown in FIG. 39C. This process is different from the process in FIG. 41 only in setting a read address of the cycle storage table. Therefore, the description is omitted here.

Described below is the technology of controlling the phase of a pulse signal given to a plurality of power supply circuits.

Figure 43:
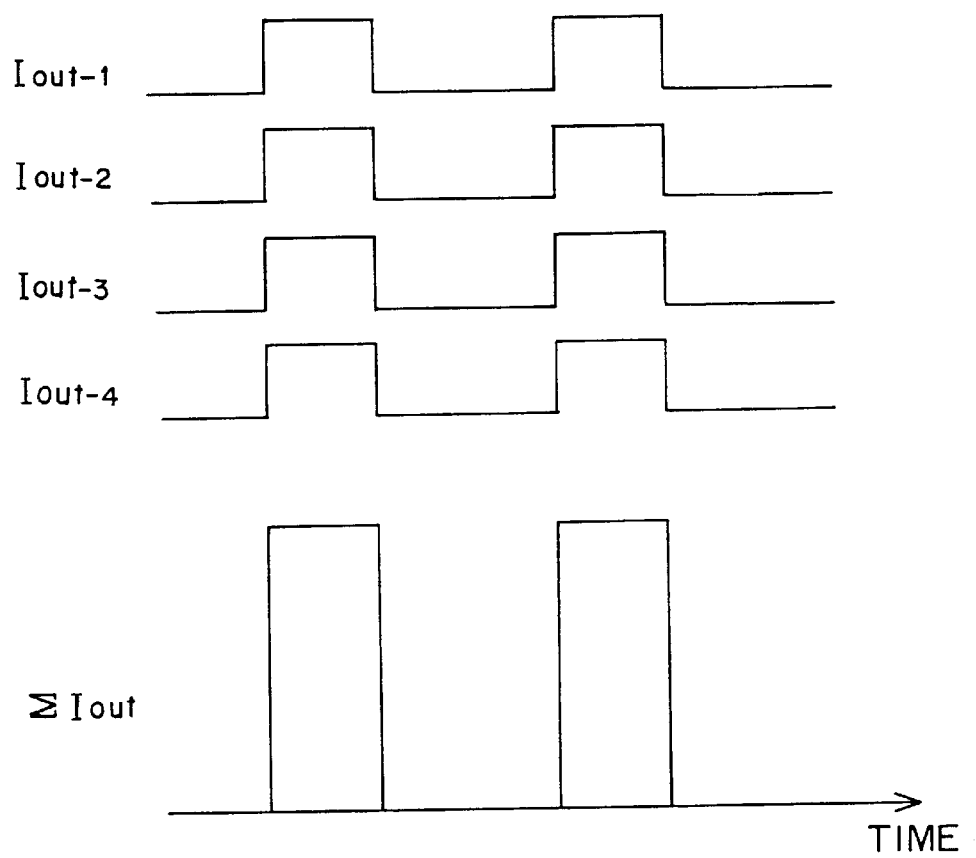
FIG. 43 shows the problem when a plurality of power supply circuits are provided.

In the power supply apparatus according to the present embodiment, an electric current is controlled according to a given pulse signal. Therefore, when the phases of pulse signals given to a plurality of power supply circuits (at a on-period timing) match each other, the sum of the electric currents indicates a high peak value as shown in FIG. 43. Such a strong current necessarily generates much noise. Described below is the method of suppressing the noise by controlling the phase of a pulse signal provided for a plurality of power supply circuits.

Figure 44:
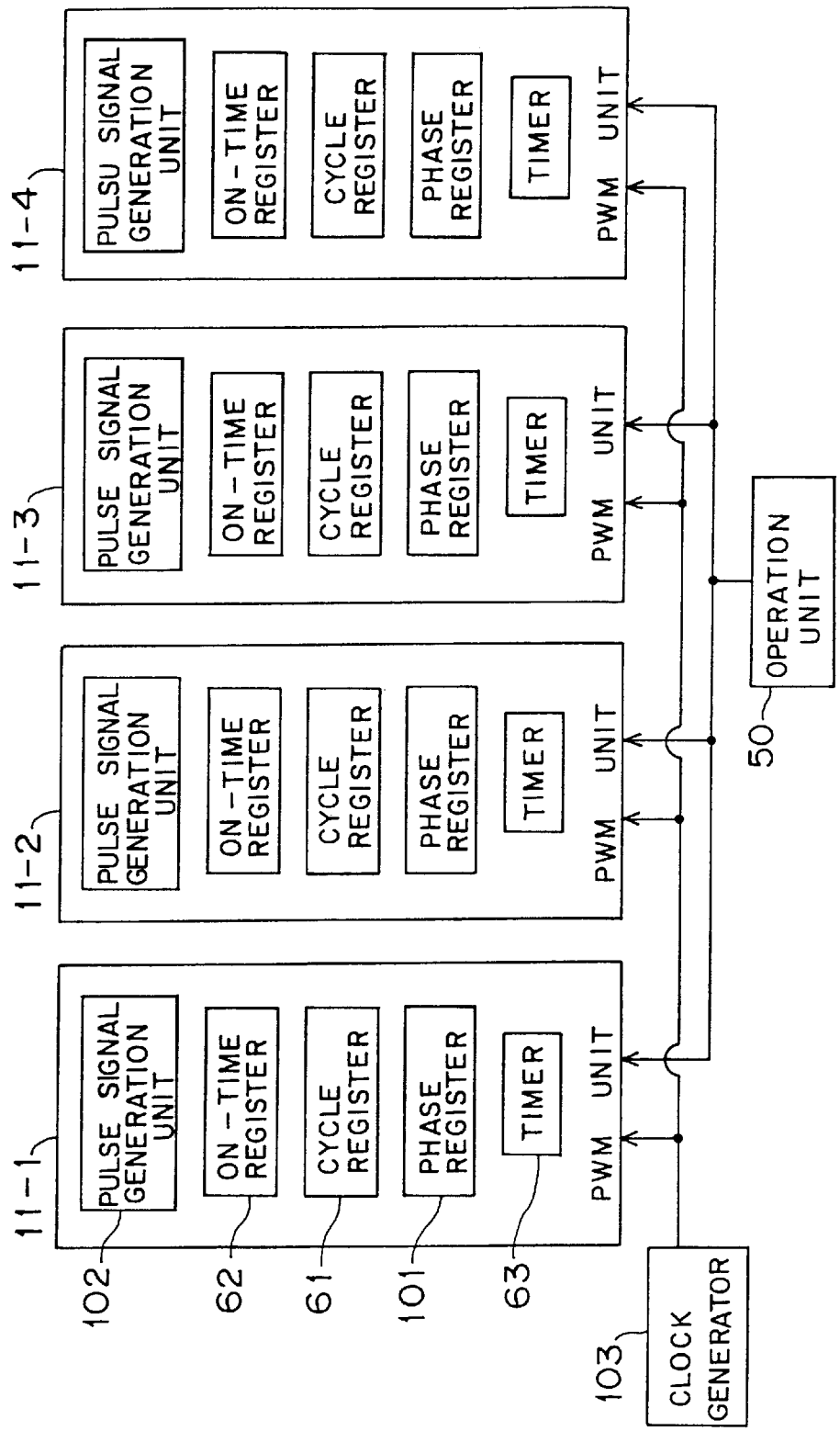
FIG. 44 is a block diagram showing the function of controlling the phase of a pulse signal.

FIG. 44 is a block diagram showing the function of controlling the phase of a pulse signal. The PWM units 11-1 through 11-4 are provided in different power supply circuits to generate a pulse signal. The cycle register 61, the on-time register 62, and the timer 63 are the same as those described above.

The phase register 101 stores the information indicating the phase difference of pulse signals generated by the PWM units 11-1 through 11-4. The value set in each phase register indicates a phase difference of $2\pi/n$ from each other when n power supply circuits are provided. For example, as shown in FIG. 44, when 4 power supply circuits are provided, the phase registers of the PWM units 11-1 through 11-4 are set to 0°, 90°, 180°, and 270° respectively. However, a phase difference is actually converted into a time value and set in each resister. For example, when the switching frequency is 50 kHz, the phase registers of the PWM units 11-1 through 11-4 are respectively set to 0 μsecond, 5 μsecond, 10 μsecond, and 15 μsecond as delay time information. A phase register 101 is set by the operation unit 50.

A pulse signal generation unit 102 generates a pulse signal according to the cycle of a pulse stored in the cycle register 61, the on-time stored in the on-time register 62, and the phase information stored in the phase register 101. An clock generator 103 generates a clock signal as synchronization information, and transmits it to the PWM units 11-1 through 11-4. The frequency of the clock signal is the same as the switching frequency.

Figure 45:
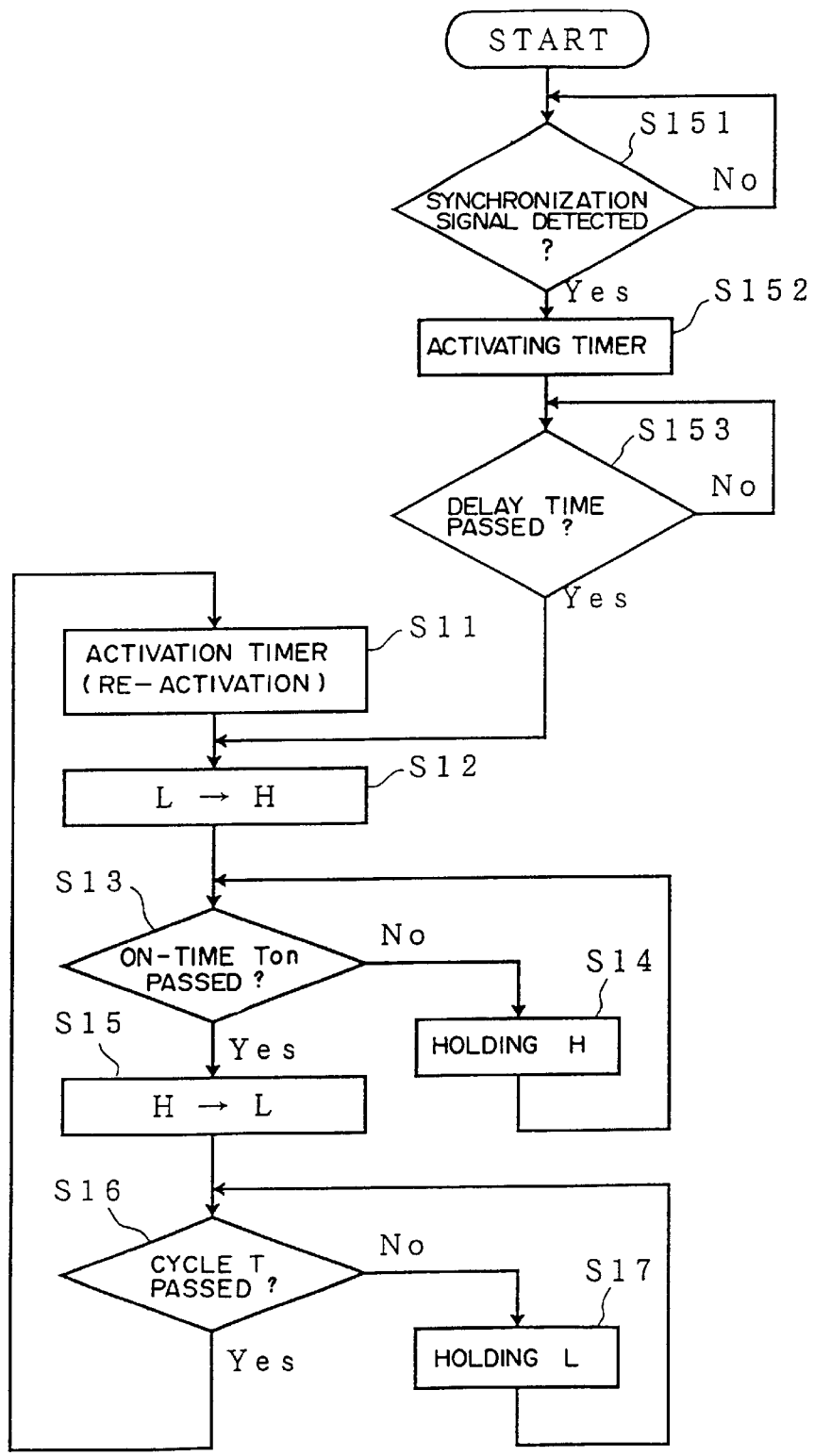
FIG. 45 is a flowchart of the process of generating a pulse signal according to phase information.

FIG. 45 is a flowchart of the process of generating a pulse signal according to the phase information. In this process, the start timing of a pulse signal is determined in steps S151 through S153. That is, in steps S151 and S152, the timer 63 is activated when a synchronization signal is detected. The synchronization signal indicates a leading edge or a trailing edge of a clock signal provided by the clock generator 103. It is determined in step S153 whether the lapse of time from the activation of a timer in step S152 has reached the time indicated by the phase information set in the phase register 101. When it reaches the time indicated by the phase information, control is passed to step S12.

Then, the process in steps S11 through S17 described above by referring to FIG. 9 is repeatedly performed. Therefore, the PWM units 11-1 through 11-4 generate pulse signals whose phase are different from each other.

Figure 46:
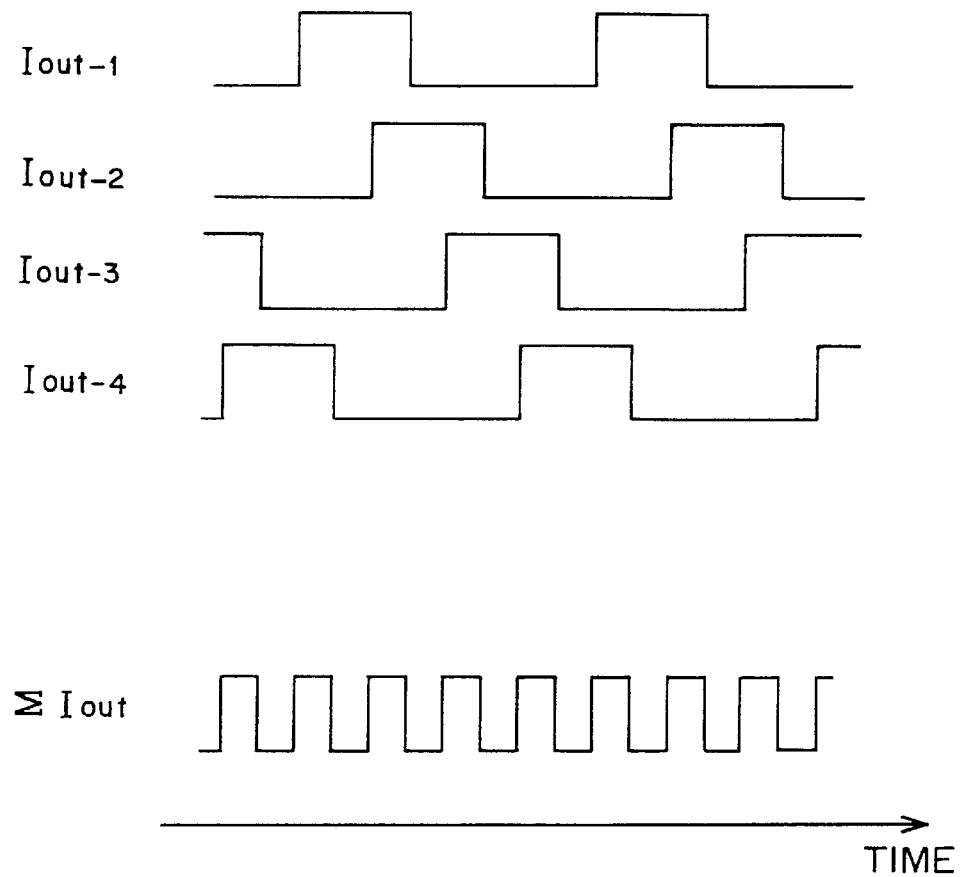
FIG. 46 shows the state of the electric current generated in the process performed according to the flowchart shown in FIG. 45.

FIG. 46 shows the state of an electric current generated in the process according to the flowchart shown in FIG. 45. In FIG. 46, the electric current generated by each power supply circuit is the same as that in the example shown in FIG. 43. When the phases of the pulse signals given to the power supply circuits are shifted from each other according to the method of the present embodiment, the sum of the electric currents of the power supply circuits are averaged, thereby suppressing the generation of a strong peak current. As a result, noise can be suppressed.

Figure 47:
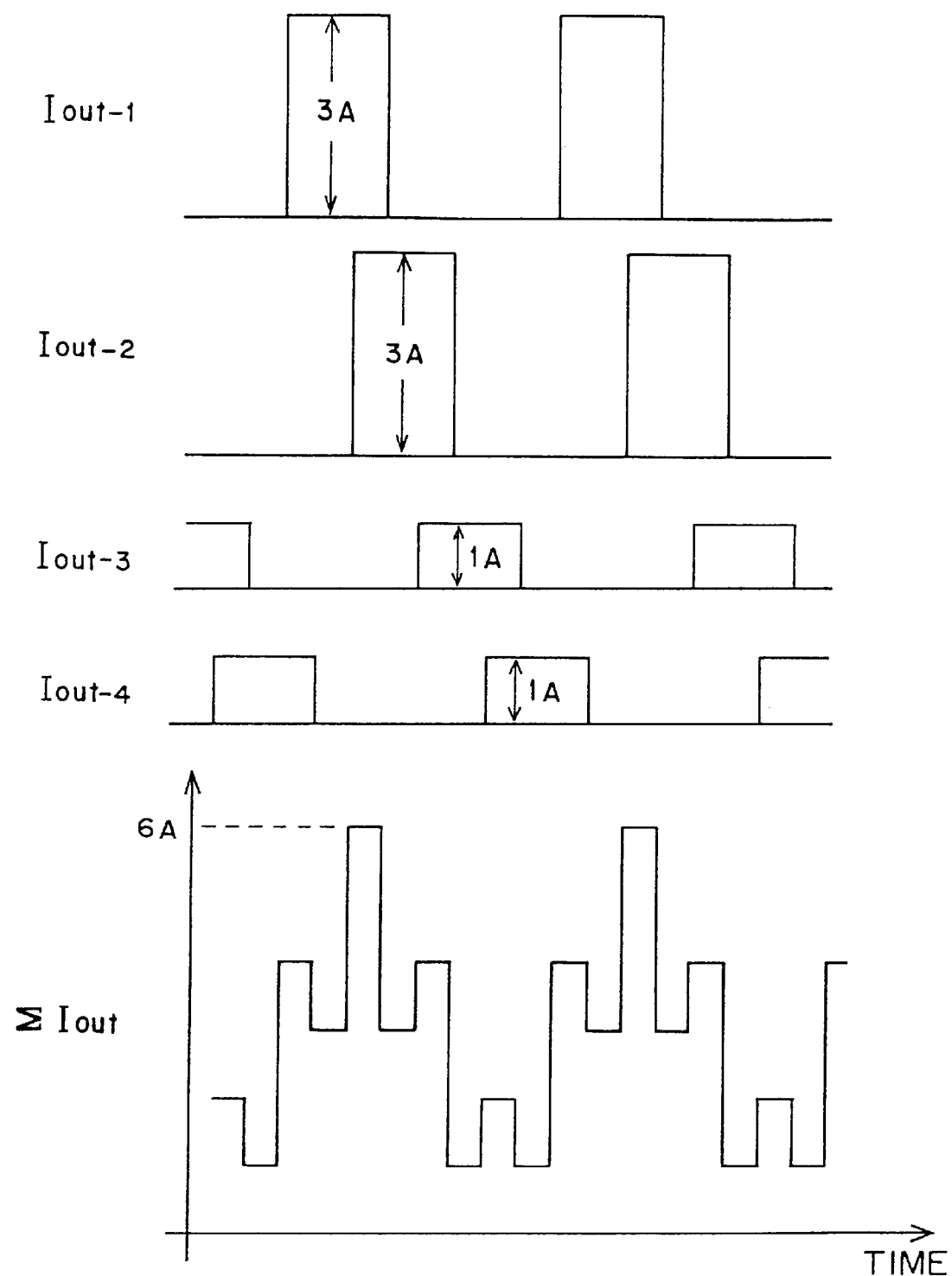
FIG. 47 shows the problem when a plurality of power supply circuits are provided.

Although the above described method is effective when the intensity of the electric current generated by each power supply circuit is not much different from each other, a strong peak current can be generated when the intensity of each power supply circuit is different from each other as shown in FIG. 47. Described below is the method of solving the problem by adjusting the phase of a pulse signal provided for each power supply circuit such that the sum of the output currents from the power supply circuits are monitored and averaged.

Figure 48:
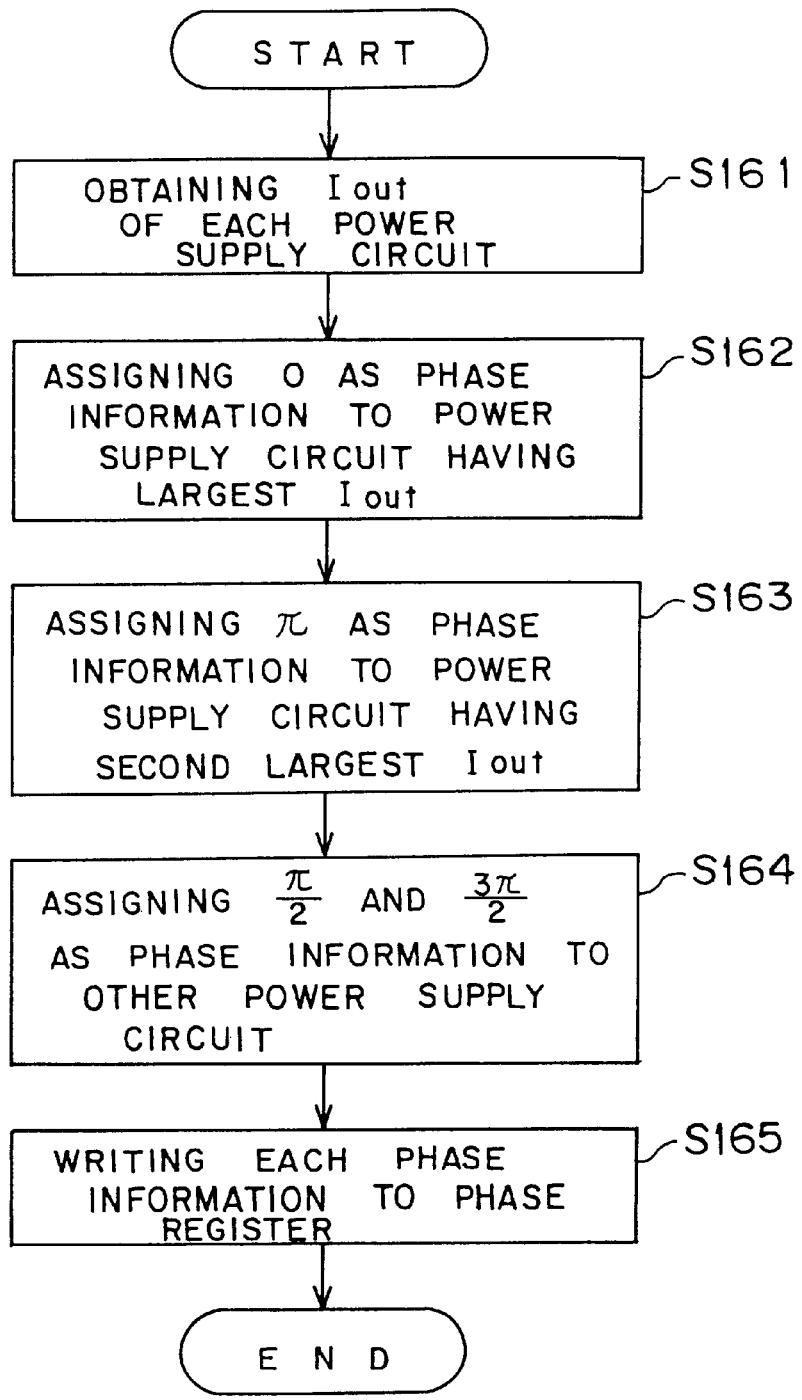
FIG. 48 is a flowchart of the process of determining the phase of a pulse signal applied to the power supply circuit based on the output current of each power supply circuit.

FIG. 48 is a flowchart of the process of determining the phase of a pulse signal provided for a power supply circuit according to the output current from each power supply circuit. This process is performed by a timer interruption, etc. at predetermined intervals. For simple explanation, four power supply circuits are controlled in the following example.

In step S161, the output current Iout from each power supply circuit is obtained. In step S162, 0 is assigned as phase information to a power supply circuit having the largest value of the obtained output current. In step S163, $\pi$ is assigned as phase information to a power supply circuit having the second largest value of the obtained output current. In step S164, $\pi/2$ and $3\pi/2$ are assigned as phase information to other two power supply circuits. Then, in step S165, the phase information assigned in steps S162 through S164 is written to the phase register of a corresponding PWM unit.

Figure 49:
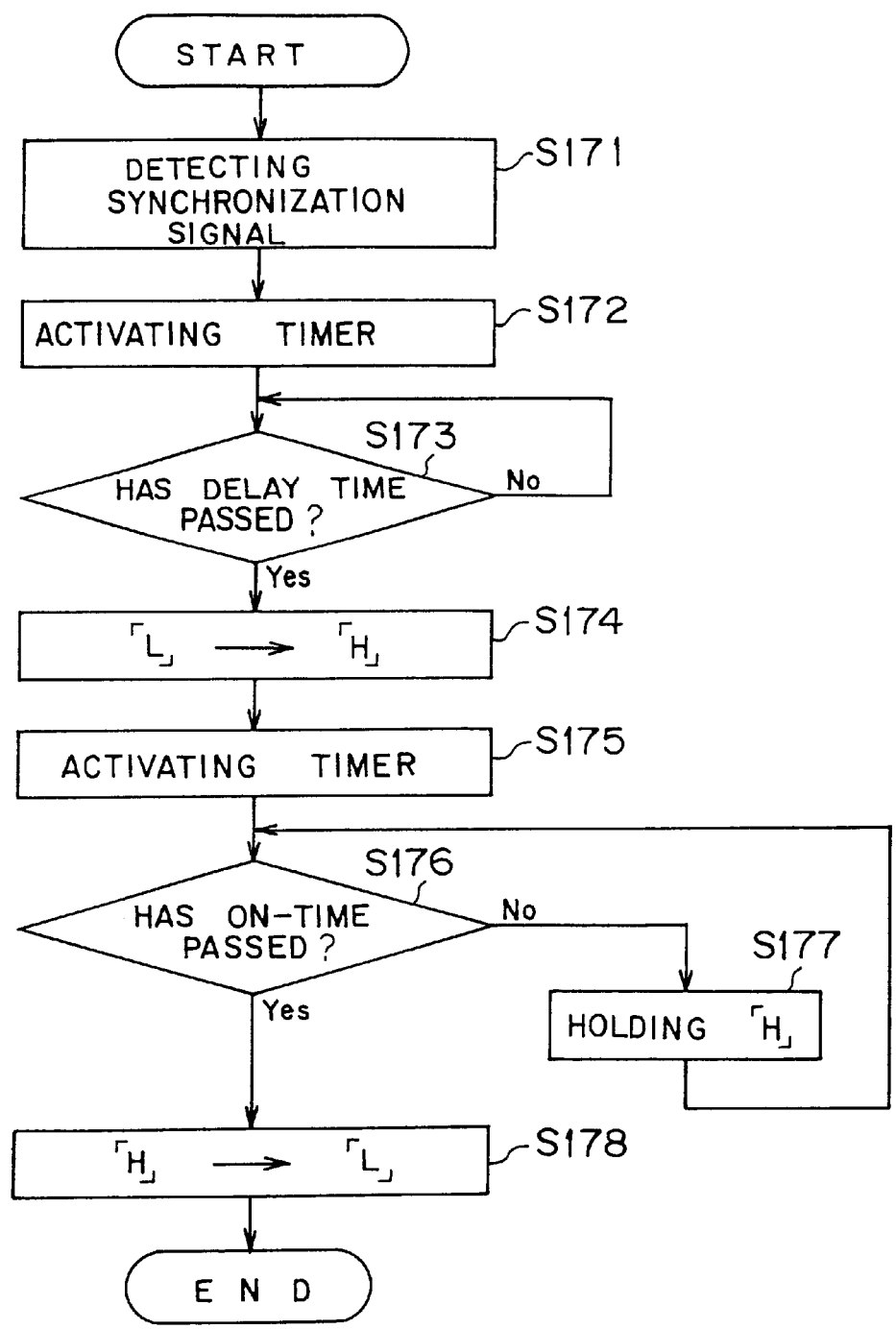
FIG. 49 is a flowchart of the process performed by another method of generating a pulse signal according to phase information.

FIG. 49 is a flowchart of the process performed by another method of generating a pulse signal using phase information. This process is performed each time a synchronization signal is detected. The synchronization signal refers to a leading edge or a trailing edge of a clock signal provided by the clock generator 103 as in the example shown in FIG. 45.

When a synchronization signal is detected in step S171, a timer is activated in step S172. Then, in step S173, it is monitored and determined whether or not the lapse of time from the activation of the timer has reached the time indicated by the phase information set in the phase register 101. When the lapse of time reaches the time indicated by the phase information, the output signal is switched from the L level to the H level in step S174. Simultaneously, in step S175, the timer is activated. The timer activated in step S175 can be different from the timer activated in step S172.

In steps S176 and S177, an output signal is maintained at the H level until the lapse of time from the activation of the timer in step S175 reaches the on-time. When the lapse of time reaches the on-time, the output signal is switched from the H level to the L level in step S178.

FIG. 50 shows the state of the electric current obtained in the process according to the flowcharts shown in FIGS. 48 and 49. When it is compared with the example shown in FIG. 47, the sum of the electric currents generated by power supply circuits is averaged to reduce the peak value. Therefore, the noise generated by the power supply apparatus can be reduced.

The above described embodiment describes the power supply circuit for maintaining a constant value for the output voltage through the PWM. However, the present invention is not limited to this application. The present invention can be, for example, applied to a power supply circuit for controlling an output voltage through the PFM (pulse frequency modulation).

Since the output from a power supply circuit is controlled by software, it characteristics and specification can be flexibly changed. Especially, the output voltage is controlled in consideration of the resistance of a wiring pattern and a temperature, thereby improving the precision in voltage. Additionally, since the rise and decay of an output voltage can be set to a desired pattern, appropriate electric power can be provided for various loads (especially CMOS). Furthermore, noise can be suppressed by randomizing the switching frequency or controlling the phase of a pulse signal when a plurality of power supply circuits are controlled.

What is claimed is:

1. A power supply apparatus comprising:
   a power supply circuit for generating a DC output according to a pulse signal;
   a converter converting an output voltage and an output current from said power supply circuit into digital data;
   a reference value unit storing a reference value;
   a reference value determination unit determining a reference value and updating said stored reference value for maintaining a voltage applied to the input terminal of a load at a constant value even when the output current of the power supply circuit changes based on the digital data which corresponds to the output current and is obtained by said converter; and
   a generator generating a pulse signal to be provided for said power supply circuit based on a difference between the digital data which corresponds to the output voltage and is obtained by said converter and the reference value.

2. The apparatus according to claim 1 wherein:
   said reference value determination unit obtains the reference value by adding a product of a resistance value of a conductor and an output current to a voltage required by the load, wherein the resistance value of a conductor is a resistance value between said power supply circuit and the load connected to said power supply circuit.

3. A controller for controlling a power supply circuit for generating a DC output based on a pulse signal, comprising:
   a converter converting an output voltage and an output current from said power supply circuit into digital data;
   a reference value unit storing a reference value;
   a reference value determination unit determining a reference value and updating said reference value for maintaining a voltage applied to the input terminal of a load at a constant value even when the output current of the power supply circuit changes based on the digital data which corresponds to the output current and is obtained by said converter; and
   a generator generating a pulse signal to be provided for said power supply circuit based on a difference between the digital data which corresponds to the output voltage and is obtained by said converter and the reference value.

4. A method for controlling a power supply circuit for generating a DC output based on a pulse signal, comprising the steps of:
   converting an output voltage and an output current from said power supply circuit into digital data;
   determining a reference value for maintaining a voltage applied to the input terminal of a load at a constant value even when the output current of the power supply circuit changes based on the digital data corresponding to the output current;
   updating said reference value based on said determination; and
   generating a pulse signal to be provided for said power supply circuit based on a difference between the digital data corresponding to the output voltage and the reference value.

5. A power supply apparatus comprising:
   a power supply circuit for generating a DC output based on a received pulse signal;
   a reference value determination unit determining a reference value indicating an output voltage from said power supply circuit based on the output voltage;
   a converter converting the output voltage into digital data; and
   a generator generating a pulse signal to be provided for the power supply circuit based on a difference between the digital data obtained from said converter and the reference value, wherein
   said reference value determination unit determines an increasing rate of change of the reference value based on an output voltage to be supplied to a load in a process of starting the power supply circuit or a decreasing rate of change of the reference value based on an output voltage to be supplied to a load in a process of disconnecting the power supply circuit.

6. A power supply apparatus comprising:
   a plurality of power supply circuits for generating DC output according to received pulse signals;
   a reference value determination unit updating a plurality of reference values indicating respective output voltages from said plurality of power supply circuits with predetermined relationship maintained among said plurality of reference values:
   a converter converting output voltages from said plurality of power supply circuits into digital data; and
   a generator generating pulse signals to be provided for said plurality of power supply circuits based on a difference between each piece of digital data obtained by said converter and each of the corresponding reference values.

7. The apparatus according to claim 6, further comprising:
   a monitor unit detecting an abnormal condition based on the output voltages from said plurality of power supply circuits wherein:
   said reference value determination unit updates a reference value for a normally operating power supply circuit such that a difference from an output voltage from a power supply circuit in which an abnormal condition has been detected by said monitor unit can indicate a constant value.

8. A controller for controlling a power supply circuit for generating a DC output according to a pulse signal, comprising:
   a reference value determination unit determining a reference value indicating an output voltage from said power supply circuit based on the output voltage;
   a converter converting the output voltage into digital data; and
   a generator generating a pulse signal to be provided for said power supply circuit based on a difference between the digital data obtained from said converter and the reference value, wherein
   said reference value determination unit determines an increasing rate of change of the reference value based on an output voltage to be supplied to a load in a process of starting the power supply circuit or a decreasing rate of change of the reference value based on an output voltage to be supplied to a load in a process of disconnecting the power supply circuit.

9. A controller for controlling a plurality of power supply circuits for generating DC output according to received pulse signals, comprising;
   a reference value determination unit updating a plurality of reference values indicating respective output voltages from said plurality of power supply circuits with predetermined relationship maintained among said plurality of reference values;
   a converter converting output voltages from said plurality of power supply circuits into digital data; and
   a generator generating pulse signals to be provided for said plurality of power supply circuits based on a difference between each piece of digital data obtained by said converter and each of the corresponding reference values.

10. A method for controlling a plurality of power supply circuits for generating DC output according to received pulse signals, comprising the steps of;
    updating a plurality of reference values indicating respective output voltages from said plurality of power supply circuits with predetermined relationship maintained among said plurality of reference values;
    converting output voltages from said plurality of power supply circuits into digital data; and
    generating pulse signals to be provided for said plurality of power supply circuits based on a difference between each piece of digital data and each of the corresponding reference values.

11. A power supply apparatus comprising:
    a power supply circuit for generating a DC output based on a received pulse signal;
    a reference value determination unit determining a reference value indicating an output voltage from said power supply circuit based on the output voltage;
    a converter converting the output voltage into digital data; and
    a generator generating a pulse signal to be provided for the power supply circuit based on a difference between the digital data obtained from said converter and the reference value, wherein
      said reference value determination unit determines an increasing or decreasing rate of change the reference value based on an electric characteristics of a load which is connected to the power supply apparatus in a process of starting or disconnecting the power supply circuit.

12. A controller for controlling a power supply circuit for generating a DC output according to a pulse signal, comprising:
    a reference value determination unit determining a reference value indicating an output voltage from said power supply circuit based on the output voltage;
    a converter converting the output voltage into digital data; and
    a generator generating a pulse signal to be provided for said power supply circuit based on a difference between the digital data obtained from said converter and the reference value, wherein
      said reference value determination unit determines an increasing or decreasing rate of change the reference value based on an electric characteristics of a load which is connected to the power supply apparatus in a process of starting or disconnecting the power supply circuit.

* * * * *